United States Patent
Tsukahara et al.

(10) Patent No.: US 10,850,252 B2
(45) Date of Patent: Dec. 1, 2020

(54) MICROWAVE TREATMENT APPARATUS AND PROGRAM

(71) Applicant: Microwave Chemical Co., Ltd., Osaka (JP)

(72) Inventors: Yasunori Tsukahara, Osaka (JP); Yuya Tanaka, Aichi (JP); Hideshi Kurihara, Osaka (JP); Ryuhei Kinjyo, Osaka (JP); Hisao Watanabe, Osaka (JP)

(73) Assignee: Microwave Chemical Co., Ltd., Osaka (JP)

( * ) Notice: Subject to any disclaimer, the term of this patent is extended or adjusted under 35 U.S.C. 154(b) by 277 days.

(21) Appl. No.: 15/735,670

(22) PCT Filed: May 10, 2017

(86) PCT No.: PCT/JP2017/017750
§ 371 (c)(1),
(2) Date: Dec. 12, 2017

(87) PCT Pub. No.: WO2017/195840
PCT Pub. Date: Nov. 16, 2017

(65) Prior Publication Data
US 2018/0361348 A1    Dec. 20, 2018

(30) Foreign Application Priority Data

May 13, 2016 (JP) .................................. 2016-097128
May 13, 2016 (JP) .................................. 2016-097129
May 13, 2016 (JP) .................................. 2016-097130

(51) Int. Cl.
*B01J 19/12* (2006.01)
*H05B 6/68* (2006.01)
(Continued)

(52) U.S. Cl.
CPC ............. *B01J 19/126* (2013.01); *B01J 19/12* (2013.01); *B01J 19/18* (2013.01); *H05B 6/68* (2013.01);
(Continued)

(58) Field of Classification Search
CPC .......... B01J 19/126; B01J 19/12; B01J 19/18; H05B 6/68; H05B 6/705; H05B 6/72; H05B 6/80
(Continued)

(56) References Cited

U.S. PATENT DOCUMENTS 5,008,506 A    4/1991 Asmussen et al.
9,370,762 B2   6/2016 Ishizuka et al.
(Continued)

FOREIGN PATENT DOCUMENTS

CN    1313021 A    9/2001
CN    101883608 A   11/2010
(Continued)

OTHER PUBLICATIONS

Extended European Search Report issued in corresponding European Patent Application No. 17796199.2 dated Jun. 12, 2019.
(Continued)

*Primary Examiner* — Vishal Pancholi
(74) *Attorney, Agent, or Firm* — Troutman Pepper Hamilton Sanders LLP

(57) ABSTRACT

In order to provide a microwave treatment apparatus capable of properly controlling microwave irradiation, a microwave treatment apparatus 1 includes: an irradiating portion that performs microwave irradiation from multiple emitting portions; a moving portion that individually moves the multiple emitting portions; and a control portion that controls movements of the emitting portions by the moving portion, wherein the irradiating portion is such that phases of micro-
(Continued)

waves that are emitted from the multiple emitting portions are changeable, and the control portion controls phases of microwaves that are emitted by the irradiating portion from the multiple emitting portions.

11 Claims, 18 Drawing Sheets

(51) Int. Cl.
    *H05B 6/72* (2006.01)
    *H05B 6/80* (2006.01)
    *H05B 6/70* (2006.01)
    *B01J 19/18* (2006.01)

(52) U.S. Cl.
    CPC ............. *H05B 6/705* (2013.01); *H05B 6/72* (2013.01); *H05B 6/80* (2013.01); *B01J 2219/00141* (2013.01); *B01J 2219/1269* (2013.01); *B01J 2219/1275* (2013.01); *B01J 2219/1296* (2013.01)

(58) Field of Classification Search
    USPC ........................................................ 219/690
    See application file for complete search history.

(56) References Cited

U.S. PATENT DOCUMENTS

| | | |
|---|---|---|
| 2006/0228088 A1 | 10/2006 | Charlier de Chily et al. |
| 2009/0088625 A1 | 4/2009 | Oosting et al. |
| 2009/0118803 A1 | 5/2009 | Fallik |
| 2009/0198253 A1 | 8/2009 | Omori |
| 2013/0166004 A1 | 6/2013 | Fallik |
| 2015/0297177 A1 | 10/2015 | Boctor et al. |

FOREIGN PATENT DOCUMENTS

| | | |
|---|---|---|
| CN | 102170936 A | 8/2011 |
| DE | 10 2013 012 321 A1 | 3/2014 |
| EP | 1 096 833 A1 | 5/2001 |
| JP | 1977014946 U | 2/1977 |
| JP | 1992502684 A | 5/1992 |
| JP | 1993013163 A | 1/1993 |
| JP | 2006516008 A | 6/2006 |
| JP | 2007317458 A | 12/2007 |
| JP | 2009080997 A | 4/2009 |
| JP | 2010540163 A | 12/2010 |
| JP | 0005114616 B1 | 1/2013 |
| JP | 2013201096 A | 10/2013 |
| JP | 2014175122 A | 9/2014 |

OTHER PUBLICATIONS

International Search Report issued in International Application No. PCT/JP2017/017750 dated Aug. 8, 2017.
Notification of Reasons for Refusal issued in Japanese Patent Application No. JP2016-097128 dated Jul. 12, 2016.
Notification of Decision of Rejection issued in Japanese Patent Application No. 2016-097128 dated Dec. 8, 2016.
Notification of Reasons for Refusal issued in Japanese Patent Application No. 2016-097128 dated Apr. 9, 2017.
Notification of Trial Decision issued in Japanese Patent Application No. 2016-097128 (Appeal No. 2017-3132) dated Aug. 22, 2017.
Notification of Reasons for Refusal issued in Japanese Patent Application No. 2016-097129 dated Jul. 12, 2016.
Notification of Reasons for Refusal issued in Japanese Patent Application No. 2016-097129 dated Dec. 7, 2016.
Notification of Reasons for Refusal issued in Japanese Patent Application No. 2016-097130 dated Sep. 21, 2016.
Makuhari Messe; NEDO "clean device society implementation Promotion Project", presentation documents at CEATEC Japan (2015), pp. 1-9.
"Mitsubishi Electric, Tokyo Tech, Ryukoku Univ., Microwave Chemical Develop Microwave Heating System With GaN-amplifier-module Heaters", press release, Jan. 25, 2016, pp. 1-4.
Hiroshi Fukumoto, "Developed industrial My b wave heating device for the heating source GaN amplifier module", press conference presentation documents, Mitsubishi Electric Corporation Information Technology Research Institute Optical—Microwave Circuit Engineering Department, retrieved Dec. 1, 2017, pp. 1-22.
Mitsubishi Electric Corporation, 2015, Exhibit panel at the exhibition (with English translation).
The First Office Action issued in corresponding Chinese Patent Application No. 201780001854.3 dated Dec. 23, 2019, with translation.
The Second Office Action issued in corresponding Chinese Patent Application No. 201780001854.3 dated Sep. 7, 2020, with machine translation.

FIG.6

| ID | Target position | Emission A | Emission B | Phase A | Phase B | Time |
|---|---|---|---|---|---|---|
| 001 | (x1,y1,z1) | (xa1,ya1,za1),(θa1,φa1) | (xb1,yb1,zb1),(θb1,φb1) | λa1 | λb1 | t1 |
| 002 | (x2,y2,z2) | (xa2,ya2,za2),(θa2,φa2) | (xb2,yb2,zb2),(θb2,φb2) | λa2 | λb2 | t2 |
| 003 | (x3,y3,z3) | (xa3,ya3,za3),(θa3,φa3) | (xb3,yb3,zb3),(θb3,φb3) | λa3 | λb3 | t3 |
| 004 | (x4,y4,z4) | (xa4,ya4,za4),(θa4,φa4) | (xb4,yb4,zb4),(θb4,φb4) | λa4 | λb4 | t4 |
| 005 | (x5,y5,z5) | (xa5,ya5,za5),(θa5,φa5) | (xb5,yb5,zb5),(θb5,φb5) | λa5 | λb5 | t5 |
| 006 | (x5,y5z6) | (xa6,ya6,za6),(θa6,φa6) | (xb6,yb6,zb6),(θb6,φb6) | λa6 | λb6 | t6 |
| 007 | (x7,y7,z7) | (xa7,ya7,za7),(θa7,φa7) | (xb7,yb7,zb7),(θb7,φb7) | λa7 | λb7 | t7 |
| ... | ... | ... | ... | ... | ... | ... |

FIG.8

| Order | Emission A | Emission B | Phase A | Phase B | Time |
|---|---|---|---|---|---|
| 1 | (xa1,ya1,za1),($\theta$a1,$\phi$a1) | (xb1,yb1,zb1),($\theta$b1,$\phi$b1) | $\lambda$a1 | $\lambda$b1 | t1 |
| 2 | (xa2,ya2,za2),($\theta$a2,$\phi$a2) | (xb2,yb2,zb2),($\theta$b2,$\phi$b2) | $\lambda$a2 | $\lambda$b2 | t2 |
| 3 | (xa3,ya3,za3),($\theta$a3,$\phi$a3) | (xb3,yb3,zb3),($\theta$b3,$\phi$b3) | $\lambda$a3 | $\lambda$b3 | t3 |
| 4 | (xa4,ya4,za4),($\theta$a4,$\phi$a4) | (xb4,yb4,zb4),($\theta$b4,$\phi$b4) | $\lambda$a4 | $\lambda$b4 | t4 |
| 5 | (xa5,ya5,za5),($\theta$a5,$\phi$a5) | (xb5,yb5,zb5),($\theta$b5,$\phi$b5) | $\lambda$a5 | $\lambda$b5 | t5 |
| 6 | (xa6,ya6,za6),($\theta$a6,$\phi$a6) | (xb6,yb6,zb6),($\theta$b6,$\phi$b6) | $\lambda$a6 | $\lambda$b6 | t6 |
| 7 | (xa7,ya7,za7),($\theta$a7,$\phi$a7) | (xb7,yb7,zb7),($\theta$b7,$\phi$b7) | $\lambda$a7 | $\lambda$b7 | t7 |
| ⋮ | ⋮ | ⋮ | ⋮ | ⋮ | ⋮ |

FIG.9

| Status | Threshold value (°C) | Less than threshold value (GHz) | Threshold value or more (GHz) |
|---|---|---|---|
| Temperature | 60 | 2.4 | 2.5 |

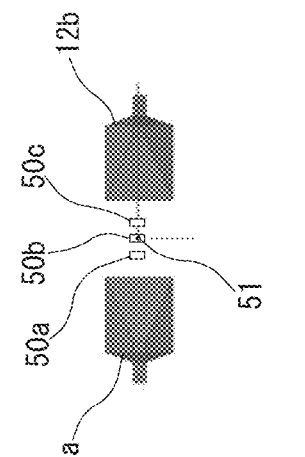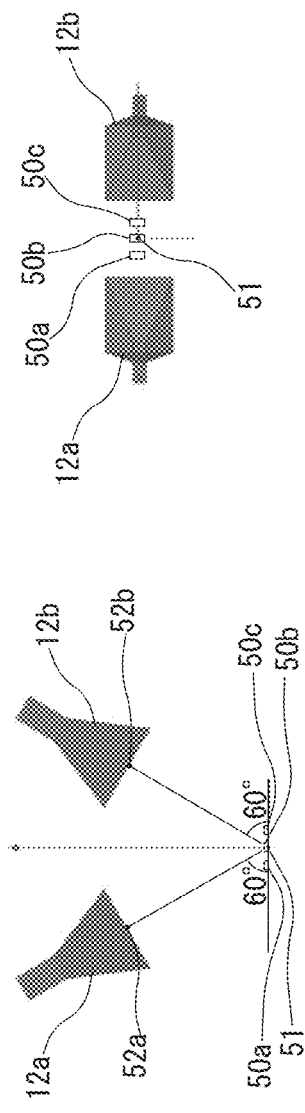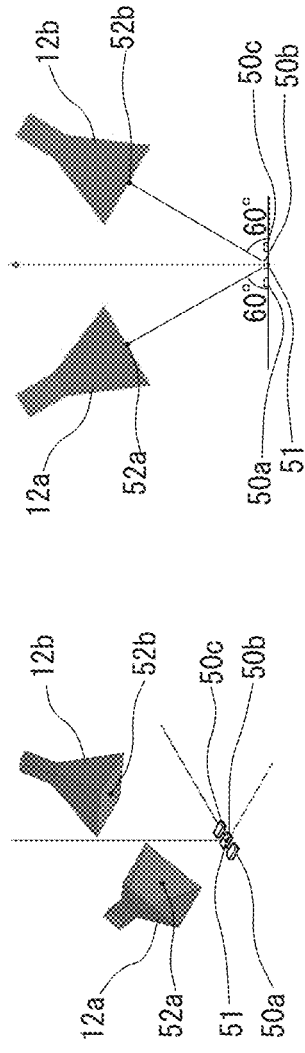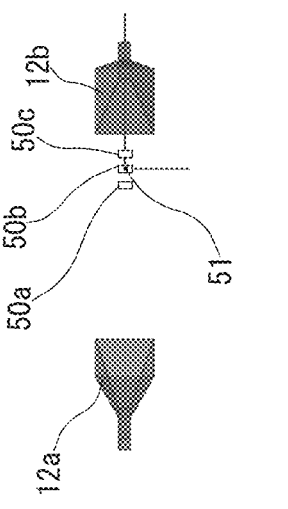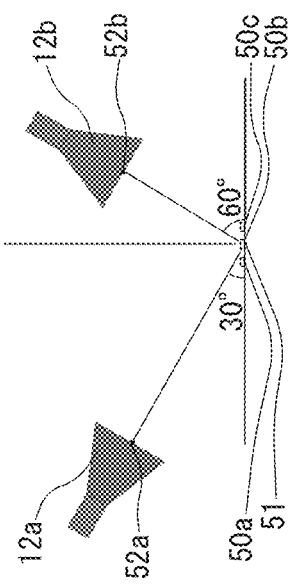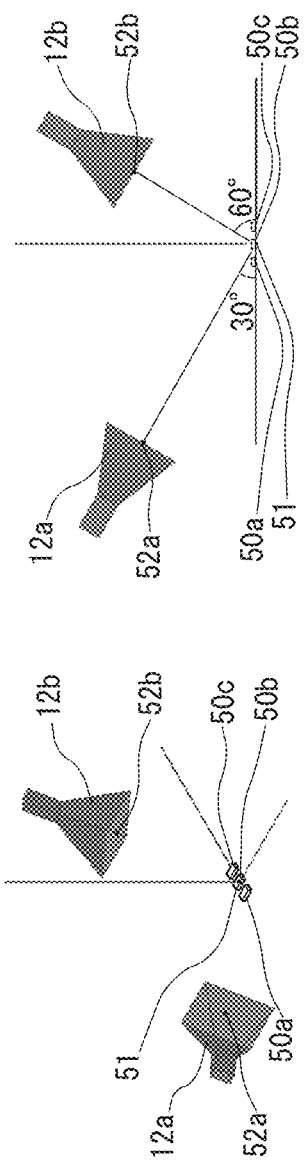

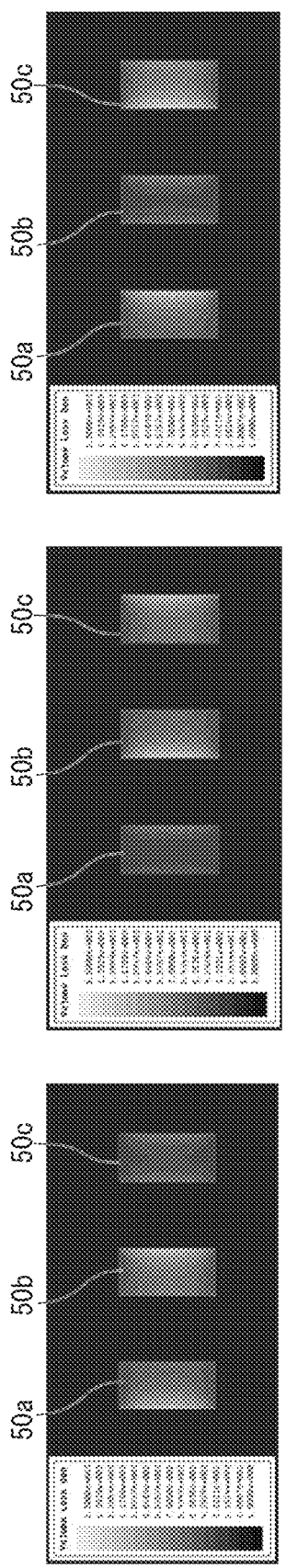

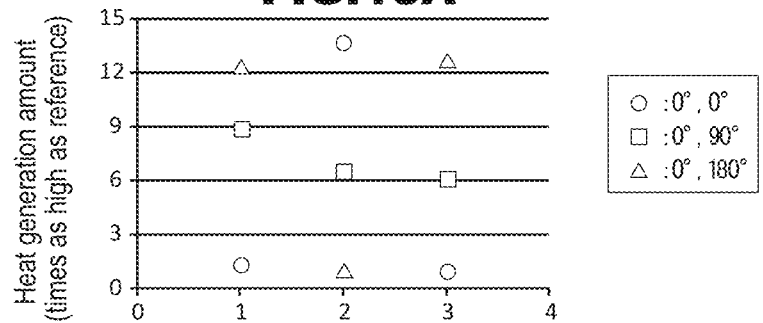
FIG.13A
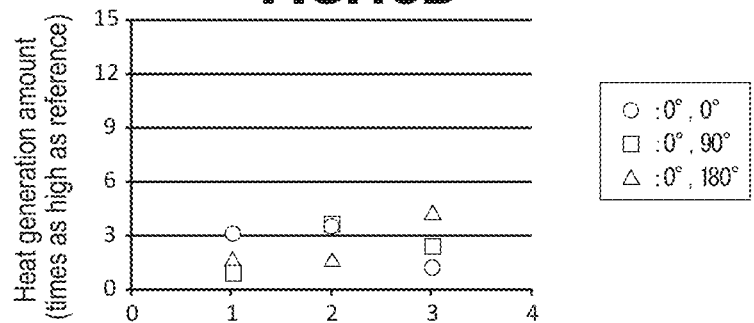
FIG.13B
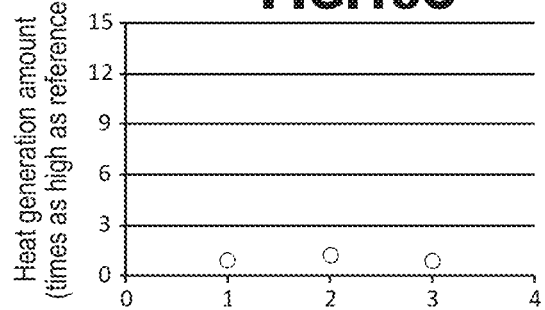
FIG.13C
FIG.13D
| Case | Phase difference | Irradiation target 50a | Irradiation target 50a | Irradiation target 50a |
|---|---|---|---|---|
| 1 | 0°, 0° | 1.37 | 13.66 | 1.00 |
| 1 | 0°, 90° | 8.97 | 6.60 | 6.20 |
| 1 | 0°, 180° | 12.39 | 1.06 | 12.71 |
| 2 | 0°, 0° | 3.16 | 3.60 | 1.33 |
| 2 | 0°, 90° | 1.00 | 3.76 | 2.49 |
| 2 | 0°, 180° | 1.88 | 1.78 | 4.47 |
| 3 | 0° | 1.04 | 1.30 | 1.00 |

FIG.16A
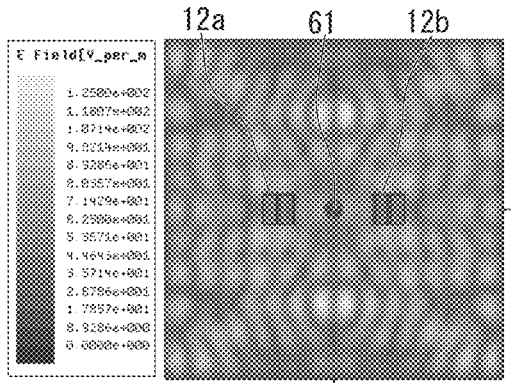
FIG.16B
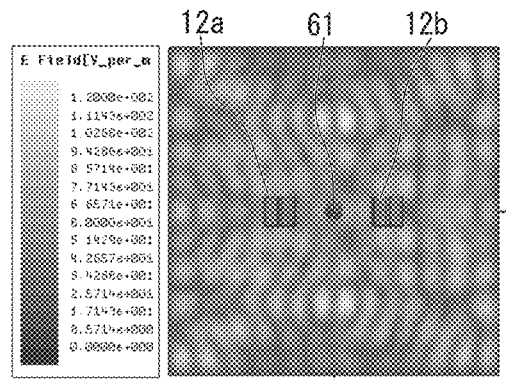
FIG.16C
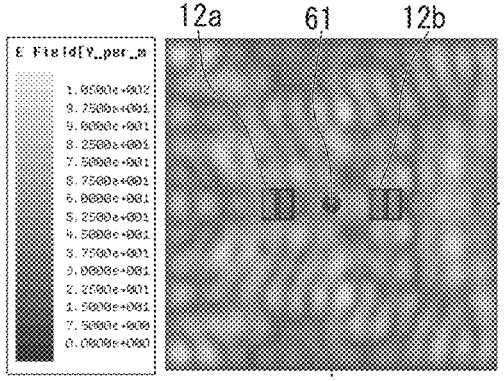
FIG.16D
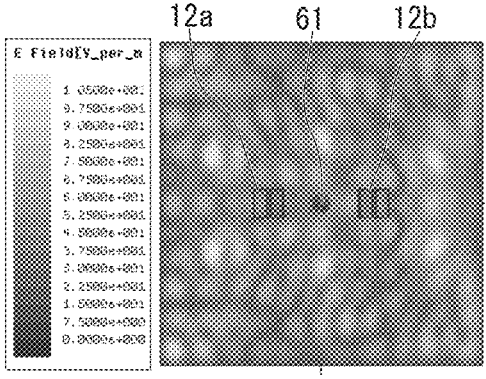
FIG.16E
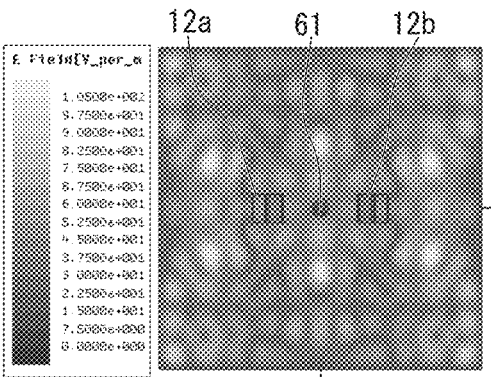
FIG.16F
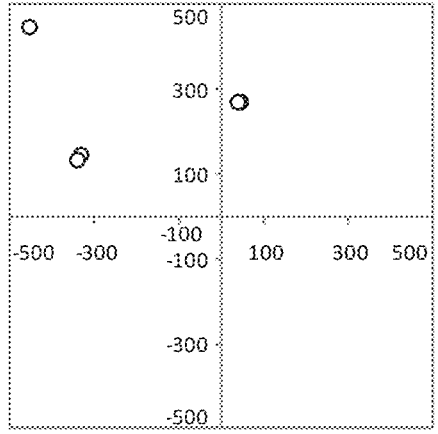
FIG.16G
| Phase difference(°) | | Coordinates of highest strength position | | Highest electric field strength value(V/m) |
|---|---|---|---|---|
| 0 | 0 | 37 | 276 | 122.2 |
| 0 | 45 | 38 | 276 | 119.1 |
| 0 | 90 | −458 | 452 | 100.8 |
| 0 | 135 | −336 | 148 | 102.2 |
| 0 | 180 | −342 | 142 | 103.1 |

FIG.17A
12a 12b 61
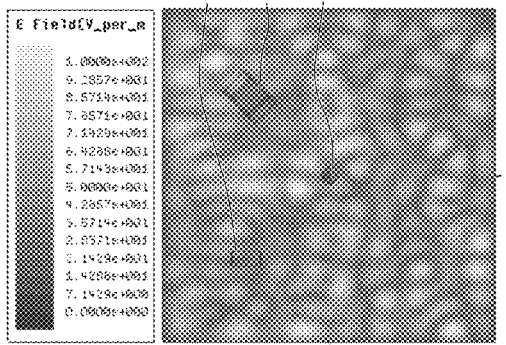
FIG.17B
12a 12b 61
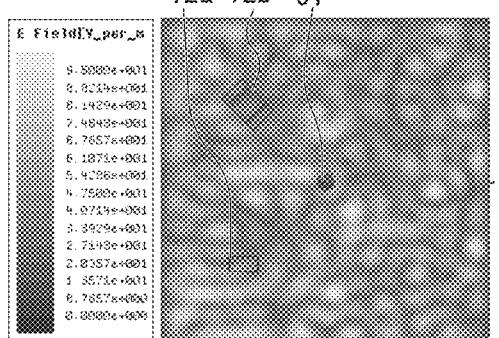
FIG.17C
12a 12b 61
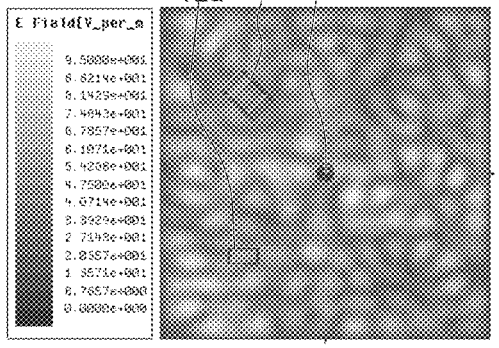
FIG.17D
12a 12b 61
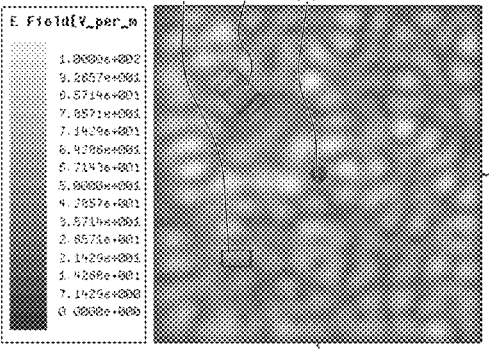
FIG.17E
12a 12b 61
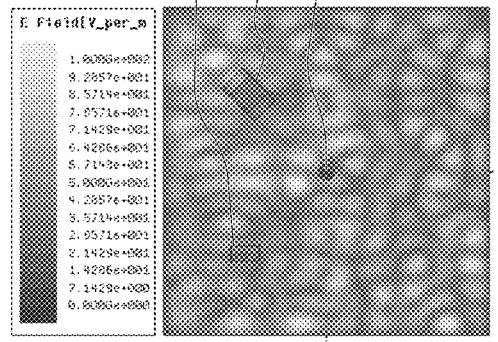
FIG.17F
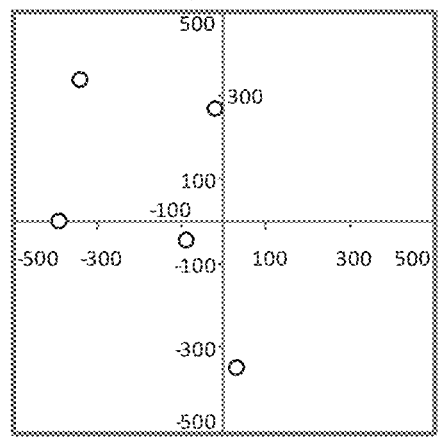
FIG.17G
| Phase difference(°) | Coordinates of highest strength position | | Highest electric field strength value(V/m) |
|---|---|---|---|
| 0 | −180 | −92 | −34 | 107.5 |
| 0 | −90 | 26 | −338 | 91.8 |
| 0 | 0,0 | −394 | 8 | 91.05 |
| 0 | 90 | −21 | 277 | 103.98 |
| 0 | 180 | −343 | 343 | 108.13 | and claims benefit of priority to
MICROWAVE TREATMENT APPARATUS AND PROGRAM

CROSS-REFERENCE TO RELATED APPLICATIONS

This is a U.S. national phase application under 35 U.S.C. § 371 of International Patent Application No. PCT/JP2017/017750, filed May 10, 2016, and claims benefit of priority to Japanese Patent Application 2016-097128, filed May 13, 2016, Japanese Patent Application 2016-097129, filed May 13, 2016 and Japanese Patent Application 2016-097130, filed May 13, 2016. The entire contents of these applications are hereby incorporated by reference.

FIELD OF TECHNOLOGY

The present invention relates to an apparatus and the like for performing microwave irradiation.

BACKGROUND

Conventionally, there are heating apparatuses and chemical reaction methods are known that perform heat treatment and the like by irradiating a reaction material with microwaves (electromagnetic waves) (see JP 2006-516008A (Tokuhyo) (p. 1, FIG. 1, etc.).

SUMMARY

However, conventional microwave treatment apparatuses are problematic in that it is difficult to properly control microwave irradiation.

For example, it is difficult for conventional microwave treatment apparatuses to perform microwave irradiation so as to locally heat a desired point. For example, it is difficult for conventional microwave treatment apparatuses to perform microwave irradiation so as to uniformly heat a desired space.

The present invention was arrived at in order to solve the above-described problems, and it is an object thereof to provide a microwave treatment apparatus and the like capable of properly controlling microwave irradiation.

The present invention is directed to a microwave treatment apparatus, including: an irradiating portion that performs microwave irradiation from multiple emitting portions; a moving portion that individually moves the multiple emitting portions; and a control portion that controls movements of the emitting portions by the moving portion.

With this configuration, it is possible to properly control microwave irradiation, by individually moving the positions of the multiple emitting portions. For example, it is possible to concentrate electrical fields of microwaves on a desired point, and to provide a uniform electrical field distribution in the desired region, by individually changing the positions of the multiple emitting portions.

Furthermore, in the microwave treatment apparatus according to the present invention, the control portion controls the moving portion, thereby moving the emitting portions such that microwaves that are emitted from the multiple emitting portions overlap each other at least at a desired point.

With this configuration, it is possible to locally heat a desired point.

Furthermore, in the microwave treatment apparatus according to the present invention, the control portion controls the moving portion, thereby moving one or more emitting portions such that microwaves that are emitted from the multiple emitting portions are intensified by each other through mutual interference at the desired point.

With this configuration, it is possible to locally heat a desired point. Furthermore, in the microwave treatment apparatus according to the present invention, the control portion controls the moving portion, thereby moving one or more emitting portions such that electrical fields of microwaves that are emitted from the multiple emitting portions are concentrated on the desired point.

With this configuration, it is possible to locally heat a desired point. Furthermore, in the microwave treatment apparatus according to the present invention, the control portion controls the moving portion, thereby moving one or more emitting portions such that microwaves that are incident on the desired point have a same phase.

With this configuration, it is possible to locally heat a desired point. Furthermore, in the microwave treatment apparatus according to the present invention, the irradiating portion is such that phases of microwaves that are emitted from the multiple emitting portions are changeable, and the control portion controls phases of microwaves that are emitted by the irradiating portion from the multiple emitting portions.

With this configuration, it is possible to properly control microwave irradiation. For example, it is possible to concentrate electrical fields of microwaves on a desired point, and to provide a uniform electrical field distribution in the desired region, by combining the positions of the multiple emitting portions and the phases of microwaves that are emitted by the multiple emitting portions.

Furthermore, in the microwave treatment apparatus according to the present invention, the control portion controls the irradiating portion such that at least some sets of microwaves that are emitted by the irradiating portion from the multiple emitting portions have different phases.

With this configuration, it is possible to properly control microwave irradiation.

Furthermore, in the microwave treatment apparatus according to the present invention, the irradiating portion can further perform microwave irradiation at two or more different frequencies, and the control portion controls frequencies of microwaves used in irradiation at a desired point.

With this configuration, it is possible to control the frequency of microwaves used in irradiation at a desired point, and to increase the heating efficiency of microwaves.

Furthermore, in the microwave treatment apparatus according to the present invention, the irradiating portion has: one or more microwave oscillators; and multiple transmitting units that have the emitting portions, and transmit microwaves generated by the microwave oscillators and emit the transmitted microwaves from the emitting portions, and the moving portion individually moves the multiple emitting portions.

With this configuration, it is possible to properly control microwave irradiation, by individually moving the positions of the multiple emitting portions.

Furthermore, in the microwave treatment apparatus according to the present invention, the moving portion has multiple robot arms, and the multiple emitting portions are respectively installed at the multiple robot arms, and individually move in accordance with operations of the robot arms.

With this configuration, it is possible to properly control microwave irradiation, by individually moving the positions of the multiple emitting portions. It is possible to increase the degree of freedom in the movement, and control microwave irradiation more properly, by individually moving the emitting portions using the robot arms included in the moving portion. For example, even in the case where a path between a desired point that is required to be locally heated through microwave irradiation and the emitting portions is blocked by an object whose microwave transmissivity is low, an object that reflects microwaves, or the like, it is possible to operate the robot arms so as to move the emitting portions to positions with a path to the desired point from which microwaves can be emitted to the desired point without being blocked by objects or the like, and, thus, it is possible to locally heat the desired point.

In the microwave treatment apparatus according to the present invention, the multiple emitting portions of the irradiating portion are highly directional antennas.

With this configuration, it is possible to perform microwave irradiation in a concentrated manner.

Furthermore, in the microwave treatment apparatus according to the present invention, the microwave treatment apparatus further includes a vessel, wherein the multiple emitting portions of the irradiating portion are movably arranged in the vessel, and the irradiating portion performs microwave irradiation from the multiple emitting portions into the vessel.

With this configuration, it is possible to properly control microwave irradiation inside the vessel. For example, it is possible to concentrate electrical fields of microwaves on a desired point inside the vessel, and to provide a uniform electrical field distribution inside the vessel, by individually changing the positions of the multiple emitting portions.

According to the microwave treatment apparatus and the like of the present invention, it is possible to properly control microwave irradiation.

BRIEF DESCRIPTION OF DRAWINGS

FIG. 6 shows an irradiation management information management table of the microwave treatment apparatus in the embodiment.

FIG. 8 shows an irradiation management information management table of the microwave treatment apparatus in the embodiment.

FIG. 9 shows a status association information management table of the microwave treatment apparatus in the embodiment.

FIG. 13 shows graphs and a table of simulation demonstration test results of the microwave treatment apparatus in the embodiment (FIGS. 13(a) to 13(d)).

FIG. 16 shows diagrams of simulation results of the microwave treatment apparatus in the embodiment (FIGS. 16(a) to 16(g)).

FIG. 17 shows diagrams of simulation demonstration test results of the microwave treatment apparatus in the embodiment (FIGS. 17(a) to 17(g)).

DETAILED DESCRIPTION

Figure 1:
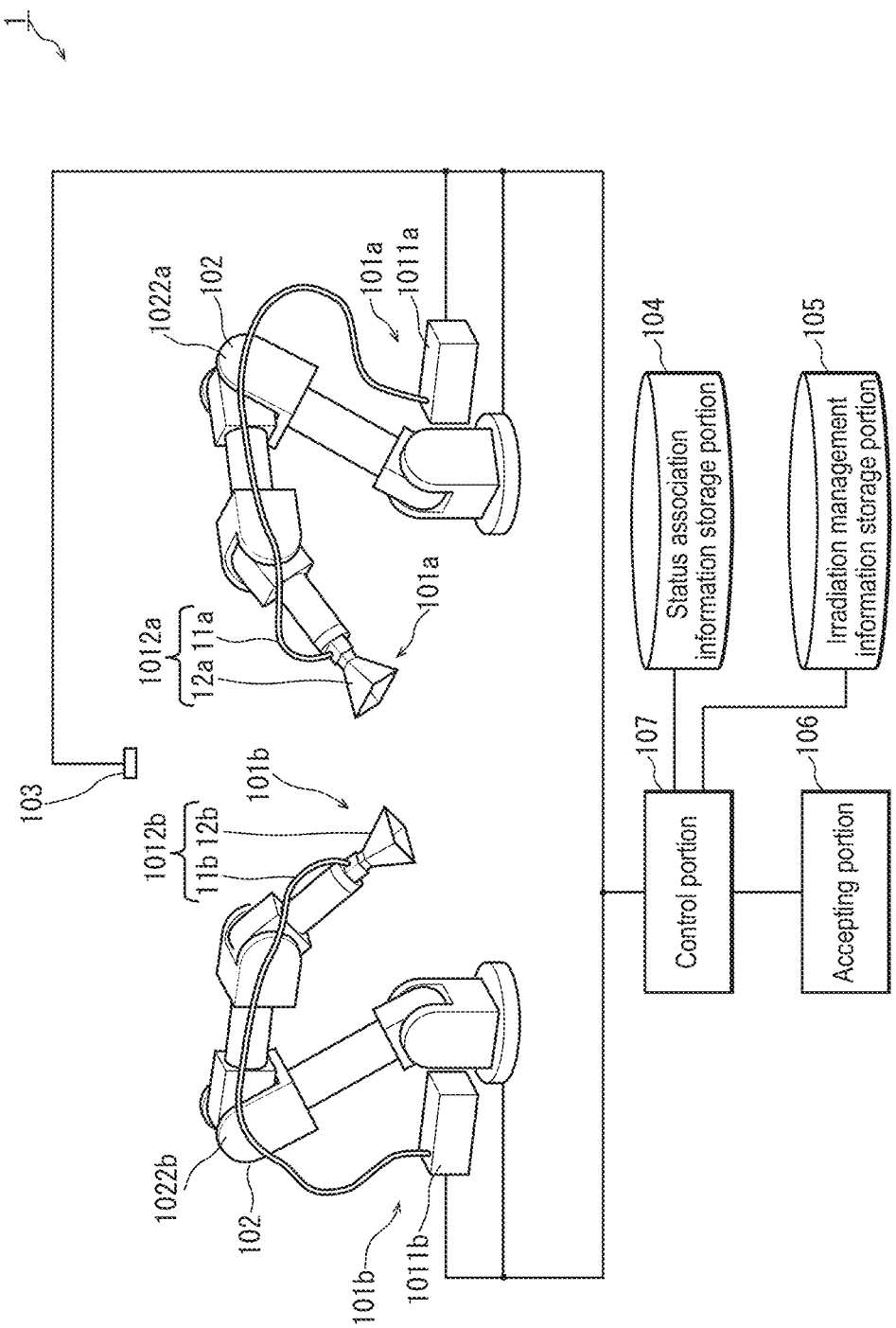
FIG. 1 is a schematic diagram showing an example of the configuration of a microwave treatment apparatus in Embodiment 1 of the present invention.

Hereinafter, embodiments of a microwave treatment apparatus and the like will be described with reference to the drawings. It should be noted that constituent elements denoted by the same reference numerals in the embodiments perform similar operations, and thus a description thereof may not be repeated.

FIG. 1 is a schematic diagram showing an example of the configuration of a microwave treatment apparatus 1 in this embodiment.

The microwave treatment apparatus 1 includes an irradiating portion 101, a moving portion 102, one or at least two sensors 103, a status association information storage portion 104, an irradiation management information storage portion 105, an accepting portion 106, and a control portion 107.

FIG. 1 shows a case as an example in which the irradiating portion 101 includes two emitting portions 12. Specifically, a case will be described as an example in which the irradiating portion 101 includes two microwave oscillators 1011 and two transmitting units 1012 that transmit microwaves respectively generated by the microwave oscillators 1011, and each of the two transmitting units 1012 includes one emitting portion 12. The number of emitting portions 12 included in the irradiating portion 101 is not limited to two, and it is sufficient that there are multiple emitting portions 12. For example, there may be three or more emitting portions 12. FIG. 1 shows a case as an example in which the moving portion 102 of the microwave treatment apparatus 1 has two robot arms 1022, and the front ends of the robot arms 1022 are respectively provided with the emitting portions 12 included in the transmitting units 1012.

Hereinafter, for the sake of ease of description, the two microwave oscillators 1011 included in the irradiating portion 101 may be respectively referred to as microwave oscillators 1011a and 1011b, the transmitting units 1012 connected to the microwave oscillators 1011a and 1011b may be respectively referred to as transmitting units 1012a and 1012*b*, and the emitting portions 12 included in the transmitting units 1012*a* and 1012*b* may be respectively referred to as emitting portions 12*a* and 12*b*. The two robot arms 1022 included in the moving portion 102 are respectively referred to as robot arms 1022*a* and 1022*b*, and it is assumed that the emitting portions 12 respectively installed at the front ends of the robot arms 1022*a* and 1022*b* are the emitting portions 12*a* and 12*b*.

The irradiating portion 101 performs microwave irradiation from the multiple emitting portions 12. The multiple emitting portions 12 are typically arranged at different positions. The irradiating portion 101 may have any configuration as long as it can perform microwave irradiation from the multiple emitting portions 12. The irradiating portion 101 includes, for example, one or more microwave oscillators 1011 that generate microwaves, and multiple transmitting units 1012 that transmit the microwaves generated by the one or more microwave oscillators 1011 and emit the transmitted microwaves respectively from the multiple emitting portions 12. The multiple transmitting units 1012 respectively have the emitting portions 12 that emit the transmitted microwaves. In the irradiating portion 101, for example, the multiple transmitting units 1012 may be connected in one-to-one correspondence to the multiple microwave oscillators 1011, and each transmitting unit 1012 transmits microwaves generated by one microwave oscillator 1011. Alternatively, multiple transmitting units 1012 may be connected via an unshown branching structure or the like to one microwave oscillator 1011. The transmitting units 1012 may transmit, in a branching manner, microwaves generated by the one microwave oscillator 1011. In this example, a transmitting unit 1012 that is connected to one microwave oscillator 1011 and branches into multiple portions may be considered as multiple transmitting units 1012.

The multiple emitting portions 12 are, for example, microwave emitting portions of the multiple transmitting units 1012. The emitting portions 12 are, for example, antennas. For example, the transmitting units 1012 are combinations of coaxial cables and antennas, which are the multiple emitting portions 12 that are respectively connected to the coaxial cables and used to emit microwaves. The coaxial cables are configured, for example, such that end portions thereof not connected to the antennas are connected to the microwave oscillators 1011, and microwaves generated by the microwave oscillators 1011 are transmitted by the coaxial cables and emitted from the antennas. In this embodiment, a case will be described as an example in which one transmitting unit 1012 includes a coaxial cable 11 that is connected to the microwave oscillator 1011 and an emitting portion 12 that is an antenna connected to the coaxial cable 11. Instead of the coaxial cables 11, coaxial tubes (not shown) and waveguides may be used. If waveguides are used, for example, end portions thereof opposite to the side connected to the microwave oscillators 1011 function as the emitting portions 12. Note that FIG. 1 shows a case as an example in which the transmitting unit 1012*a* has the coaxial cable 11*a* and the transmitting unit 1012*b* has the coaxial cable 11*b*.

The microwaves emitted from the two or more emitting portions 12 of the irradiating portion 101 typically have the same frequency, but may have different frequencies.

The microwave irradiation using the irradiating portion 101 is, for example, microwave irradiation in a so-called multi-mode.

The multiple emitting portions 12 can, for example, simultaneously emit microwaves. Note that it is possible that only some of the multiple emitting portions 12 simultaneously perform microwave irradiation. For example, it is preferable that the multiple emitting portions 12 can simultaneously emit microwaves, wherein microwaves may be emitted from only some of them.

The coaxial cables, the coaxial tube, and the waveguides of the transmitting units 1012 are preferably those matching the frequency, the output, and the like of the microwaves that are generated by the microwave oscillators 1011. The same applies to the antennas functioning as the emitting portions 12.

There is no limitation on the structure and the like of the antennas used as the emitting portions 12, as long as microwaves can be emitted. For example, the antennas are planar antennas, parabolic antennas, horn antennas, or the like. The antennas may be directional antennas, or may be non-directional antennas. There is no limitation on the degree of directivity and the like of the antennas functioning as the emitting portions 12. The emitting portions 12 are preferably highly directional antennas. For example, it is preferable to use antennas with a gain of 10 dB or greater as the highly directional antennas. If highly directional antennas are used, a desired region can be intensively irradiated with microwaves, and intensity of the microwaves that are emitted can be increased. The antennas used as the emitting portions 12 are, for example, coaxial waveguide converter-attached antennas. For example, the antennas are connected to the coaxial cables 11 via coaxial waveguide converters (not shown) included in the antennas. Typically, waveguides (not shown) are provided between the antenna portions of the coaxial waveguide converter-attached antennas and the coaxial waveguide converters. FIG. 1 shows an example in which pyramidal horn antennas are used as the emitting portions 12.

There is no limitation on the structure of the microwave oscillators 1011, as long as microwaves can be generated. The microwave oscillators 1011 are, for example, semiconductor oscillators. The semiconductor oscillators are microwave oscillators including semiconductor elements and used to generate microwaves. The microwave oscillators 1011 may be microwave oscillators such as magnetrons, klystrons, gyrotrons, or the like.

There is no limitation on the frequency, the intensity, and the like of the microwaves that are emitted by the microwave oscillators 1011. The frequency of microwaves that are emitted by the microwave oscillators 1011 may be, for example, 2.45 GHz, 5.8 GHz, 24 GHz, 915 MHz, or other frequencies ranging from 300 MHz to 300 GHz. The microwaves emitted by the two or more microwave oscillators 1011 typically have the same frequency, but may have different frequencies. The microwaves emitted by the two or more microwave oscillators 1011 may have the same intensity, or may have different intensities.

The power source (not shown) and the like used by the microwave oscillators 1011 to output microwaves may be included in the microwave oscillators 1011, or may be included in the microwave treatment apparatus. Alternatively, the power source and the like may be provided, for example, outside the microwave treatment apparatus. The microwave oscillators 1011 may have amplifiers and the like.

The microwaves emitted by the multiple emitting portions 12 may have the same phase, or may have different phases. If three or more emitting portions 12 are included, emitting portions 12 for emitting microwaves having the same phase and emitting portions 12 for emitting microwaves having different phases may be included in a mixed manner.

In the case where a semiconductor oscillator is used as the microwave oscillators 1011, if microwaves that are generated by one oscillator (not shown) that generates microwaves are branched and the branched microwaves are amplified by different amplifiers and transmitted, for example, the amplifiers may be considered as different semiconductor oscillators.

The irradiating portion 101 is preferably such that the phases of microwaves that are emitted from the multiple emitting portions 12 are controllable. The irradiating portion 101 is preferably such that, for example, the phases of microwaves that are emitted from the multiple emitting portions 12 are individually controllable. It is also possible that two or more of the multiple emitting portions 12 are taken as a group, and the emitting portions 12 are controllable in units of groups. The phase of the irradiating portion 101 is controlled, for example, by the control portion 107.

The irradiating portion 101 is preferably such that, for example, at least some of the multiple emitting portions 12 are controllable so as to generate microwaves having a phase different from that of the other emitting portions 12. Note that the irradiating portion 101 may be controlled such that the microwaves emitted by the multiple emitting portions 12 have the same phase. The controlling the phase may be considered, for example, as controlling an initial phase.

There is no limitation on how the phases of the microwaves that are emitted by the irradiating portion 101 from the multiple emitting portions 12 are controlled. For example, if the irradiating portion 101 has multiple microwave oscillators 1011, it is preferable to use, as the multiple microwave oscillators 1011, microwave oscillators in which phases of microwaves that are generated thereby are controllable. In this case, the later-described control portion 107 may control the phase of the microwaves that are generated by the microwave oscillators 1011, thereby controlling the phase of the microwaves that are emitted from the emitting portions 12. The phases of the multiple microwave oscillators 1011 may be synchronized as appropriate, for example, by performing phase synchronization between the microwave oscillators 1011, or by causing the control portion 107 or the like to output a signal or the like for synchronization. For example, microwave oscillators including phase shifters (not shown) for controlling phases may be used as the microwave oscillators. For example, if the microwave oscillators 1011 are semiconductor oscillators each having an unshown oscillator and amplifier, a semiconductor oscillator in which a phase shifter is provided between the oscillator and the amplifier of the semiconductor oscillator or a semiconductor oscillator in which a phase shifter is connected downstream of the amplifier may be used as the microwave oscillators 1011 whose phases are controllable. Instead of using the microwave oscillators whose phases are controllable, a phase shifter (not shown) for controlling a phase of microwaves that are generated by each microwave oscillator may be provided on the path of, or upstream or downstream of the transmitting units 1012. In this case, the later-described control portion 107 controls each phase shifter, thereby controlling the phase of the microwaves that are generated.

Furthermore, if the irradiating portion 101 has one or more configurations in which microwaves that are generated by one microwave oscillator 1011 are transmitted via a branching structure or the like to multiple transmitting units 1012, the microwaves that are generated by one microwave oscillator 1011 may be branched into multiple parts, the branched microwaves may be input to unshown phase shifters or the like for controlling the phases, and the phase-controlled microwaves may be transmitted to the multiple transmitting units 1012.

If the irradiating portion 101 has one or more configurations in which microwaves that are generated by one microwave oscillator 1011 are transmitted to multiple transmitting units 1012, a phase shifter (not shown) may be provided downstream of the one microwave oscillator 1011, microwaves whose phase has been controlled using the phase shifter may be branched and transmitted to the multiple transmitting units 1012, so that the phases of the microwaves that are transmitted to the multiple transmitting units 1012 and are emitted therefrom can be simultaneously controlled.

The structure and the like of the phase shifters are known techniques, and, thus, in this example, a detailed description thereof has been omitted. Regarding the phase shifters, for example, see the following document: "High-Frequency Circuit Class, V. Control Circuit", online, I-Laboratory, accessed on Mar. 11, 2016, the Internet <URL: http://www1.sphere.ne.jp/i-lab/ilab/kairo/k5/k5_3a.htm>.

In the case of controlling a phase, semiconductor oscillators including semiconductor elements are preferably used as the microwave oscillators because the phase control becomes easy.

It is possible that the irradiating portion 101 can, for example, perform microwave irradiation at two or more different frequencies.

For example, the irradiating portion 101 may change the frequencies of microwaves that are emitted by one or more emitting portions 12, thereby performing microwave irradiation at two or more different frequencies before and after the change. The irradiating portion 101 may emit microwaves having different frequencies from two or more of the multiple emitting portions 12 of the irradiating portion 101, thereby performing microwave irradiation at two or more different frequencies. In this case, for example, one region can be irradiated with microwaves having two or more different frequencies, by moving the emitting portions 12, thereby changing the emitting portions 12 that irradiates the one region with microwaves into the emitting portions 12 that emit microwaves having different frequencies.

For example, the frequencies of microwaves that are emitted by the emitting portions 12 of the irradiating portion 101 are controlled by the later-described control portion 107. For example, the irradiating portion 101 is controlled by the later-described control portion 107 so as to perform microwave irradiation at a frequency according to later-described status information.

If the irradiating portion 101 changes the frequencies of microwaves that are emitted by the emitting portions 12, thereby performing microwave irradiation at two or more different frequencies, there is no limitation on how the emitting portions 12 can perform microwave irradiation at different frequencies. For example, a configuration is possible in which the irradiating portion 101 uses, as the microwave oscillators 1011, one or more semiconductor oscillators in which frequencies of microwaves that are generated thereby are changeable, and the frequencies of microwaves that are generated by the one or more semiconductor oscillators 1011 are changed, so that the emitting portions 12 can perform microwave irradiation at two or more different frequencies. Also, a configuration is possible in which the irradiating portion 101 has, for example, multiple semiconductor oscillators (not shown) with microwaves that are generated thereby having different frequencies, and the one or more semiconductor oscillators that generate microwaves are switched among the multiple semiconductor oscillators, so that the multiple emitting portions 12 can perform microwave irradiation at different frequencies. The semiconductor oscillators in which frequencies of microwaves that are generated thereby are changeable are known techniques, and, thus, in this example, a detailed description thereof has been omitted. As the semiconductor oscillators whose frequencies are changeable, for example, those described in the following URLs are known.

http://www.fcb-microwave.jp/fcb-microwave/wp-content/uploads/CYT-15016.pdf http://www.tokyo-keiki.co.jp/rf/j/products/pdf/2.45_200_hasshinki_j.pdf Furthermore, the frequencies of microwaves that are generated by the microwave oscillator 1011 that are semiconductor oscillators are controlled, for example, by the later-described control portion 107. Regarding the principle and the like in controlling the frequencies of the semiconductor oscillators, for example, see the following URLs and the like.

http://cp.literature.agilent.com/litweb/pdf/00-2564.pdf, http://toragi.cqpub.co.jp/Portals/0/backnumber/2004/05/p098-099.pdf http://www.altima.jp/column/fpga_edison/vco_vcxo.html In FIG. 1, a case will be described as an example in which the microwave oscillators 1011a and 1011b are semiconductor oscillators in which frequencies of microwaves that are generated thereby are changeable, having phase shifters (not shown) for controlling phases.

The moving portion 102 individually moves the multiple emitting portions 12 included in the irradiating portion 101. The individually moving may be considered as independently moving. The moving portion 102, for example, individually moves the emitting portions 12 (e.g., antennas) respectively included in the multiple transmitting units 1012. The moving portion 102 may, for example, individually move the transmitting units 1012 included in the irradiating portion 101, thereby individually moving the emitting portions 12 included in the transmitting units 1012. The moving portion 102 may, for example, individually move end portions that are the emitting portions 12 of multiple waveguides (not shown) included in the irradiating portion 101.

The movements of the emitting portions 12 may be movement in a one-dimensional direction (e.g., movement in a linear direction), may be movement in two-dimensional directions (e.g., movement in a plane, etc.), or, may be movement in three-dimensional directions (e.g., movement in a space, etc.). The movement may be considered to include changing the direction of the emitting portions 12. The direction of the emitting portions 12 is, for example, changing the microwave emission direction, rotation about the emission direction, or the like. For example, the movement may be a combination of movement in one-dimensional to three-dimensional directions and change of the irradiation direction. The changing the irradiation direction of the emitting portions 12 may be, for example, changing the orientation of the antennas functioning as the emitting portions 12.

There is no limitation on the structure and the like of the moving portion 102 for individually moving the multiple emitting portions 12 included in the irradiating portion 101. For example, the moving portion 102 may have two or at least three robot arms 1022. The multiple robot arms 1022 are, for example, the robot arms 1022 that can move independently of each other. The robot arms are also referred to as manipulators. The robot arms 1022 move, for example, their front ends and the like through multiple arms linked via multiple joints that are respectively driven by actuators such as multiple motors. The robot arms 1022 may be any type of robot arms. The robot arms 1022 are, for example, vertical multi-joint robot arms or horizontal multi-joint robot arms. It is preferable that the robot arms 1022 are, for example, n-axis robot arms (n is an integer of 6 or more) because the degree of freedom in the movement is high. The moving portion 102 may include only the multiple robot arms 1022, or may also include other constituent elements and the like. There is no limitation on the size and the like of the robot arms 1022. There is no limitation on the ratio between the size of the robot arms 1022 and the size of the emitting portions 12 installed at the robot arms 1022, and the like. The robot arms, and the control of orientation, operations, and the like of the robot arms are known techniques, and, thus, in this example, a detailed description thereof has been omitted.

For example, if the emitting portions 12 (e.g., antennas) of the multiple transmitting units 1012 are respectively installed at the multiple robot arms 1022 included in the moving portion 102, the emitting portions 12 respectively arranged at the robot arms 1022 can be moved by moving each of the robot arms 1022. For example, when each of the robot arms 1022 is individually moved, the emitting portions 12 respectively attached to the robot arms 1022 can be individually moved. The emitting portions 12 are installed, for example, at so-called hands, hand effectors (not shown), front ends, or the like of the robot arms 1022. Also in the case where the emitting portions 12 are gripped by gripping portions (not shown) or the like provided at hands or the like of the robot arms 1022, it may be considered that the emitting portions 12 are installed at the robot arms 1022. In the case where the transmitting units 1012 have waveguides, end portions of the waveguides can be moved by installing the emitting portions 12 that are the end portions of the waveguides at the robot arms 1022, and moving the robot arms 1022.

For example, it is preferable that the moving portion 102 has the robot arms 1022 in the same number as that of the emitting portions 12 included in the irradiating portion 101. Note that the moving portion 102 may have at least two or more robot arms 1022, and the emitting portions 12 respectively installed at the two or more robot arms 1022 may be allowed to at least individually move.

Also, a configuration is possible in which the emitting portions 12 of the transmitting units 1012 are installed at the robot arms 1022 included in the moving portion 102, and the coaxial cables, the microwave oscillators 1011, and the like other than the emitting portions 12 are installed at locations other than the robot arms 1022. The transmitting units 1012 including the emitting portions 12, the microwave oscillators 1011 whose microwaves are transmitted by the transmitting units 1012, and the like may be installed as appropriate at the robot arms 1022 at which the emitting portions 12 are installed. For example, as shown in FIG. 1, the configuration of the irradiating portion 101a may be installed at the robot arm 1022a included in the moving portion 102, and the configuration of the irradiating portion 101b may be set at the robot arm 1022b.

Note that movable members such as robots other than the robot arms 1022, cranes, or so-called drones of a so-called remote-control type, movable members that move on a rail, or the like may be used as the moving portion 102.

The one or at least two sensors 103 acquire status information. The status information is information indicating a status related to a region irradiated with microwaves emitted by the multiple emitting portions 12. The region is a concept that encompasses, for example, a three-dimensional space as well. The status information may be information indicating a status of one or at least two desired points in a region irradiated with microwaves, or may be information indicating a status of an irradiation target irradiated with microwaves. The desired points refer to a point on which electrical fields of multiple sets of microwaves that are emitted by the multiple emitting portions 12 are concentrated, a point at which multiple sets of microwaves are intensified by each other through mutual interference, a point at which incident microwaves have the same phase, or the like. The region irradiated with microwaves is preferably a region in which microwaves emitted from the multiple emitting portions 12 overlap each other. The status related to a region irradiated with microwaves is, for example, temperature, pressure, humidity, or conductivity in the region. If the region irradiated with microwaves is provided with an apparatus such as an unshown mixing impeller, the status related to the region irradiated with microwaves may be a value indicating a status the load of this apparatus (e.g., torque during rotation of the mixing impeller, etc.). The status of a region irradiated with microwaves may be considered to include a status of an unshown microwave irradiation target, and a status of one or more points irradiated with microwaves. The status of a region is, for example, temperature, viscosity, pH, color, concentration, moisture (water content), sugar content, or conductivity of the region. For example, the one or more sensors 103 are one or more of temperature sensors, specific gravity sensors, pressure sensors, concentration sensors, color sensors, stirring torque sensors, humidity sensors, pH sensors, conductivity sensors, viscosity sensors, moisture sensors, sugar content sensors, and the like. The irradiation target will be described later.

The status information acquired by the sensors 103 may be so-called raw data such as output values of electrical signals acquired by the sensors 103, may be measured values such as values obtained by replacing the raw data with values indicating a measurement target (e.g., values of temperature, pressure, conductivity, moisture amount, etc.), or may be binary values of "high" or "low", or the like. The binary values may be, for example, values acquired by judging whether or not a measured value is higher than a threshold value predetermined for the sensors 103.

If the microwave treatment apparatus 1 has two or more sensors 103, the sensors 103 may be sensors for the same measurement target (e.g., both are temperature sensors, etc.), or may be sensors for different measurement targets.

There is no limitation on the positions at which the one or more sensors 103 are provided, as long as status information can be acquired. FIG. 1 shows a case as an example in which one sensor 103 that is an infrared image sensor for detecting a temperature distribution is arranged such that its detection target region matches a region in which microwaves emitted from the multiple emitting portions 12 overlap each other. Note that the sensors 103 may be any type of sensors, and there is no limitation on the positions at which the sensors 103 are provided, the number of sensors 103, the shapes of the sensors 103, and the like.

In the status association information storage portion 104, one or more pieces of status association information are stored. The status association information is information having information for specifying two or more value ranges indicated by one or more pieces of status information acquired by the one or more sensors 103, and information indicating frequencies of microwaves that are emitted by the irradiating portion 101 respectively corresponding to the two or more ranges. The information for specifying one value range is, for example, information having at least one of the upper limit and the lower limit of values. For example, if the information for specifying one value range has one upper limit, this value range may be considered as a range corresponding to this upper limit or less (or less than the upper limit). For example, if the information for specifying one value range has one lower limit, this value range may be considered as a range corresponding to this lower limit or more (or more than the lower limit). For example, the information for specifying two or more value ranges may be one threshold value, and, in this case, for example, the range corresponding to this threshold value or more may be taken as a first range, and the range corresponding to a value less than this threshold value may be taken as a second range. The two or more ranges are, for example, ranges that do not overlap each other. It is preferable that the range obtained by combining the two or more ranges is, for example, a range including ranges of values that can be acquired by the one or more sensors 103. The one range specified by the information for specifying a range may have information for specifying a range for each of two or more different pieces of status information. The status association information may be, for example, stored in association with the status information (e.g., in association with a status information identifier or the like) in the status association information storage portion 104.

The status association information storage portion 104 may be a non-volatile storage medium, or may be a volatile storage medium. The same applies to the other storage portions. If the status association information is not used, the status association information storage portion 104 may be omitted.

In the irradiation management information storage portion 105, one or more pieces of irradiation management information are stored. One piece of irradiation management information is, for example, (1-A) information having multiple pieces of emission position information and target position information. One piece of irradiation management information may be (1-B) information in which one or more sets of multiple pieces of emission position information respectively indicating positions of the multiple emitting portions 12 for emitting microwaves are stored in association with the order of performing movement. Hereinafter, cases will be described in which the irradiation management information is each of the above-described information.

(1-A) The Case in which Irradiation Management Information is Information Having Multiple Pieces of Emission Position Information and Target Position Information The multiple pieces of emission position information are pieces of information respectively indicating the positions of the multiple emitting portions 12 included in the irradiating portion 101. The emission position information is information indicating the positions of the emitting portions 12, and is, for example, the coordinates of the emitting portions 12. The emission position information may further have information indicating the directions of the emitting portions 12. The information indicating directions is, for example, information indicating microwave irradiation directions as described above, or information indicating rotational angles or the like relative to the irradiation directions of the emitting portions 12. The information indicating irradiation directions is, for example, a directional vector, a combination of an azimuth angle and an elevation angle, or the like. If the directivity of microwaves that are emitted by the emitting portions 12 is high, regions irradiated with microwaves are highly likely to be different depending on the directions of the emitting portions 12, and thus the emission position information preferably has the information indicating irradiation directions. On the other hand, if the directivity of microwaves that are emitted by the emitting portions 12 is low, the emission position information does not have to have the information indicating directions.

One piece of emission position information is information associated with one emitting portion 12. For example, emission position information included in one piece of irradiation management information is stored in association with information for specifying an emitting portion 12 associated therewith, in one piece of irradiation management information. The information for specifying the emitting portion 12 is referred to as emitting portion specifying information, in this example. The emitting portion specifying information is, for example, information for specifying a movable portion, of the moving portion 102, at which the emitting portion 12 is installed. The emitting portion specifying information is an identifier of the emitting portion 12. The identifier of the emitting portion 12 is, for example, code or the like allocated to the emitting portion 12. The emitting portion specifying information is, for example, information for specifying a robot arm 1022 included in the moving portion 102 at which the emitting portion 12 is installed, such as an identifier or the like of the robot arm 1022. The identifier of the robot arm 1022 is, for example, code allocated to the robot arm 1022, address information such as an IP address, or the like.

The target position information is information indicating a position that is a microwave irradiation target. The microwave irradiation target is, for example, a point on which electrical fields of microwaves emitted from the multiple emitting portions 12 are concentrated, a point on which microwaves emitted from the multiple emitting portions 12 are intensified by each other through mutual interference, a point at which microwaves emitted from the multiple emitting portions 12 have the same phase, or the like, and the position indicating an irradiation target is a position indicating such a point.

The multiple pieces of emission position information included in one piece of irradiation management information are, for example, information indicating the positions of the emitting portions 12, in order to concentrate electrical fields of microwaves emitted from the multiple emitting portions 12 or to increase electric field strength, at the position indicated by the target position information included in the same irradiation management information. It is assumed that, in this case, the phases of microwaves that are emitted from the emitting portions 12 are, for example, a predetermined phase.

(1-B) The Case in which Irradiation Management Information is Information in which One or More Sets of Multiple Pieces of Emission Position Information are Stored in Association with Order of Performing Movement The details of the emission position information and the aspect that multiple pieces of emission position information may be stored in association with the emitting portion specifying information are as described above.

The order of performing movement is, for example, the order in which the moving portion 102 moves the multiple emitting portions 12 under control by the control portion 107. If the case where microwave irradiation or treatment through microwave irradiation is performed each time movement is performed, the order of performing movement may be considered as the order in which the microwave irradiation or the treatment is performed. The state in which one or more sets of emission position information are stored in association with the order of performing movement may be, for example, a state in which the pieces of emission position information are arranged and stored in the order of performing movement such that they are read in the order of performing movement, or may be a state in which the pieces of emission position information are stored in association with consecutive numbers indicating the order of performing movement. Also, it may be a state in which the pieces of emission position information are stored in association with times at which movement is performed. The time in this case may be an absolute time such as standard time, or may be a relative time using a start time or the like as a reference. One set of multiple pieces of emission position information may further have information or the like indicating a time to start movement, a time during which movement is stopped after the movement according to one piece of irradiation management information, or the like.

In either (1-A) or (1-B) described above, the one or more pieces of irradiation management information may further have multiple pieces of phase specifying information. The multiple pieces of phase specifying information are information indicating phases when the multiple emitting portions 12 respectively emit microwaves. For example, the information indicating phases is, for example, information indicating a phase difference relative to the microwaves functioning as a reference, or information indicating an initial phase. The phase specifying information is stored in association with information indicating the corresponding emitting portions 12, in the irradiation management information. The phase specifying information may be stored in association with the emission position information associated with information indicating the corresponding emitting portions 12, in the irradiation management information.

There is no limitation on how the irradiation management information stored in the irradiation management information storage portion 105 has been acquired. For example, the irradiation management information used in (1-A) described above may be information having a set of respective pieces of emission position information of predetermined one or more groups of multiple emitting portions 12, and target position information calculated using a predetermined numerical formula or the like using the set of emission position information. The irradiation management information used in (1-A) may be information having a set of respective pieces of emission position information of predetermined one or more groups of multiple emitting portions 12, and target position information indicating positions at which the electrical field or magnetic field has a high intensity as obtained in a predetermined simulation that acquires an electrical field distribution or magnetic field distribution performed using the set of emission position information. For example, the irradiation management information used in (1-B) described above is information having the emission position information of the multiple emitting portions 12 calculated using information such as the coordinates of the positions of predetermined one or more points, in order to concentrate electrical fields of microwaves on these points. The irradiation management information used in (1-B) is information having a set of emission position information of the multiple emitting portions 12, acquired through a simulation, an experiment, or the like, in order to concentrate electrical fields of microwaves on predetermined one or more points. The irradiation management information used in (1-B) is stored in association with the irradiation order in which points are irradiated with microwaves, in the irradiation management information storage portion 105. Note that the set is, for example, a combination that do not overlap each other.

It may be difficult to predict an accurate electrical field or magnetic field distribution depending on the status in which microwave irradiation is performed, and it also may be difficult to calculate a point on which electrical fields or magnetic fields are concentrated, using a numerical formula or the like. The status in which microwave irradiation is performed is, for example, an environment in which microwave irradiation is performed, the shape of an antenna using which microwave irradiation is performed, or the like. For example, in the case where microwave irradiation is performed in an environment in which reflection or the like of microwaves is generated, an electrical field or magnetic field distribution of microwaves is affected by the reflected waves, and, thus, it may be difficult to predict an accurate electrical field or magnetic field distribution, and it also may be difficult to calculate a point on which electrical fields or magnetic fields are concentrated, using a numerical formula or the like. Thus, in such a case, it is preferable to acquire irradiation management information, through a simulation, as described above. The case where microwave irradiation is performed in an environment in which reflection or the like of microwaves is generated is a case in which the microwave treatment apparatus performs microwave irradiation in a vessel, an enclosed space, or the like as described later.

If the irradiation management information is not used, the irradiation management information storage portion 105 may be omitted.

The accepting portion 106 accepts position specifying information. The position specifying information is information indicating a position that is a microwave irradiation target. The position that is a microwave irradiation target is, for example, a position that is an irradiation target of microwaves emitted from the multiple emitting portions 12. The position that is a microwave irradiation target is, for example, a desired point. The point in this case may be considered as one point, or may be considered as a region having a predetermined size and the like. The same applies to the description below. One point in this case is, for example, a point that can be specified with one set of coordinates or the like.

The position that is a microwave irradiation target is, for example, a point that is to be locally heated with microwaves. The position that is a microwave irradiation target is, for example, a point at which the electric field strength of microwaves is required to increase. The position that is a microwave irradiation target is, for example, a point at which microwaves emitted from the multiple emitting portions 12 are required to be intensified by each other through mutual interference. The position that is a microwave irradiation target is, for example, a point on which electrical fields of microwaves emitted from the multiple emitting portions 12 are required to be concentrated. The position that is a microwave irradiation target is, for example, a point at which microwaves emitted from the multiple emitting portions 12 are required to have the same phase.

The accepting is, for example, accepting from an input unit by a user or the like, receiving an input signal transmitted from another device or the like, or reading information from a storage medium or the like. The position specifying information may be input by any unit such as a numeric keypad, a keyboard, a mouse, a menu screen, or the like. The accepting portion 106 may be realized by a device driver for an input unit such as a keyboard, control software for a menu screen, or the like.

The control portion 107 controls movements of the emitting portions 12 by the moving portion 102. For example, the control portion 107 transmits a control signal or the like to the moving portion 102, thereby operating the moving portion 102, and individually controlling the movements of the emitting portions 12 installed at the moving portion 102. The operating the moving portion 102 is, for example, moving the position of the moving portion 102, changing the orientation of the moving portion 102, or the like. The controlling the movements of the emitting portions 12 may be considered, for example, as individually moving the emitting portions 12. For example, the control portion 107 controls the moving portion 102 to operate the moving portion 102, thereby individually moving the emitting portions 12.

For example, in the case where the moving portion 102 has multiple robot arms 1022 at which the multiple emitting portions 12 are respectively installed, the control portion 107 may transmit a control signal or the like to the robot arms 1022 to individually operate the robot arms 1022, thereby individually moving the emitting portions 12. The controlling the robot arms 1022 may be considered as controlling the moving portion 102. The moving in this example is a concept that encompasses moving the orientation or the like of the emitting portions 12 such that the emission directions or the like of the emitting portions 12a and 12b are desired directions. The operation of the robot arms 1022 is, for example, moving the robot arms 1022 or changing their orientations.

For example, in FIG. 1, the control portion 107 may transmit a control signal to operate each of the robot arms 1022a and 1022b included in the moving portion 102, thereby moving the emitting portions 12a and 12b respectively installed at the robot arm 1022a and the robot arm 1022b to desired positions.

For example, the control portion 107 reads data for moving the emitting portions 12 to desired positions, stored in advance in an unshown storage portion or the like, and controls the moving portion 102 to move the emitting portions 12 to the positions indicated by that data. The data is, for example, irradiation management information stored in the irradiation management information storage portion 105. For example, in the case where the moving portion 102 has the robot arms 1022 and one emitting portion 12 is installed at a front end of one robot arm 1022, a configuration is possible in which information, such as irradiation management information, indicating the coordinates of a movement destination of the one emitting portion 12 and the emission direction after the movement (e.g., information having an azimuth angle and an elevation angle, a directional vector, etc.) is stored in advance in an unshown storage portion, and, when performing microwave irradiation, the control portion 107 reads the information indicating the coordinates of the movement destination and the emission direction from the unshown storage portion or the like, calculates information for controlling the robot arm 1022 such that the position and the direction of the front end of the robot arm 1022 match the coordinates and the direction indicated by the read coordinates of the movement destination and directional vector, from the read information indicating the coordinates of the movement destination and the emission direction, and operates the one robot arm 1022 using the calculated information, thereby moving the one emitting portion 12 to a desired position.

The above-described information for controlling the robot arm 1022, calculated from the information of the coordinates of the movement destination and the directional vector of the emitting portion 12 is, for example, information for controlling the position and the like of an arm constituting the robot arm 1022, and specific examples thereof include information for controlling multiple actuators and the like constituting the robot arm 1022. The processing for calculating information for controlling the robot arm 1022 from information such as the coordinates indicating the position of the movement destination and the directional vector of the front end of the robot arm 1022 is a known technique as a technique for controlling the robot arm 1022 and the like, and, thus, in this example, a detailed description thereof has been omitted.

The control portion 107 controls, for example, the moving portion 102, thereby moving one or at least two emitting portions 12 such that microwaves that are emitted from the multiple emitting portions 12 of the irradiating portion 101 overlap each other at least at a desired point. For example, the control portion 107 controls and operates the moving portion 102 (e.g., the one or at least two robot arms 1022 included in the moving portion 102), thereby individually moving the one or at least two emitting portions 12 such that microwaves that are emitted from the multiple emitting portions 12 overlap each other at least at a desired point. If the multiple emitting portions 12 are individually moved in this manner, a desired point can be irradiated with, in an overlapping manner, microwaves emitted from the multiple emitting portions 12. Accordingly, for example, heating such as local heating and uniform heating using a combination of multiple sets of microwave irradiation, which cannot be performed by one set of microwave irradiation, can be performed at a desired point.

Furthermore, the control portion 107 controls, for example, the moving portion 102, thereby moving the one or more emitting portions 12 such that microwaves that are emitted from the multiple emitting portions 12 of the irradiating portion 101 are intensified by each other through mutual interference at a desired point. For example, the control portion 107 controls and operates the moving portion 102 (e.g., the one or at least two robot arms 1022 included in the moving portion 102), thereby individually moving the one or at least two emitting portions 12 such that microwaves that are emitted from the multiple emitting portions 12 are intensified by each other through mutual interference at a desired point. Accordingly, local heating at a desired point, which cannot be performed by one set of microwave irradiation, can be performed.

The desired point is, for example, one or more desired points in a region that is irradiated with, in an overlapping manner, microwaves emitted from the multiple emitting portions 12. The same applies to the control described below. The space between this desired point and the emitting portions 12 is preferably a space whose microwave transmissivity is high, such as a space having a substance whose dielectric constant is low. The same applies to the description below.

Furthermore, the control portion 107 controls, for example, the moving portion 102, thereby moving one or more emitting portions such that electrical fields of microwaves that are emitted from the multiple emitting portions 12 are concentrated on a desired point. The electrical fields of microwaves may be considered, for example, as electrical fields generated by microwaves, or electrical fields of microwaves themselves generated due to the presence of the microwaves. The state in which electrical fields are concentrated is, for example, a state in which the electric field strength increases, a state in which the distribution of the electric field strength increases, or the like. The state in which electrical fields are concentrated is, for example, a state in which the electrical fields are concentrated or the distribution of the electric field strength increases compared with a case in which the positions of the multiple emitting portions 12 are not moved. The positions may be considered to include directions. For example, the control portion 107 controls and operates the moving portion 102 (e.g., one or at least two robot arms 1022), thereby moving the one or more emitting portions 12 such that electrical fields of microwaves that are emitted from the multiple emitting portions 12 are concentrated on a desired point. Accordingly, local heating at a desired point, which cannot be performed by one set of microwave irradiation, can be performed.

Furthermore, the control portion 107 controls, for example, the moving portion 102, thereby moving the emitting portions such that microwaves that are incident on a desired point have the same phase. For example, the control portion 107 controls and operates the moving portion 102 (e.g., one or at least two robot arms 1022), thereby moving the one or at least two emitting portions 12 such that multiple sets of microwaves that are emitted from the multiple emitting portions 12 and incident on a desired point have the same phase. Accordingly, local heating at a desired point, which cannot be performed by one set of microwave irradiation, can be performed.

Hereinafter, control for moving the multiple emitting portions 12 such that microwaves that are emitted from the multiple emitting portions 12 and incident on a desired point have the same phase will be described by way of examples.

Figure 2:
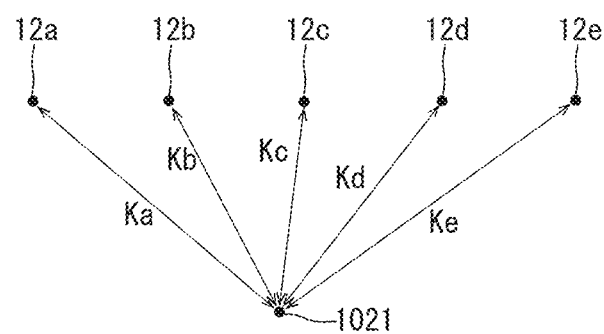
FIG. 2 is a schematic diagram illustrating the microwave treatment apparatus in the embodiment.

FIG. 2 is a schematic diagram illustrating control for moving the multiple emitting portions 12 included in the irradiating portion 101. The control for moving the emitting portions 12 may be considered as controlling the positions of the emitting portions 12. In this example, a case will be described in which the irradiating portion 101 has five emitting portions 12 (hereinafter, referred to as "emitting portions 12a to 12e") such as antennas. In both of first and second examples below, it is assumed that microwaves generated by the emitting portions 12a to 12e have the same output frequency, and the microwaves that are emitted thereby have the same phase. It is assumed that a desired point 1021 is positioned in a region in which microwaves emitted from the multiple emitting portions 12 overlap each other. Distances between the emitting portions 12a to 12e before the movement and the desired point 1021 are respectively taken as distances Ka to Ke. In this example, for the sake of ease of description, the position of the desired point 1021 is set such that the distances Ka to Ke are different from each other. The emitting portions 12a and 12b in FIG. 2 and those in FIG. 1 may be considered to be the same or different from each other.

(2-A) First Example of Movement Control

In order that microwaves that are emitted from the multiple emitting portions 12a to 12e and incident on the desired point 1021 have the same phase, for example, it is sufficient to control the positions of the emitting portions 12a to 12e such that a phase difference caused by a difference between the distances Ka to Ke from the emitting portions 12a to 12e to the desired point 1021 is 0.

Thus, differences between a distance from one emitting portion 12 functioning as a reference among the multiple emitting portions 12 to the desired point 1021, and each of distances respectively from the emitting portions 12a to 12e to the desired point 1021 are calculated, and the differences are respectively divided by wavelengths of the microwaves that are emitted from the emitting portions 12a to 12e to obtain remainders αa to αe (<λ), and the emitting portions 12a to 12e are moved toward the desired point 1021 respectively by the distances indicated by the remainders αa to αe. That is to say, the emitting portions 12a to 12e are moved closer to the desired point 1021. Note that the calculation of the phase difference does not have to be performed for the one emitting portion 12 functioning as a reference, the phase of the one emitting portion 12 functioning as a reference may not be changed, or the phase difference may be 0.

For example, in the case where the emitting portions 12c is taken as the emitting portion 12 functioning the one reference, the difference between the distance Ka and the distance Kc, that is, Ka−Kc is calculated, this difference is divided by the wavelength λ of microwaves emitted by the emitting portions 12 to obtain a remainder αa (αa<λ), and the moving portion 102 is controlled to move the emitting portion 12a closer to the desired point 1021 by the value corresponding to the remainder αa.

In a similar manner, the difference between the distance Kb and the distance Kc, that is, Kb−Kc is calculated, this difference is divided by the wavelength λ of microwaves to obtain a remainder αb (αb<λ), and the moving portion 102 is controlled to move the emitting portion 12b closer to the desired point 1021 by the distance corresponding to αb.

In a similar manner, assuming that the remainders obtained by dividing the differences between each of the distances Kd and Ke and the distance Kc by the wavelength λ are respectively αd and αe, the moving portion 102 is controlled to move the emitting portion 12d and the emitting portion 12e closer to the desired point 1021 respectively by the distances corresponding to αd and αe.

In this example, the distance Kc is used as a distance reference, and thus, the above-described movement distances are phases, using, as a reference, the distance between the emitting portion 12c and the desired point 1021. Thus, the above-described difference between the distances or the like does not have to be calculated for the emitting portion 12c, and, for example, the position of the emitting portion 12c does not have to be changed.

In this example, the emitting portion 12c was used as a reference for the distance, but any emitting portions 12 may be used as a reference for the distance. Any distance may be used as a reference for the distance. In this case, the emitting portions 12 may be moved such that the remainders respectively calculated for the emitting portions 12 have the same value.

Furthermore, the remainders calculated as described above are relative remainders in the case where one distance is used as a reference, and, thus, there is no limitation on how the positions of the emitting portions 12 are moved through control by the control portion 107 on the moving portion 102, as long as the positions of the emitting portions 12 can be changed such that these relative remainders are eliminated as a result. For example, if the remainder of the emitting portion 12a relative to the emitting portion 12c is a certain value γ, the control portion 107 may control the moving portion 102 to move the emitting portion 12a closer to the desired point 1021 by β, or to move the emitting portion 12a closer to the desired point 1021 by ⅓γ and move the emitting portion 12c away from the desired point 1021 by ⅔γ. The same applies to the description below.

(2-B) Second Example of Movement Control

For example, the control portion 107 controls the moving portion 102 to move the emitting portions 12a to 12e closer to the desired point 1021 respectively by the distances indicated by the remainders βa to βe obtained by dividing the distances Ka to Ke by the wavelength λ of microwaves that are generated by the emitting portions 12a to 12e. Note that all of βa to βe are less than λ.

The above-described control is merely an example, and there is no limitation on how the positions of the emitting portions 12a to 12e are changed, as long as the remainders calculated for the multiple emitting portions 12 and the desired point 1021 have the same value.

Above, the case in which the number of desired points 1021 is one was described as an example, but, if the number of desired points is multiple, it is sufficient to determine the positions of the emitting portions 12a to 12e after the movement such that these points have the same phase. Note that, depending on the arrangement of the desired points, it may be impossible to determine the positions such that the multiple points have the same phase.

If the positions of the emitting portions 12a to 12e are controlled in this manner, for example, it is possible to locally heat a desired point.

Above, the case in which five emitting portions 12 are used was described, but the number of emitting portions 12 may be any number that is two or more, and the above-described control can be realized if two or more emitting portions 12 are provided.

Furthermore, an approximation formula or the like capable of calculating an approximate phase difference and the like may be used as appropriate instead of the calculation formula or the like for calculating a phase difference and the like shown in (2-A) and (2-B) described above.

Above, the case and the like in which the positions of the multiple emitting portions 12 are individually moved so as to locally heat one or at least two desired points was described, but, in this embodiment, for example, the multiple emitting portions 12 may be respectively moved to proper positions such that the electrical field distribution is generated more uniformly compared with a case in which a desired region or the like is irradiated with one set of microwaves. Accordingly, it is possible to uniformly heat the desired region as appropriate.

Above, the case in which the phase difference of microwaves emitted from the multiple emitting portions 12 is 0 was described as an example, but, if microwaves emitted from the multiple emitting portions 12 has a phase difference, the emitting portions 12 may be moved such that a desired point is irradiated with microwaves having the same phase emitted from the multiple emitting portions 12 in consideration of this phase difference. For example, if the phase of the emitting portion 12b lags by δ that of the emitting portion 12a, first, the positions of the emitting portion 12a and the emitting portion 12b may be determined as described above assuming that they emit microwaves having the same phase, and, then, the position of the emitting portion 12b may be moved closer to the desired point by the distance corresponding to the above-described phase difference δ. For example, the position of the emitting portion 12b may be moved toward the desired point by λδ from the position determined as realizing the same phase.

The positions to which the multiple emitting portions 12 are moved through control by the control portion 107 on the moving portion 102 such that one or at least two desired points are positions at which microwaves emitted from the multiple emitting portions 12 are intensified by each other through mutual interference may be determined using a method other than that described above. For example, the positions and the like of the multiple emitting portions 12 may be determined such that microwaves are intensified by each other at a desired point, through a simulation, an experiment, or the like performed while changing the positions of the multiple microwave oscillators 1011. In a similar manner, the positions of the multiple emitting portions 12 may be determined such that a desired region is uniformly heated, through a simulation or the like. This region is a concept that encompasses a three-dimensional space as well. The positions and the like of the multiple emitting portions 12 may be determined such that a desired region is uniformly heated, through a simulation.

Hereinafter, in this embodiment, a case will be described as an example in which the control portion 107 controls the phases of microwaves that are emitted by the irradiating portion 101 from the multiple emitting portions 12, using the irradiation management information stored in the irradiation management information storage portion 105, as described above.

For example, in the case where those in which phases of microwaves that are emitted from the multiple emitting portions 12 are controllable are used as the irradiating portion 101 as described above, the control portion 107 may further control the phases of microwaves that are emitted by the irradiating portion 101 from the multiple emitting portions 12. For example, the control portion 107 may individually control movements of one or at least two emitting portions 12 of the irradiating portion 101, and individually control phases of microwaves that are emitted by the irradiating portion 101 from the multiple emitting portions 12. The control portion 107 may, for example, individually control one or more microwave oscillators 1011 whose phases are controllable as described above, thereby changing phases of microwaves that are generated by the one or more microwave oscillators 1011, and emitting the microwaves whose phases have been changed from the multiple emitting portions 12. Also, the control portion 107 may individually control phase shifters (not shown) provided for one or more transmitting units 1012 included in the irradiating portion 101 and used for controlling phases of microwaves that are transmitted by the one or more transmitting units 1012, thereby controlling the phases of microwaves that are transmitted by the transmitting units 1012, and emitting the microwaves whose phases have been changed from the multiple emitting portions 12. Note that there is no limitation on how the irradiating portion 101 controls the phases of microwaves that are emitted from the multiple emitting portions 12.

For example, the control portion 107 may control the irradiating portion 101 to control the phases of microwaves that are emitted by the multiple emitting portions 12, thereby making the microwaves that are emitted by the multiple emitting portions 12 have different phases or have the same phase. The controlling a phase is, for example, generating a phase lead or lag of microwaves that are generated. The controlling a phase may be considered, for example, as controlling or setting an initial phase of microwaves that are emitted from the emitting portions 12. The controlling phases of microwaves that are emitted by the multiple emitting portions 12 may be, for example, relative control or absolute control of the phases of microwaves that are emitted by the multiple emitting portions 12.

If the phase is controlled in this manner, for example, a point on which electrical fields of microwaves are concentrated can be controlled as described later. The configuration and the method in which the control portion 107 controls the phases of the microwave oscillators 1011 are known techniques, and, thus, in this example, a detailed description thereof has been omitted.

The control portion 107 controls the irradiating portion 101, for example, such that at least some of the multiple emitting portions 12 emit microwaves having different phases. The state in which the control portion 107 controls the microwave oscillators 1011, phase shifters (not shown), or the like included in the irradiating portion 101 may be considered as controlling the irradiating portion 101. There is no limitation on the phase and the like of microwaves that are emitted respectively from the multiple emitting portions 12 through control by the control portion 107 on the irradiating portion 101, as long as at least some of the emitting portions 12 can emit microwaves having different phases. For example, the control portion 107 controls the irradiating portion 101 such that three or more emitting portions 12 generate microwaves having two or at least three different phases. For example, the control portion 107 may control the irradiating portion 101 such that some of the multiple emitting portions 12 (not all of them) generate microwaves having the same phase and the other emitting portions 12 generate microwaves having a phase different therefrom. For example, the control portion 107 may perform control such that, in the microwave treatment apparatus 1 shown in FIG. 1, the microwave oscillator 1011a and the microwave oscillator 1011b have different phases.

The control portion 107 controls the phases of microwaves that are emitted by the irradiating portion 101 from the multiple emitting portions 12, for example, such that electrical fields of microwaves that are emitted from the multiple emitting portions 12 are concentrated on one or at least two desired points. The state in which electrical fields are concentrated is, for example, a state in which the electric field strength increases. The state in which electrical fields are concentrated in this case is, for example, a state in which electrical fields are concentrated compared with a case in which the phases of microwaves that are emitted from the multiple emitting portions 12 are not controlled. For example, in the case where microwaves are generated without controlling the phases thereof, for example, without using phase shifters or the like as described above for the microwave oscillators such as magnetrons, microwaves having random phases are generated. The case in which the phases of microwaves are not controlled may be considered as such a case.

The control portion 107 may control the phases of microwaves that are emitted by the irradiating portion 101 from the multiple emitting portions 12, for example, such that one or at least two desired points are positions at which microwaves emitted from multiple positions are intensified by each other through mutual interference. The positions at which microwaves are intensified by each other through mutual interference may be considered, for example, as positions at which intensities of the microwaves increase through mutual interference. The state in which microwaves are intensified by each other may be considered, for example, as a state in which the amplitudes increase. The positions at which microwaves are intensified by each other through mutual interference are, for example, positions at which an electrical field with an intensity that is higher at least than each of the electrical fields respectively obtained from the multiple sets of microwaves that are emitted. The positions at which microwaves are intensified by each other through mutual interference may be, for example, a position not including microwaves that attenuate each other through mutual interference, among the multiple sets of microwaves.

Note that there is no limitation on the height of waves at the desired points. The control portion 107 preferably controls the phases of microwaves that are emitted by the irradiating portion 101 from the multiple emitting portions 12, for example, such that one or at least two desired points are positions at which microwaves emitted from the multiple emitting portions 12 are intensified by each other to the highest level through mutual interference. With this configuration, microwaves emitted from the multiple emitting portions 12 can be concentrated on one or more desired points. Accordingly, one or more desired points can be selectively heated. The control portion 107 may control phases of microwaves that are emitted from three or more emitting portions 12 such that one or more desired points are positions at which two or more sets of microwaves that are emitted from the three or more emitting portions 12 are intensified by each other to the highest level through mutual interference position, and the other sets of microwaves do not at least attenuate the two or more sets of microwaves intensified to the highest level, thereby causing microwaves to be intensified by each other through mutual interference at the desired points.

In the case where the multiple emitting portions 12 generate microwaves having the same frequency, the control portion 107 may control phases of microwaves that are emitted from the emitting portions 12 such that a difference between phases of multiple sets of microwaves that are emitted from the multiple emitting portions 12 is less than $\pi$ at a desired point. In this case, as described above, the desired point is a position at which multiple sets of microwaves do not each other through mutual interference, as a result of which microwaves are intensified by each other through mutual interference at the desired point, and, thus, electrical fields can be concentrated on the desired point.

For example, the control portion 107 may control the phases of microwaves that are emitted by the multiple emitting portions 12 such that microwaves that are incident on one or at least two desired points have the same phase. The state in which multiple sets of incident microwaves have the same phase is, for example, a state in which they have the same phase when they are incident on a desired point. The point at which multiple sets of microwaves are intensified by each other to the highest level is a point at which multiple sets of incident microwaves have the same phase, that is, a point at which the phase difference is 0. Thus, if the phases are controlled such that microwaves that are incident on a desired point have the same phase, the desired point can be a position at which microwaves emitted from multiple positions are intensified by each other to the highest level through mutual interference, and, thus, microwaves emitted from multiple positions can be concentrated on the desired point. Accordingly, a desired point can be selectively heated.

There is no limitation on how the phases of microwaves that are emitted by the emitting portions 12 are determined. For example, there is no limitation on how a combination of the position of each emitting portion 12 controlled by the control portion 107 and the phase of microwaves that are emitted by the emitting portion 12 is determined. For example, after the position of each emitting portion 12 is set to a desired position, the phase of microwaves that are emitted by the emitting portion 12 from the set position may be determined such that microwaves that are incident on one or more desired points have the same phase. Alternatively, for example, if the position of each emitting portion 12 is predetermined, the phase of microwaves that are emitted by the emitting portion 12 from the predetermined position may be determined such that microwaves that are incident on one or more desired points have the same phase. Alternatively, after the phase of microwaves that are emitted by each emitting portion 12 is set, the position of the emitting portion 12 may be determined such that microwaves that are incident on one or more desired points have the same phase when microwaves having the determined phases are emitted from the emitting portions 12. Note that the position of each emitting portion 12 and the phase of microwaves that are emitted by the emitting portion 12 may be simultaneously determined as a combination with which microwaves that are incident on one or more desired points have the same phase.

There is no limitation on how the phase of microwaves that are emitted by each emitting portion 12 is determined such that microwaves that are incident on one or more desired points have the same phase. For example, phases of microwaves when they are output are determined such that there is no phase difference caused by distances between the multiple emitting portions 12 and a desired point, or a difference between the distances. The phases that are determined in this case may be considered as an initial phase.

Hereinafter, examples of phase control performed such that microwaves that are emitted from the multiple emitting portions 12 and incident on a desired point have the same phase will be described with reference to FIG. 2 above.

(3-A) First Example of Phase Control

In order to perform phase control such that microwaves that are emitted from the multiple emitting portions 12$a$ to 12$e$ and incident on the desired point 1021 have the same phase, for example, it is sufficient to control phases of microwaves that are emitted from the emitting portions 12$a$ to 12$e$ such that a phase difference caused by a difference between the distances Ka to Ke from the emitting portions 12$a$ to 12$e$ to the desired point 1021 is 0.

Thus, remainders $\alpha a$ to $\alpha e$ ($<\lambda$) are obtained as in (1-A) above, the values obtained by dividing the $\alpha a$ to $\alpha e$ by the wavelength $\lambda$ are multiplied by $2\pi$ to obtain phase differences, and settings are performed such that the phases of the microwaves that are emitted from the emitting portions 12$a$ to 12$e$ lead, by the phase differences, the phase of microwaves that are generated by one microwave oscillator 1011 that performs microwave irradiation from one emitting portion 12 functioning as the above-described reference. Note that the calculation of the phase difference does not have to be performed for the one emitting portion 12 functioning as a reference, the phase of the one emitting portion 12 functioning as a reference may not be changed, or the phase difference may be 0.

For example, in the case where the emitting portions 12$c$ is taken as the emitting portion 12 functioning the one reference, the difference between distance Ka and the distance Kc is divided by the wavelength $\lambda$ of microwaves emitted by the emitting portions 12 to obtain a remainder $\alpha a$ ($\alpha a<\lambda$), the value obtained by dividing $\alpha a$ by the wavelength $\lambda$ is multiplied by $2\pi$ to obtain a value $2\pi\alpha a/\lambda$, and the irradiating portion 101 is controlled such that the phase of microwaves that are generated by the emitting portion 12$a$ leads, by this value, the phase of microwaves that are generated by the emitting portion 12$c$.

In a similar manner, the difference between the distance Kb and the distance Kc is divided by the wavelength $\lambda$ of microwaves to obtain a remainder $\alpha b$ ($\alpha b<\lambda$), which is used to further calculate a value $2\pi\alpha b/\lambda$, and the irradiating portion 101 is controlled such that the phase of microwaves that are generated by the emitting portion 12b leads, by this value, the phase of microwaves that are generated by the emitting portion 12c.

In a similar manner, assuming that the remainders obtained by dividing the differences between each of the distances Kb, Kd, and Ke and the distance Kc by the wavelength λ are respectively αb, αd, and αe (<λ), the irradiating portion 101 is controlled such that the phases of microwaves that are generated by the emitting portions 12b, 12d, and 12e respectively lead, by 2παb/λ, 2παd/λ, and 2παe/λ, the phase of microwaves that are generated by the emitting portion 12c.

In this example, the distance Kc is used as a distance reference, and thus, the above-described phases are phases using, as a reference, the phase of the emitting portion 12c. Thus, the above-described phase difference does not have to be calculated for the emitting portion 12c, and, for example, the phase of the emitting portion 12c does not have to be changed, and the phase difference may be 0.

In this example, the case was described in which the emitting portion 12c was taken as the phase reference, but any emitting portion 12 may be taken as the phase reference. Instead of using the distance between an emitting portion 12 and the desired point 1021, any distance may be used. In this case, the control portion 107 may control the phases of microwaves that are emitted from the emitting portions 12 such that the phase of each emitting portion 12 is shifted (e.g., a phase lead is generated), by the phase difference calculated for that emitting portion 12, compared with the case in which all emitting portions 12 have the same phase.

Furthermore, the phase differences calculated as described above are relative phase differences in the case where one distance is used as a reference, and, thus, there is no limitation on how the control portion 107 controls the phases of the emitting portions 12, as long as the phases of microwaves that are emitted from the emitting portions 12 can be controlled such that these relative phase differences are eliminated as a result. For example, if the phase difference of the emitting portion 12a relative to the emitting portion 12c is π, the control portion 107 may control the irradiating portion 101 such that the phase of the emitting portion 12a leads, by 7C, the phase of the emitting portion 12c or such that the phase of the emitting portion 12a leads by ⅓π and the phase of the emitting portion 12c lags by ⅔π. The same applies to the description below.

(3-B) Second Example of Phase Control

For example, the remainders βa to βe, obtained by dividing the above-described distances Ka to Ke by the wavelength λ of microwaves that are generated by the emitting portions 12a to 12e, are further divided by the wavelength λ of microwaves that are emitted by the emitting portions 12a to 12e, and are multiplied by 2π to obtain respective values, and the irradiating portion 101 is controlled such that the emitting portions 12a to 12e emit microwaves whose phases lead, by the obtained values, compared with the case in which all emitting portions 12 have the same phase. Note that all of βa to βe are less than λ.

For example, it is sufficient that the phase of the emitting portion 12a leads by 2πβa/λ, the phase of the emitting portion 12b leads by 2πβb/λ, the phase of the emitting portion 12c leads by 2πβc/λ, the phase of the emitting portion 12d leads by 2πβd/λ, and the phase of the emitting portion 12e leads by 2πβe/λ.

The above-described control is merely an example, and there is no limitation on how the phases of microwaves that are output by the emitting portions 12a to 12e change, as long as microwaves that are emitted from the multiple emitting portions 12 and incident on the desired point 1021 have the same phase.

Above, the case in which the number of desired points 1021 is one was described as an example, but, if the number of desired points is multiple, it is sufficient to determine the phases of the emitting portions 12a to 12e such that these points have the same phase. Note that, depending on the arrangement of the desired points, it may be impossible to determine the phases such that the multiple points have the same phase.

If the phases of microwaves that are emitted by the emitting portions 12a to 12e are controlled in this manner, it is not necessary to physically change the arrangement and the like of the emitting portions 12, and, thus, for example, even in the case where the position and the like of a desired point are changed, it is possible to quickly change the desired point on which microwaves are concentrated, merely by causing the control portion 107 to control the phases of microwaves that are emitted by the emitting portions 12 so as to change the phases of microwaves when they are generated. For example, it is possible to move a point on which microwaves are concentrated, so as to follow the change of the position of the desired point.

Furthermore, an approximation formula or the like capable of calculating an approximate phase difference, an initial phase, and the like may be used as appropriate instead of the calculation formula or the like for calculating a phase difference, an initial phase, and the like shown in (3-A) and (3-B) described above.

Above, the case and the like in which the phases of microwaves that are emitted from the multiple emitting portions 12 are controlled so as to locally heat one or at least two desired points was described, but, in this embodiment, for example, the phases of the multiple emitting portions 12 may be respectively controlled such that the electrical field distribution is generated more uniformly compared with a case in which a desired region or the like is irradiated with one set of microwaves. Accordingly, it is possible to uniformly heat a desired region as appropriate. This region is a concept that encompasses a three-dimensional space as well.

The phases of the microwaves that are emitted from the multiple emitting portions 12 controlled by the control portion 107 such that one or at least two desired points are positions at which microwaves emitted from the multiple emitting portions 12 are intensified by each other through mutual interference may be determined using a method other than that described above. For example, regarding combinations of the position of each emitting portion 12 and the phase of microwaves that are emitted by that emitting portion 12 as described above, a combination and the like of the position of each emitting portion 12 and the phase of microwaves that are emitted by that emitting portion 12 may be determined such that microwaves are intensified by each other at a desired position, through a simulation, an experiment, or the like. In a similar manner, a combination of the position and the phase of microwaves that are emitted from the multiple emitting portions 12 for uniformly heating a desired region may be determined through a simulation or the like.

For example, regarding an electrical field distribution and the like of microwaves, a microwave distribution and the like are affected by an environment in which microwave irradiation is performed, the shape or the material of a microwave irradiation target, presence or absence of other microwave absorbers or microwave reflectors, and the like.

Thus, in real space, electrical fields of microwaves cannot absolutely be concentrated on a desired point, even through microwave irradiation according to the positions and the phases of the emitting portions 12 calculated as described above. The same applies to cases in which electrical fields are uniformly distributed in a desired region. Thus, the position of each emitting portion 12, the phase of microwaves that are emitted by each emitting portion 12, or a combination thereof for concentrating electrical fields on a desired position can be determined through a simulation or the like.

In this manner, it is possible to concentrate electrical fields of microwaves on one or more desired points, and to uniformly distribute electrical fields of microwaves in a desired region, by controlling movements of one or more of the multiple emitting portions 12, and controlling the phases of microwaves that are emitted by the multiple emitting portions 12, as described above. Accordingly, it is possible to properly control microwave irradiation through a combination of phase control and movement control. For example, it is possible to properly heat a desired point with microwaves.

For example, it is possible to concentrate electrical fields of microwaves emitted from the multiple emitting portions 12 on a desired point, and to locally heat the desired point, by controlling the irradiating portion 101 such that microwaves that are emitted by the multiple emitting portions 12 have the same phase, and controlling the moving portion 102 such that the multiple emitting portions 12 are moved to positions that are equally distant from the desired point.

Furthermore, it is possible to concentrate electrical fields of microwaves on a desired point, by arranging the multiple emitting portions 12 so as not to be equally distant from the desired point, and controlling the phases of microwaves that are emitted by the multiple emitting portions 12.

Furthermore, the multiple emitting portions 12 may be respectively moved to positions from which microwaves can be easily emitted to a desired point, and the phases of microwaves that are emitted from the emitting portions 12 may be controlled such that electrical fields of microwaves that are emitted by the multiple emitting portions 12 at those positions are concentrated on the desired point. The positions from which microwaves can be easily emitted to a desired point are, for example, positions of the emitting portions 12 with a path to the desired point not being blocked by another object whose microwave transmissivity is low, object that reflects microwaves, or the like.

Furthermore, if the multiple emitting portions 12 are, for example, highly directional antennas or the like, the multiple emitting portions 12 may be moved such that microwaves that are emitted from the multiple emitting portions 12 overlap each other at a desired point, and the phases of microwaves that are emitted from the emitting portions 12 may be controlled such that electrical fields of microwaves are concentrated on the desired point.

The control portion 107 may change, in time series, the positions of one or more of the multiple emitting portions 12, the phases of the microwaves that are emitted, or a combination of the position and the phase, thereby moving, that is, changing, in time series, a point on which electrical fields of multiple sets of microwaves are concentrated. For example, the positions of one or more of the multiple emitting portions 12 or the phases of the microwaves that are emitted may be changed in time series such that electrical fields are concentrated in time series on multiple desired points. For example, the control portion 107 may change, in time series, the positions of one or more of the multiple emitting portions 12 or the phases of the microwaves that are emitted, such that each of multiple desired points sequentially becomes the above-described desired point. For example, it is possible to sequentially heat multiple points that are irradiation targets, by changing, in time series, the position, the phase, or a combination of the position and the phase as described above to move, in time series, a point on which electrical fields of microwaves are concentrated. Also, it is possible to uniformly heat a desired region, by continuously changing a point on which electrical fields are concentrated, for example, in the desired region (e.g., to change so as to scan the region) to uniformly irradiate the desired region with microwaves as a result.

Furthermore, the control portion 107 may cause, for example, the multiple emitting portions 12 to repeatedly perform movement and stoppage in an alternate manner, and cause two or more emitting portions 12 to emit desired microwaves during the stoppage as described above. For example, the control portion 107 may cause two or more emitting portions 12 to emit microwaves such that, during the stoppage, electrical fields of microwaves are concentrated on one or more desired points or microwaves are intensified by each other at one or more desired points. Furthermore, during emission of microwaves, as described above, the phases of microwaves that are emitted by the two or more emitting portions 12 may be individually controlled such that electrical fields of microwaves are concentrated on one or more desired points or such that microwaves are intensified by each other at one or more desired points. The control portion 107 may control movements of the emitting portions 12 such that electrical fields of microwaves are concentrated on different points or such that microwaves are intensified by each other at different points at each stoppage. This movement may be movement of one or more of the multiple emitting portions 12 that emit microwaves during the stoppage.

Furthermore, the control portion 107 may switch, in time series, concentration of electrical fields of multiple sets of microwaves and uniform distribution of electrical fields of multiple sets of microwaves in a desired region, by changing, in time series, the positions of one or more of the multiple emitting portions 12, the phases of the microwaves that are emitted, or a combination thereof.

The time-series change may be continuous change, or may be stepwise change. If it is stepwise change, the time necessary for each step can be set, for example, as appropriate. Alternatively, the control portion 107 may allow each step to progress according to the output of an unshown sensor or the like.

The control portion 107 controls, for example, the phases of microwaves that are emitted by the irradiating portion 101 from the multiple emitting portions 12, using the irradiation management information stored in the above-described irradiation management information storage portion 105. For example, the control portion 107 reads phase specifying information (e.g., initial phase value) indicating the phase of microwaves that are emitted by each emitting portion 12 stored in association with an identifier or the like of that emitting portion 12, from the irradiation management information stored in the irradiation management information storage portion 105, and causes the emitting portion 12 to emit microwaves having the phase indicated by the phase specifying information, using the read phase specifying information. The phase specifying information included in the irradiation management information is, for example, information for specifying the phase of each emitting portion 12 determined as described above. Hereinafter, in this embodiment, a case will be described as an example in which the control portion 107 controls the phases of the emitting portions 12, using the phase specifying information included in the irradiation management information.

In the case where the irradiating portion 101 can perform microwave irradiation at two or more different frequencies as described above, the control portion 107 may control the irradiating portion 101, thereby controlling the frequencies of microwaves that are emitted by the irradiating portion 101 to a desired region. For example, in the case where the irradiating portion 101 is such that the frequencies of microwaves that are emitted from the emitting portions 12 are changeable, the control portion 107 may control the irradiating portion 101, thereby controlling the frequencies of microwaves emitted from one or at least two emitting portions 12. For example, the control portion 107 may control one or at least two microwave oscillators 1011 whose frequencies are changeable, included in the irradiating portion 101, to change the frequencies of microwaves that are generated by the microwave oscillators 1011, thereby changing the frequencies of one or at least two sets of microwaves that are emitted, into different frequencies.

Furthermore, in the case where the irradiating portion 101 has multiple emitting portions 12 that emit microwaves having two or more different frequencies, the control portion 107 may control the moving portion 102 to control the positions of the multiple emitting portions 12, thereby changing the emitting portions 12 that emit microwaves to a desired region into the emitting portions 12 that emit microwaves having different frequencies, thereby changing the frequencies of microwaves that are emitted to the desired region. For example, it is possible that one or at least two emitting portions 12 that emit microwaves having a first frequency are moved to positions from which microwaves can be emitted to a desired region, and are caused to emit microwaves having the first frequency, after which one or at least two emitting portions 12 that emit microwaves having a second frequency that is different from the first frequency to positions from which microwaves can be emitted to the desired region, and are caused to emit microwaves having the second frequency. When moving the one or at least two emitting portions 12 that emit microwaves having the second frequency, it is preferable to move the one or at least two emitting portions 12 that emit microwaves having the first frequency to different positions.

For example, the control portion 107 may change the frequencies such that microwaves that are emitted by the two or more emitting portions 12 have the same frequency, or may change the frequencies such that the microwaves have different frequencies. For example, the control portion 107 may control the positions of the emitting portions 12 and control the phases or the like as described above in combination, thereby further controlling the microwaves that are emitted by the emitting portions 12.

The control portion 107 controls the irradiating portion 101 so as to perform microwave irradiation at a frequency according to the one or more pieces of status information acquired by the one or more sensors 103. For example, the control portion 107 controls the irradiating portion 101 according to the one or more pieces of status information acquired by the one or more sensors 103, thereby changing the frequencies of microwaves that are emitted by the irradiating portion 101. For example, the control portion 107 controls the irradiating portion 101 so as to perform microwave irradiation at a frequency that provides a high specific dielectric loss in a desired region that is irradiated with microwaves, according to the one or more pieces of status information acquired by the one or more sensors 103. The control portion 107 may control the irradiating portion 101 so as to perform microwave irradiation at a frequency that provides a high specific dielectric loss in a region that is irradiated with microwaves, according to the one or more pieces of status information acquired by the one or more sensors 103. For example, the control portion 107 controls the irradiating portion 101 according to the one or more pieces of status information acquired by the one or more sensors 103, thereby changing the frequencies of microwaves that are emitted by the irradiating portion 101 so as to provide a high specific dielectric loss in a desired region. For example, it is possible to increase the heating efficiency by changing the frequencies of microwaves that are emitted by the irradiating portion 101 so as to provide a high specific dielectric loss according to the status information. "So as to provide a high specific dielectric loss" refers to, for example, a state in which the specific dielectric loss is higher than that before the frequency change.

Typically, a substance that is to be irradiated with microwaves, such as an irradiation target, has a specific dielectric loss that changes in accordance with a change in a status of the substance itself or an environment in which the substance is arranged. Furthermore, the specific dielectric loss changes also in the case where a change in the status or the like causes a reaction such as a chemical reaction or the like of the substance, which results in a change in the substance or a change in the physical properties. That is to say, it can be assured that the specific dielectric loss of a substance changes in accordance with the status information. This means that, for example, in the case where a substance is heated with microwaves, the heating efficiency changes in accordance with the status information. Thus, in this embodiment, if the control portion 107 controls the irradiating portion 101 according to the status information, thereby changing the frequencies of microwaves that are emitted by the irradiating portion 101 from the multiple emitting portions 12 into frequencies according to the status information, the heating efficiency at the irradiation target can be improved.

Figure 3:
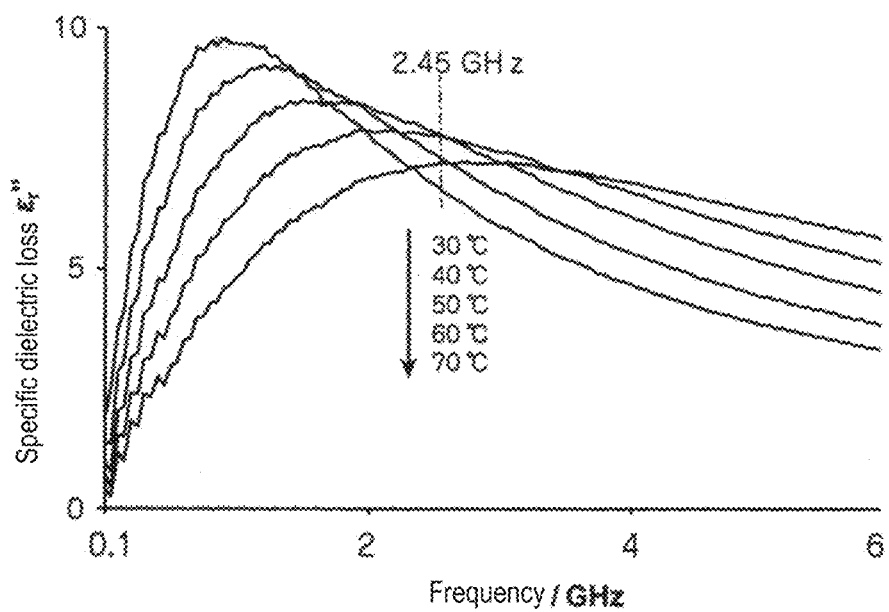
FIG. 3 is a graph illustrating the microwave treatment apparatus in the embodiment.

FIG. 3 is a graph showing a relationship between the specific dielectric loss and the frequency at each temperature of ethanol. FIG. 3 is a graph disclosed in the document "Horikoshi Satoshi and three others, "Microwave Chemistry", Sankyo Shuppan Co., Ltd., p.113".

As shown in FIG. 3, for example, if the temperature, which is an example of the status information, of ethanol changes, the specific dielectric loss for each frequency changes. Thus, in the case of ethanol, for example, it is possible to improve the heating efficiency, by performing microwave irradiation at a frequency that provides a high specific dielectric loss, preferably at a frequency that provides the highest specific dielectric loss, at each temperature at the time of microwave irradiation.

Hereinafter, in this embodiment, a case will be described as an example in which, for example, one or more microwave oscillators 1011 included in the irradiating portion 101 are semiconductor oscillators in which frequencies of microwaves that are generated thereby are changeable, and the control portion 107 controls the irradiating portion 101 such that the microwaves that are generated by the one or more microwave oscillators 1011 have frequencies according to the status information, thereby controlling the irradiating portion 101 to perform microwave irradiation at a frequency according to the status information. The control portion 107 outputs, for example, a control signal for changing a frequency, to the one or more microwave oscillators 1011 included in the irradiating portion 101, thereby changing the frequencies of microwaves that are generated by the microwave oscillators 1011, and changing the frequencies of microwaves that are emitted by the one or at least two emitting portions 12. The control signal may be a signal for specifying a frequency after change, or may be a signal or the like for driving the microwave oscillators 1011 so as to generate microwaves having a frequency after change. Note that the control signal may be any control signal, as long as it is a signal for controlling the one or more microwave oscillators 1011 so as to generate microwaves having a desired frequency.

There is no limitation on, for example, how the control portion 107 controls the frequency of microwaves that are emitted by the irradiating portion 101 from the multiple emitting portions 12 to be frequencies according to the status information. Hereinafter, assuming that the status information is raw data, measured values, or the like as described above, a case (4-A) of using status association information to emit microwaves having a frequency according to the status information, from the one or at least two emitting portions 12, and a case (4-B) of using a function to emit microwaves having a frequency according to the status information will be described. It is assumed that, in this example, the multiple emitting portions 12 are controlled so as to emit microwaves having the same frequency.

The control portion 107 controls the irradiating portion 101, for example, using one or more pieces of using the status association information stored in the status association information storage portion 104, such that microwaves that are emitted by the irradiating portion 101 have a frequency corresponding to the range to which a value indicated by the status information acquired by the one or more sensors 103 belongs.

For example, the control portion 107 judges to which range one or more pieces of status information acquired by the one or more sensors 103 belong, among the two or more ranges regarding one or more pieces of status information indicated by the status association information corresponding to the one or more pieces of status information, and controls the irradiating portion 101 so as to perform microwave irradiation at a frequency corresponding to the range to which the one or more pieces of status information are judged to belong. For example, the control portion 107 acquires information indicating the frequency associated with the range to which the status information is judged to belong, and controls the irradiating portion 101, that is, one or more semiconductor oscillators 1011 included in the irradiating portion 101 so as to emit microwaves having the frequency specified by the information.

The information indicating the frequency of microwaves may be any information, as long as it can indicate the frequency of microwaves that are emitted by the irradiating portion 101 as a result, and it may be a value of the frequency, a control signal used for performing control such that microwaves that are emitted by the irradiating portion 101 have a desired frequency, a parameter value used in the control, or the like. The same applies to the description below.

For example, in the case where the two or more sensors 103 are sensors having the same measurement target, the control portion 107 may acquire one value (e.g., an average value, an intermediate value, a maximum value, etc.) acquired through predetermined statistical processing on pieces of status information respectively acquired by the two or more sensors 103, as status information representing the pieces of status information respectively acquired by the two or more sensors 103, and acquire information indicating the frequency, from the status association information, using the status information instead of the above-described status information acquired by one sensor 103.

Furthermore, the information indicating two or more ranges regarding a value indicated by pieces of status information respectively acquired by two or more sensors 103 may be, for example, information indicating a combination of two or more of the ranges regarding a value indicated by pieces of status information respectively acquired by two or more different sensors 103. In this case, the information indicating frequencies of microwaves emitted by the irradiating portion 101 respectively corresponding to the two or more ranges is, for example, information indicating frequencies of microwaves that are emitted by the irradiating portion 101 associated with sets of information for specifying ranges respectively including values indicated by different pieces of status information acquired by the two or more different sensors 103. For example, in the case where the status information acquired by a first sensor 103 is a value within a range A1 and the status information acquired by a second sensor 103 is a value within a range $\alpha 1$, microwaves that are emitted by the irradiating portion 101 are controlled so as to have a first frequency corresponding to this combination. In the case where the status information acquired by the first sensor 103 is a value within the range A1 and the status information acquired by the second sensor 103 is a value within a range $\beta 1$, microwaves that are emitted by the irradiating portion 101 are controlled so as to have a second frequency corresponding to this combination. In the case where the status information acquired by the first sensor 103 is a value within a range B1 and the status information acquired by the second sensor 103 is a value within the range $\beta 1$, microwaves that are emitted by the irradiating portion 101 are controlled so as to have a third frequency corresponding to this combination. It is assumed that the range A1, the range B1, the range $\alpha 1$, and the range $\beta 1$ have values that do not overlap each other. Furthermore, it is assumed that the first to third frequencies are different frequencies.

It is preferable that, in the status association information storage portion 104, for example, status association information corresponding to irradiation targets, types of one or more sensors 103, and the like are stored in advance.

The control portion 107 may perform processing that judges whether or not a condition prepared in advance is satisfied, thereby performing judgement processing that is similar to the judgement processing using the status association information, and this processing may be considered to substantially correspond to the processing using the status association information.

The control portion 107 controls the irradiating portion 101, using a function of values indicated by one or at least two pieces of status information and information indicating frequencies of microwaves that are emitted by the irradiating portion 101, such that microwaves that are emitted by the irradiating portion 101 from the multiple emitting portions 12 have a frequency corresponding to values indicated by the pieces of status information respectively acquired by the one or more sensors 103. The function of values indicated by the status information and information indicating frequencies of microwaves that are emitted by the irradiating portion 101 is, for example, an approximation formula indicating the relationship between a value indicated by the status information, and information indicating a microwave frequency that provides a high specific dielectric loss at the value indicated by the status information. Such an approximation formula can be produced, for example, from a simulation test result, an experiment result, or the like. The information indicating a frequency is, for example, a value indicating a frequency. The frequency that provides a high specific dielectric loss is preferably a frequency that provides the highest specific dielectric loss, among the frequencies of microwaves that can be emitted by the irradiating portion 101 whose frequency is changeable, but may be considered, at least, as a frequency that does not provide the lowest specific dielectric loss, or a frequency that provides a specific dielectric loss higher than the average.

For example, the control portion 107 acquires information (e.g., a value) indicating a frequency corresponding to a value indicated by the status information acquired by the sensors 103, using the function corresponding to the status information acquired by the sensors 103. For example, a value indicated by the status information acquired by the sensors 103 is substituted as an argument for the function, so that information indicating the frequency is acquired. The control portion 107 controls the irradiating portion 101 so as to emit microwaves having the frequency indicated by the acquired information indicating the frequency. It is sufficient that the function is stored in advance in an unshown storage portion or the like. There is no limitation on how to acquire the function.

In the case where the status information acquired by the one or more sensors 103 is a binary value as described above, information having, in association with each other, two values indicated by the status information and information indicating the frequencies of microwaves respectively associated with the two values may be stored in an unshown storage medium or the like, information indicating a frequency of microwaves according to the status information acquired by the one or more sensors 103 may be acquired from this information, and the control portion 107 may control the irradiating portion 101 so as to emit microwaves having the frequency indicated by the acquired information indicating the frequency. This information also may be considered as an example of the above-described status association information.

There is no limitation on the time when the control portion 107 controls the frequency of microwaves that are emitted by the irradiating portion 101 from the multiple emitting portions 12. For example, the above-described frequency control processing may be repeatedly performed, when the irradiating portion 101 starts irradiation, or each time a fixed or irregular period of time specified in advance elapses while the irradiating portion 101 is performing microwave irradiation.

The control portion 107 may perform control for causing the irradiating portion 101 to perform microwave irradiation (e.g., control to start or stop the irradiation) and the like. The control portion 107 may control the output and the like of microwaves that are emitted by the irradiating portion 101, according to the status information acquired by the one or more sensors 103. The outputs of microwaves that are generated by the multiple microwave oscillators 1011 included in the irradiating portion 101 may be individually controlled. The control of irradiation start and the control of output and the like are known techniques, and, thus, in this example, a detailed description thereof has been omitted.

If the status information acquired by the sensors 103 is not used by the control portion 107 for controlling the frequency and the like, the sensors 103 may be omitted.

Hereinafter, a case will be described as an example in which the control portion 107 controls the frequency of microwaves that are emitted by the irradiating portion 101 and the like, using the one or more pieces of using the status association information stored in advance in the status association information storage portion 104.

The control portion 107, the sensors 103, the moving portion 102 and the like may be connected to each other via wired connection or wireless connection.

The control portion 107 may be realized typically by an MPU, a memory, or the like. Typically, the processing procedure of the control portion 107 is realized by software, and the software is stored in a storage medium such as a ROM. Note that it may be realized also by hardware (a dedicated circuit).

If it is not necessary to accept the position specifying information as in the case where the control portion 107 does not use the irradiation management information described in (1-A), the accepting portion 106 may be omitted.

The microwave treatment apparatus 1 of this embodiment may be arranged in any space. For example, the microwave treatment apparatus 1 may be arranged in an open space or a free space. The open space may be considered, for example, as a space other than a closed space such as those inside a reactor or a vessel. For example, the microwave treatment apparatus 1 may be arranged in a building inside a plant. Furthermore, the microwave treatment apparatus 1 may be arranged in outer space or the like.

In this embodiment, there is no limitation on the microwave irradiation target. Hereinafter, examples of the microwave irradiation target of the microwave treatment apparatus 1 according to this embodiment will be described.

The irradiation target may be, for example, a single substance, or may be a mixture of two or more types of substances. The irradiation target may be, for example, a substance having impurities and the like. The irradiation target may be, for example, a solid such as powders, grains, or pellets, or may be a flowable irradiation target. The flowable irradiation target is, for example, a liquid content. The liquid irradiation target may be, for example, a material having a high flowability such as water, oil, aqueous solution, or colloidal solution, or may be a material having a low flowability such as slurry or suspension. In the case where a chemical reaction or the like in the irradiation target produces a product material from the raw material, the irradiation target may be considered to contain the product material. That is to say, the irradiation target may be a raw material and/or a product material. For example, in the case of performing esterification in the irradiation target, fat and oils and alcohol may be used as the raw material.

The irradiation target may have, for example, a processing target that is to be subjected to processing that is performed using microwave irradiation. The treatment may be any treatment, and, for example, may be treatment including heating through microwave irradiation, or may be treatment including a heating step for causing one or more reactions. The one or more reactions may be, for example, chemical reactions or the like, or may be treatment other than chemical reactions. The chemical reactions are, for example, bonding, decomposition, denaturation, or the like of one or more substances constituting the processing target. One or more sets of treatment may be heating treatment, drying treatment including heating, pasteurization treatment, sterilization treatment, or the like. One or more sets of treatment may be treatment that fires, solidifies, or molds a substance that is plastic or curable with heat or electromagnetic waves, using microwave irradiation, or heating through microwave irradiation. The one or more sets of treatment may be treatment that, for example, deforms a substance, through microwave irradiation, or heating through microwave irradiation. The treatment may include treatment or steps in which heating is not necessary. The one or more reactions may be, for example, a combination of two or more of these reactions.

The irradiation target may be, for example, a mixture of one or at least two types of raw materials and one or at least two types of catalysts. A catalyst that is to be mixed with the raw material may be a heterogeneous catalyst such as a solid catalyst, or may be a homogeneous catalyst such as a liquid catalyst. The irradiation target is contained in an unshown vessel or the like, and may form a fluidized bed in this vessel, but there is no limitation to this. There is no limitation on the shape of a solid catalyst. Examples of the shape of the solid catalyst include various grains, a solid cylinder, a sphere, a pellet, a ring, a shell, and the like. The solid catalyst having these shapes may or may not be hollow. The solid catalyst may or may not be porous. The solid catalyst may be, for example, a microwave-absorbing or microwave-sensitive catalyst, but there is no limitation to this. If the solid catalyst is a microwave-absorbing or microwave-sensitive catalyst, the solid catalyst is heated with microwaves during microwave irradiation, and a chemical reaction near the solid catalyst is facilitated.

Note that the microwave absorptivity and the microwave sensitivity depend on the frequency of microwaves used in irradiation, the temperature of the irradiation target, and the like. For example, materials that have a high dielectric loss factor, at the frequency of microwaves used and the temperature inside an unshown vessel or the like in which the raw material is arranged, provide a high microwave absorptivity. Accordingly, for example, a solid catalyst containing such a highly microwave-absorbing material may be used. For example, if microwaves at 2.45 GHz are irradiated, examples of the microwave-absorbing material include carbon (e.g., graphite, carbon nanotube, activated carbon, etc.) except for fullerene, iron, nickel, cobalt, ferrite, and the like. Accordingly, the solid catalyst may contain such a microwave-absorbing material. Specifically, the solid catalyst may be a composite in which such a microwave-absorbing or microwave-sensitive material and a metal or metal oxide are combined, a composite in which such a microwave-absorbing or microwave-sensitive material and a catalyst such as alkali catalyst or acid catalyst are combined, or a composite in which a microwave-absorbing or microwave-sensitive material, a catalyst such as alkali catalyst or acid catalyst, and a metal or metal oxide are combined. The composite may be formed, for example, through physical adsorption, chemical bonding, alloying, or other methods. In the case where the unshown vessel is a flow-type vessel such as a so-called flow-type reactor, a content that is the raw material or a content that is a mixture of the raw material and the solid catalyst is loaded on the upstream side in the vessel.

Next, a first example of an operation of the microwave treatment apparatus 1 will be described with reference to the flowchart in FIG. 4. In this example, a case will be described as an example in which the control portion 107 controls the moving portion 102, thereby moving the multiple emitting portions 12, using the irradiation management information described in (1-A) above.

(Step S101) The accepting portion 106 judges whether or not it has accepted position specifying information from a user, an unshown another apparatus, or the like. If it has accepted position specifying information, the procedure advances to step S102, and, if not, the procedure returns to step S101.

(Step S102) The control portion 107 acquires multiple pieces of emission position information associated with the target position information corresponding to the position specifying information accepted by the accepting portion 106 in step S101, from the one or at least two pieces of irradiation management information stored in the irradiation management information storage portion 105. For example, the control portion detects irradiation management information having target position information that matches the position specifying information accepted in step S101, and acquires multiple pieces of emission position information included in the detected irradiation management information. At this time, it is preferable to acquire pieces of emitting portion specifying information respectively associated with the multiple pieces of emission position information as well. The target position information corresponding to the position specifying information is, for example, target position information that matches the position specifying information, or target position information indicating the closest position to the position specifying information.

(Step S103) The control portion 107 acquires multiple pieces of phase specifying information respectively corresponding to the multiple pieces of emission position information acquired in step S102, from the irradiation management information. For example, the control portion 107 acquires multiple pieces of phase specifying information associated with the target position information corresponding to the position specifying information accepted by the accepting portion 106 in step S101, from the one or at least two pieces of irradiation management information stored in the irradiation management information storage portion 105. For example, multiple pieces of phase specifying information included in the irradiation management information detected in step S102 are acquired. At this time, it is preferable to acquire pieces of emitting portion specifying information respectively associated with the multiple pieces of phase specifying information as well. There is no limitation on the order in which the processes in steps S102 and S103 are performed. When acquiring multiple pieces of emission position information corresponding to the target position information in step S102, pieces of phase specifying information corresponding to the same emission position information may be acquired, and pieces of emitting portion specifying information respectively associated with the multiple pieces of emission position information may be further acquired.

(Step S104) The control portion 107 controls the moving portion 102 such that the emitting portions 12 respectively corresponding to the emission position information move positions indicated by the multiple pieces of emission position information acquired in step S102. The emitting portions 12 respectively corresponding to the emission position information are the emitting portions 12 specified with the emitting portion specifying information associated with emission position information. For example, in the case where the moving portion 102 has the multiple robot arms 1022 at which the multiple emitting portions 12 are respectively installed, the control portion 107 controls the robot arms 1022 at which the emitting portions 12 are installed, indicated by the emitting portion specifying information corresponding to the emission position information acquired in step S102, thereby operating the robot arms 1022 such that the emitting portions 12 are at positions indicated by the emission position information.

(Step S105) The control portion 107 controls the irradiating portion 101 using the multiple pieces of phase specifying information acquired in step S103, thereby causing the emitting portions 12 respectively corresponding to the multiple pieces of phase specifying information to start irradiation with microwaves having the phases indicated by the phase specifying information. The emitting portions 12 corresponding to the phase specifying information are, for example, the emitting portions 12 specified with the emitting portion specifying information associated with the phase specifying information. For example, the control portion 107 performs phase change by controlling the phases generated by the microwave oscillators 1011 for generating microwaves that are emitted by the emitting portions 12 or by controlling the phase of the microwaves that are transmitted by the transmitting units 1012 and respectively emitted from the emitting portions 12, using phase shifters (not shown) or the like, such that microwaves having phases indicated by the phase specifying information are emitted from the emitting portions 12. The irradiating portion 101 performs, for example, microwave irradiation at a frequency specified by default or the like.

(Step S106) The one or more sensors 103 start to acquire status information. The sensors 103 acquire status information, for example, at predetermined time intervals, and transmit it to the control portion 107. The sensors 103 may accumulate the acquired status information in association with the acquisition time or the like in an unshown storage medium or the like.

(Step S107) The control portion 107 judges whether or not it is the time to perform frequency changing processing. For example, it is judged whether or not a predetermined period of time has elapsed after the start of irradiation or the previous frequency changing processing, and, if the predetermined period of time has elapsed, it is judged to be the time to perform the changing processing. If it is the time to perform the changing processing, the procedure advances to step S108, and, if not, the procedure advances to step S110.

(Step S108) The control portion 107 judges to which range a value indicated by the status information, preferably the latest status information, transmitted from the sensors 103 belongs, among the two or more ranges included in the status association information stored in the status association information storage portion 104, and acquires information indicating the frequency corresponding to the range to which the value belongs, from the status association information. The control portion 107 may perform the above-described judgment for a value indicated by the status information such as the latest status information accumulated by the sensors 103.

(Step S109) The control portion 107 controls the one or more microwave oscillators 1011 included in the irradiating portion 101 so as to generate the frequency indicated by the information indicating the frequency acquired in step S108. For example, if the frequency indicated by the information indicating the frequency acquired in step S108 is different from the frequency of microwaves in the previous output from the irradiating portion 101, the frequency that is generated by the microwave oscillators 1011 is to be changed. On the other hand, for example, if the frequency indicated by the information indicating the frequency acquired in step S108 is the same as the frequency of microwaves in the previous output from the irradiating portion 101, the frequency is not to be change. If it is not necessary to change the frequency, the control for changing the frequency does not have to be performed.

(Step S110) The control portion 107 judges whether or not to end the microwave irradiation. For example, if a predetermined period of time has elapsed after the start of irradiation, it may be determined that the irradiation is to be ended. If a predetermined period of time or a period of time associated with the position specifying information has elapsed after the movement according to the position specifying information is ended, it may be determined that the irradiation is to be ended. If the status information that is information or the like indicating that the status is a predetermined status is acquired, it may be determined that the irradiation is to be ended. If an end instruction is accepted from a user or the like via an unshown accepting portion or the like, it may be determined that the irradiation is to be ended. The irradiation may be ended by individually controlling or simultaneously controlling the multiple emitting portions 12. If the irradiation is to be ended, the microwave irradiation is ended, and the procedure returns to step S101, and, if not, the procedure returns to step S107.

Next, a second example of an operation of the microwave treatment apparatus 1 will be described with reference to the flowchart in FIG. 5. In this example, a case will be described as an example in which the control portion 107 controls the moving portion 102, thereby moving the multiple emitting portions 12, using the irradiation management information described in (1-B) above. In FIG. 5, steps denoted by the same step numbers are the same or similar processing steps in FIG. 4, and, thus, a detailed description thereof has been omitted.

(Step S201) The control portion 107 substitutes 1 for a counter m.

(Step S202) The control portion 107 judges whether or not the irradiation target information with the movement order m is stored in the irradiation management information storage portion 105. For example, the control portion 107 judges whether or not the irradiation target information stored $m^{-th}$ is stored in the irradiation management information storage portion 105. Alternatively, the control portion 107 judges, for example, whether or not information indicating the order m, such as irradiation target information associated with a consecutive number indicating the order m, is stored in the irradiation management information storage portion 105. If it is stored, the procedure advances to step S203, and, if not, the procedure is ended.

(Step S203) The control portion 107 acquires multiple pieces of emission position information included in the irradiation target information with the movement order m, from the irradiation management information stored in the irradiation management information storage portion 105. At this time, it is preferable to acquire pieces of emitting portion specifying information respectively associated with the multiple pieces of emission position information as well. The processes from steps S201 to S203 may be considered as processes that acquire multiple pieces of emission position information, from the irradiation management information stored in the irradiation management information storage portion 105, according to the order of performing movement using the moving portion 102.

(Step S204) The control portion 107 acquires multiple pieces of phase specifying information respectively corresponding to the multiple pieces of emission position information acquired in step S203, from the irradiation management information. For example, the control portion 107 acquires multiple pieces of phase specifying information included in the irradiation target information with the movement order m, from the irradiation management information stored in the irradiation management information storage portion 105. For example, the control portion 107 acquires multiple pieces of phase specifying information included in the irradiation management information whose emission position information was acquired in step S203. At this time, it is preferable to acquire pieces of emitting portion specifying information respectively associated with the multiple pieces of phase specifying information as well. There is no limitation on the order in which the processes in steps S203 and S204 are performed. When acquiring multiple pieces of emission position information included in the irradiation management information with the movement order m in step S203, pieces of phase specifying information corresponding to the emission position information may be acquired, and pieces of emitting portion specifying information respectively associated with the multiple pieces of emission position information may be further acquired. The procedure advances to step S104.

In step S104 of the flowchart in FIG. 5, the control portion 107 performs control using the multiple pieces of emission position information acquired in step S203. In step S105, the control portion 107 performs control using the multiple pieces of phase specifying information acquired in step S204.

(Step S205) If it is judged in step S110 that the irradiation is to be ended, the control portion 107 increments the counter m by 1, and the procedure returns to step S202.

Note that the procedure is terminated by powering off or an interruption at the end of the process in the flowchart in FIG. 5.

Figure 4:
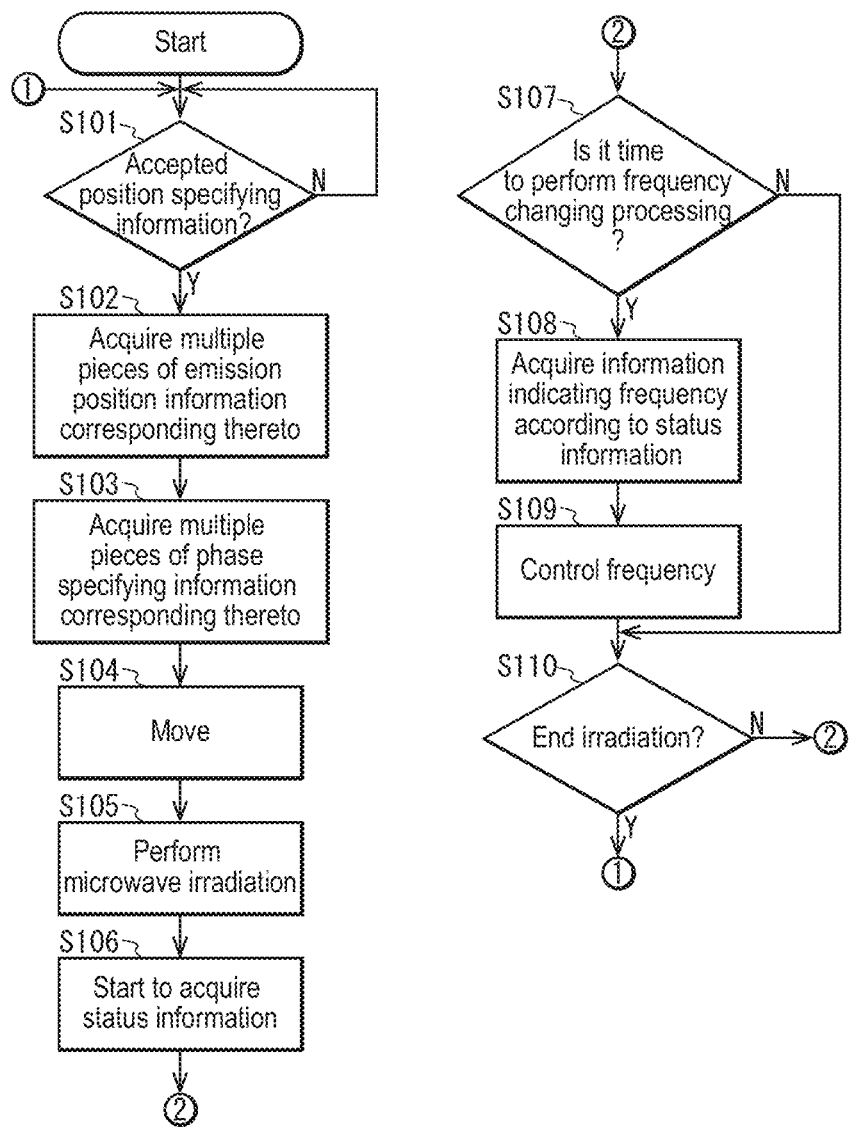
FIG. 4 is a flowchart illustrating an operation of the microwave treatment apparatus in the embodiment.
Figure 5:
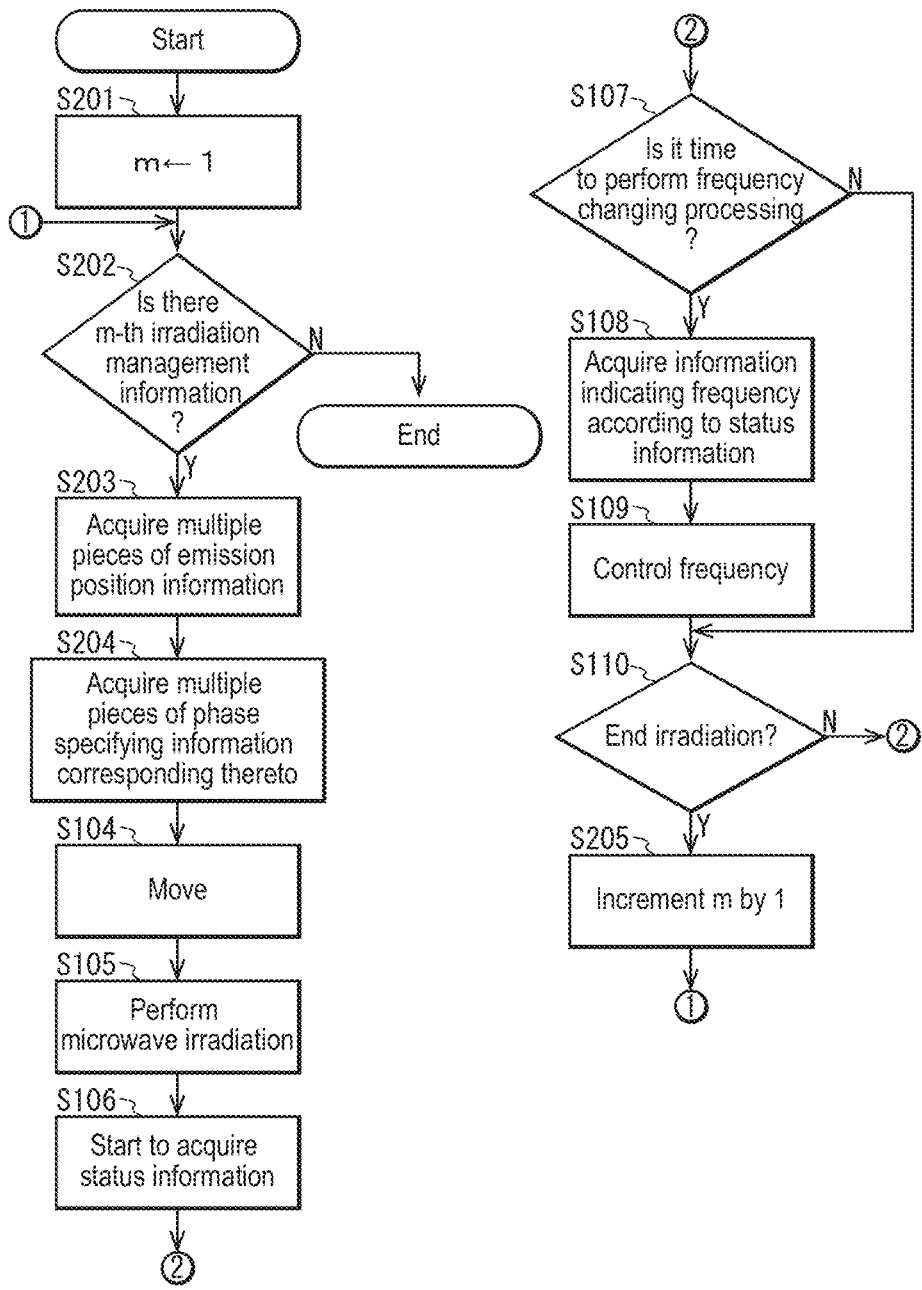
FIG. 5 is a flowchart illustrating a second example of an operation of the microwave treatment apparatus in the embodiment.

In step S105 of the flowcharts shown in FIGS. 4 and 5, microwave irradiation at a default frequency, but it is also possible that, before microwave irradiation is performed, the acquisition of the status information in step S106 is started, and the processes in steps S108 and S109 are performed, so that microwave irradiation at a frequency according to the status information can be performed. The acquisition of the status information in step S106 may be started before step S105.

In the flowchart in FIG. 4, if phase control is not performed, the phase control processes in steps S103 and S105 may be omitted. In the flowchart in FIG. 5, if phase control is not performed, the phase control processes in steps S204 and S105 may be omitted.

Furthermore, in the flowchart in FIGS. 4 and 5, if frequency control is not performed, the processes from steps S106 to S109 may be omitted.

Hereinafter, specific operations of the microwave treatment apparatus 1 in this embodiment will be described by way of examples. In this example, a case will be described in which the microwave treatment apparatus 1 shown in FIG. 1 is used.

In Specific Example 1, as in the flowchart shown in FIG. 4, a case will be described in which the control portion 107 controls the moving portion 102 for performing microwave irradiation, using the irradiation management information described in (1-A) above. Note that, in this example, the frequency of microwaves that are emitted by the irradiating portion 101 is not controlled.

FIG. 6 shows an irradiation management information management table for managing the irradiation management information stored in the irradiation management information storage portion 105. The irradiation management information management table has the attributes "ID", "target position", "emission A", "emission B", "phase A", "phase B", and "time". An attribute value of "ID" is an identifier for managing the irradiation management information. It is assumed that, in this example, each record (row) of the irradiation management information management table shows one piece of irradiation management information. An attribute value of "target position" is target position information, and, in this example, refers to coordinates in a three-dimensional space. "Emission A" is emitting portion specifying information for specifying the emitting portion 12a installed at the front end of the robot arm 1022a, and an attribute value of "emission A" is emission position information of the emitting portion 12a specified with the emitting portion specifying information "emission A". An attribute value of "emission A" is a combination of coordinates in a three-dimensional space indicating the position of the emitting portion 12a installed at the front end of the robot arm 1022a, an azimuth angle, and an elevation angle. The same applies to "emission B". That is to say, "emission B" is emitting portion specifying information for specifying the emitting portion 12b installed at the front end of the robot arm 1022b, and an attribute value of "emission B" is emission position information of the emitting portion 12b specified with the emitting portion specifying information "emission B". An attribute value of "emission B" is a combination of coordinates in a three-dimensional space indicating the position of the emitting portion 12b installed at the front end of the robot arm 1022b, an azimuth angle, and an elevation angle. In this example, attribute values of "emission A" and "emission B" are respectively expressed by "(x coordinate, y coordinate, z coordinate), (azimuth angle $\theta$, elevation angle $\varphi$)". An attribute value of "phase A" is phase specifying information for specifying a phase of the microwaves that are output from the emitting portion 12a, and an attribute value of "phase B" is phase specifying information for specifying a phase of the microwaves that are output from the emitting portion 12b. Values of the phases indicated by the phase specifying information are values determined in advance such that electrical fields of microwaves that are emitted by the emitting portions 12a and 12b from the positions indicated by the position specifying information are concentrated on the position indicated by the target position information. "Time" is a microwave irradiation time. It is assumed that, in FIG. 6, x, y, z, xa1, ya1, za1, xb1, yb1, zb1, $\theta$b1, $\varphi$a1, $\lambda$a1, $\lambda$b1, t1, and the like may be any values.

The irradiation management information stored in the irradiation management information storage portion 105 is, for example, information acquired through simulations.

In this specific example, coordinates of multiple virtual lattice points in a three-dimensional space that is set to be a space that can be irradiated with microwaves from the two emitting portions 12a and 12b are taken as target position information of multiple pieces of irradiation management information, and "emission A" and "emission B" of each piece of irradiation management information are the positions of the two emitting portions 12a and 12b when the position indicated by the target position information irradiated with microwaves. The positions of the two emitting portions 12a and 12b are, in this example, set to be the positions of the emitting portions 12a and 12b attached to the front ends of the robot arms 1022a and 1022b. The positions of the emitting portions 12a and 12b are, for example, positions at which microwaves are emitted from antennas functioning as the emitting portions 12.

Figure 7A:
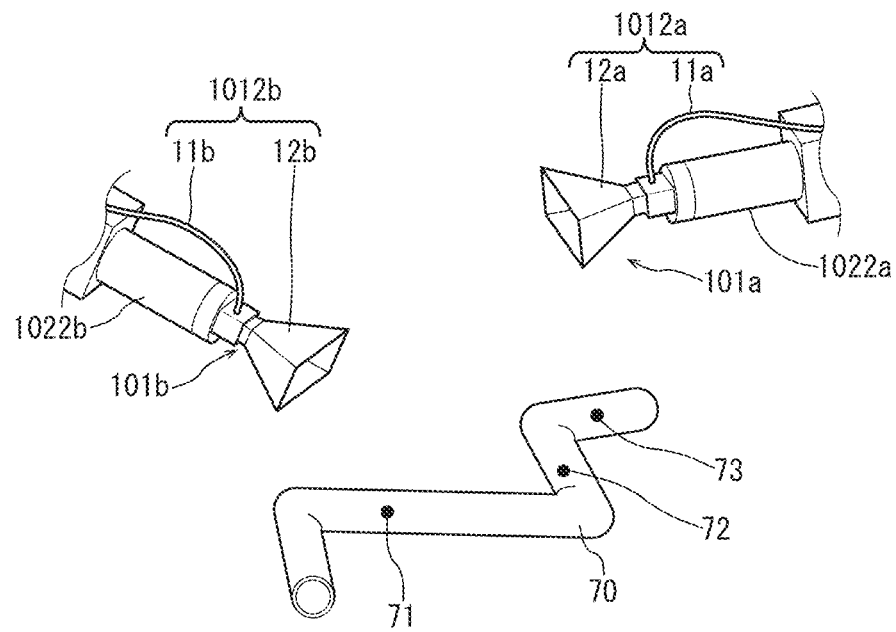
FIG. 7 shows a schematic diagram of a main portion illustrating an operation of the microwave treatment apparatus in the embodiment (FIG. 7(a)), and a schematic diagram showing a state in which microwave irradiation is being performed (FIG. 7(b)).
Figure 7B:
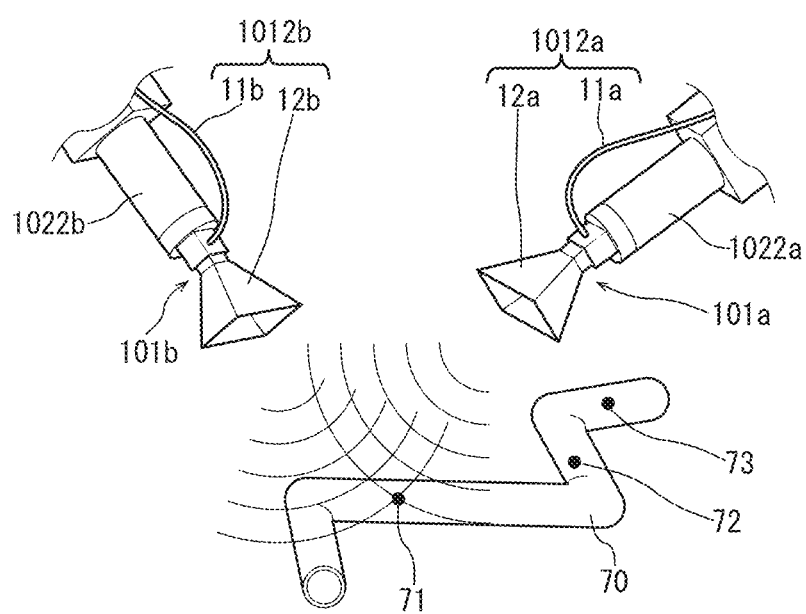

FIG. 7 shows a schematic diagram of a main portion showing a state in which an irradiation target 70 is arranged in a region that can be subjected to treatment by the microwave treatment apparatus 1 (FIG. 7(a)), and a schematic diagram of a main portion showing a state in which the irradiation target 70 is irradiated with microwaves after the emitting portions 12a and 12b have been moved (FIG. 7(b)). It is assumed that the irradiation target 70 is, in this example, a pipe-shaped object. The region that can be subjected to treatment is, for example, a range that can be irradiated with microwaves in an overlapping manner by moving the emitting portions 12a and 12b.

First, a user operates an unshown input device or the like to input coordinates (X1, Y1, Z1) of a desired point 71 of the irradiation target 70 that is required to be locally heated using the microwave treatment apparatus 1. The coordinate values are accepted by the accepting portion 106. Note that X1, Y1, and Z1 may be any values.

The control portion 107 detects a record, that is, irradiation management information in which, in the irradiation management information management table shown in FIG. 6, coordinates that are an attribute value of "target position" match the coordinates accepted by the accepting portion 106, and acquires attribute values of "emission A", "emission B", "phase A", "phase B", and "time" of the detected record. Then, for example, the acquired attribute values of "emission A" and "phase A" are accumulated in association with the emitting portion specifying information "emission A" in the unshown storage portion. The attribute values of "emission B" and "phase B" are accumulated in association with the emitting portion specifying information "emission B" in the unshown storage portion. The acquired attribute value of "time" is also accumulated in the unshown storage portion. In this example, assuming that the coordinates accepted by the accepting portion 106 match the attribute value (x3, y3, z3) of "target position" of the record with "ID" being "003", the control portion 107 acquires attribute values of "emission A", "emission B", "phase A", "phase B", and "time" of the record with "ID" being "003", and accumulates them as described above. The accumulating may be temporarily storing. It is assumed that the acquired attribute value of "time" is "t3".

The control portion 107 reads the position specifying information that is the attribute value of "emission A" accumulated in association with the emitting portion specifying information "emission A", that is, the coordinates (xa3, ya3, za3), the azimuth angle θa3, and the elevation angle φa3, and controls the moving portion 102 such that the emitting portion 12 specified with the emitting portion specifying information "emission A" is moved to the position indicated by the read position specifying information. Specifically, if it is registered in advance in an unshown storage portion or the like that the position of the emitting portion 12a indicated by "emission A" is the position of the front end of the robot arm 1022a, the control portion 107 calculates information for controlling each portion of the robot arm 1022a in order to move the front end of the robot arm 1022a to the position indicated by the read information, using the read coordinates (xa3, ya3, za3), azimuth angle θa3, and elevation angle φa3. For example, movement amounts and the like of one or more actuators provided on the robot arm 1022a are calculated. The control portion 107 moves the front end of the robot arm 1022a to the position indicated by the read position specifying information, using the calculated values. Accordingly, the emitting portion 12a installed at the front end of the robot arm 1022a can be moved to the position indicated by the position specifying information corresponding to the emitting portion specifying information "emission A".

In a similar manner, the control portion 107 reads the position specifying information accumulated in association with the emitting portion specifying information "emission B", and, as described above, moves the front end of the robot arm 1022b to the position indicated by the position specifying information, thereby moving the emitting portion 12b installed at the front end of the robot arm 1022b to the position indicated by the position specifying information corresponding to the emitting portion specifying information "emission B". It is assumed that the positions of the emitting portions 12a and 12b after the movement are positions from which microwaves emitted from these emitting portions can overlap each other at least at the desired point 71.

The control portion 107 reads phase specifying information "λa3" that is the attribute value of "phase A" accumulated in association with the emitting portion specifying information "emission A", and causes the emitting portion 12a to emit microwaves whose phase has been shifted by λa3. For example, the control portion 107 controls the microwave oscillator 1011a, or an unshown phase shifter connected to the microwave oscillator such that microwaves whose phase has been shifted by λa3 are generated, transmitted via the coaxial cable 11a of the transmitting unit 1012a, and emitted from the emitting portion 12a.

Furthermore, as in the case of the irradiating portion 101a, the control portion 107 reads the phase specifying information "λb3" that is the attribute value of "phase B" accumulated in association with the emitting portion specifying information "emission B", and causes the emitting portion 12b to emit microwaves whose phase has been shifted by λb3. In this example, the frequencies of microwaves that are emitted from the emitting portions 12a and 12b are the same frequency set by default.

In this example, as shown in FIG. 7(b), microwaves emitted from the emitting portions 12a and 12b overlap each other at least at the desired point 71, and, as described above, if the phase control is performed according to the phase specifying information, electrical fields of microwaves that are emitted by the emitting portions 12a and 12b from the positions indicated by the position specifying information are concentrated on the desired point 71 that matches the position indicated by the target position information, and, thus, it is possible to concentrate electrical fields of microwaves on the desired point 71, by emitting the above-described microwaves from the emitting portions 12a and 12b, and to locally heat the desired point 71.

After microwave irradiation is performed for "t3" that is the acquired time, the microwave irradiation is ended.

In this specific example, it is possible to emit microwaves from the multiple emitting portions 12a and 12b such that electrical fields are concentrated on a desired point specified by a user, and to locally heat the desired point.

In Specific Example 2, as in the flowchart shown in FIG. 5, a case will be described in which the control portion 107 controls the moving portion 102 for performing microwave irradiation, using the irradiation management information described in (1-B) above. Note that, in this example, the frequency of microwaves that are emitted by the irradiating portion 101 is not controlled.

FIG. 8 shows an irradiation management information management table, stored in the irradiation management information storage portion 105. The irradiation management information management table in Specific Example 2 has the attributes "order", "emission A", "emission B", "phase A", "phase B", and "time". The attributes "emission A", "emission B", "phase A", "phase B", and "time" are similar to those in FIG. 6, and, thus, a detailed description thereof has been omitted. "Order" is a numeric value indicating the order of performing movement of the emitting portion 12 using the irradiation management information corresponding to each record (row), and, in this example, an emitting portion 12 with a smaller value is to be moved earlier. In FIG. 8, attribute values represented by the same alphanumeric characters as those in FIG. 6 do not absolutely have to be the same values. It is assumed that attribute values of "emission A", "emission B", "phase A", and "phase B"

included in one piece of irradiation management information are the positions of the emitting portions 12a and 12b and the phases (e.g., initial phase) of microwaves that are emitted from the emitting portions 12a and 12b, for concentrating microwaves on a predetermined desired point.

First, the control portion 107 detects a record with "order" being "1", from the irradiation management information management table shown in FIG. 8, and acquires attributes value of "emission A", "emission B", "phase A", "phase B", and "time" of this record.

As in the above-described specific example, the robot arms 1022a and 1022b are operated using the position specifying information that is the acquired attribute values of "emission A" and "emission B", so as to move the emitting portions 12a and 12b installed at the front ends thereof. Then, microwaves whose phases have been controlled are emitted from the emitting portions 12a and 12b using the phase specifying information that is the acquired attribute values of "phase A" and "phase B". Accordingly, it is possible to concentrate microwaves emitted from the emitting portions 12a and 12b on a predetermined desired point. The desired point in this example is, for example, a point 72 in FIG. 7(a). The microwave irradiation is performed during the time indicated by "t1" that is the acquired attribute value of "time". Accordingly, it is possible to locally heat the desired point 72.

If the microwave irradiation is ended, the control portion 107 detects a record with "order" being "2", from the irradiation management information management table shown in FIG. 8, acquires attribute values of "emission A", "emission B", "phase A", "phase B", and "time" of this record, operates the robot arms 1022a and 1022b as described above so as to move the emitting portions 12a and 12b, and performs irradiation with microwaves whose phases have been controlled during the time indicated by "t2" that is the attribute value of "time". The desired point that is irradiated with microwaves having the same phase in this example is a point 73 in FIG. 7(a). Accordingly, it is possible to locally heat the desired point 73.

In a similar manner, the irradiation management information with "order" being "3" and subsequent orders in the irradiation management information management table is sequentially subjected to the same processing.

In this specific example, it is possible to change a point on which electrical fields of microwaves are concentrated, according to the order specified in advance, by performing microwave irradiation according to the irradiation management information as shown in FIG. 8, and to continuously change points that are locally heated with microwaves.

Specific Example 3

In Specific Example 3, an example of processing in which, in Specific Example 1 above, the frequency of microwaves that are emitted by the irradiating portion 101 is controlled will be described. In this example, a case will be described in which, in Specific Example 1 above, the robot arms 1022a and 1022b are moved to move the emitting portions 12a and 12b, and microwaves whose frequencies have been controlled are emitted from the emitting portions 12a and 12b, so that electrical fields of microwaves are concentrated on one desired point 71 and this point is locally heated.

In this example, for the sake of ease of description, ethylene glycol placed in an unshown vessel or the like is arranged as the irradiation target at the desired point 71, which is an aspect different from that in Specific Furthermore, it is assumed that the microwave oscillators 1011a and 1011b used in this specific example are semiconductor oscillators in which phases of microwaves that are generated thereby are changeable within the range from 2.4 GHz to 2.5 GHz.

Furthermore, in this specific example, infrared temperature sensors that can detect temperature are installed as the sensors 103, for example, above the irradiation target. In this specific example, the sensors 103 may be referred to as infrared temperature sensors 103.

As in Specific Example 1 above, when microwaves whose phases have been controlled are emitted from the emitting portions 12a and 12b, electrical fields of the microwaves are concentrated on the desired point 71 at which the irradiation target is arranged, and the point 71 is locally heated. Accordingly, ethylene glycol that is the irradiation target is heated. In this example, for the sake of description, it is assumed that the frequencies of microwaves that are initially generated by the microwave oscillators 1011a and 1011b are 2.45 GHz as a default value.

The infrared temperature sensor 103 acquires a temperature value of the irradiation target, and transmits the acquired temperature value to the control portion 107. The control portion 107 receives the temperature value transmitted from the infrared temperature sensor 103.

FIG. 9 shows an example of a status association information management table for managing the status association information stored in the status association information storage portion 104. The status association information management table has the attributes "status", "threshold value", "less than threshold value", and "threshold value or more". "Status" is information indicating the type of targeted status information. "Status" may be information for identifying one or more sensors 103. An attribute value of "temperature" shows that the targeted status information is a value indicating a temperature (liquid temperature of ethylene glycol, in this example) acquired by the infrared temperature sensor. In this example, since the number of sensors 103 is one, the attribute "status" may be omitted. "Threshold value" is a threshold value for dividing the range of possible values of the status information into two ranges, and may be considered as information for specifying the two ranges. In this example, 60° C. is provided as the threshold value, and the region of temperature values that can be acquired by the infrared temperature sensor 103 is divided at the threshold value into a region of less than 60° C. and a region of 60° C. or more. "Less than threshold value" and "threshold value or more" are information indicating a frequency of the microwave oscillators 1011 in the case where the value acquired by the infrared temperature sensor 103 is less than the threshold value, and information indicating a frequency of the microwave oscillators 1011 in the case where the value is at the threshold value or more. In this example, it is assumed that "less than threshold value" and "threshold value or more" are a control target value of the frequencies of microwaves that are generated by the microwave oscillators 1011.

When a predetermined period of time (e.g., 30 seconds, etc.) has elapsed after the start of microwave irradiation, the control portion 107 judges whether or not the latest temperature value received from the infrared temperature sensor 103 is "60° C." or more, which is an attribute value of "threshold value" in the record (row) with "status" being "temperature" in the status association information management table shown in FIG. 9. In this example, if the temperature value acquired by the infrared temperature sensor 103 is 25° C., the control portion 107 judges that the temperature value acquired by the infrared temperature sensor 103 is less than the threshold value, and acquires "2.4" GHz, which is an attribute value of "less than threshold value" in the record (row) with "status" being "temperature" in the status association information management table shown in FIG. 9. The control portion 107 controls the irradiating portion 101 based on the acquired attribute value "2.4" such that the frequency of microwaves that are emitted is 2.4 GHz. The frequency of microwaves that are generated is 2.4 GHz that is the same as the default frequency, frequency of the microwaves is not changed.

The control portion 107 repeatedly performs the same processing each time a predetermined period of time has elapsed.

It is assumed that the temperature acquired by the infrared temperature sensor value is 61° C. as a result of an increase in the liquid temperature of the irradiation target due to microwave irradiation. The control portion 107 judges whether or not 61° C. that is the temperature value transmitted from the infrared temperature sensor 103 is "60° C." or more, which is an attribute value of "threshold value" in the record (row) with "status" being "temperature" in the status association information management table shown in FIG. 9. In this example, since 61° C. that is the temperature value acquired by the infrared temperature sensor 103 is "60° C." or more, the control portion 107 judges that the temperature value acquired by the infrared temperature sensor 103 is at the threshold value or more, and acquires "2.5" GHz, which is an attribute value of "threshold value or more" in the record (row) with "status" being "temperature" in the status association information management table shown in FIG. 9. The control portion 107 controls the irradiating portion 101 based on the acquired attribute value "2.5" such that the frequency of microwaves that are emitted is 2.5 GHz. In response to this control, the microwave oscillators 1011 generate microwaves at 2.5 GHz, and the emitting portions 12*a* and 12*b* emit the microwaves at 2.5 GHz onto the microwave irradiation target. If the frequency of the microwaves emitted by the emitting portions 12*a* and 12*b* in the previous time is 2.4 GHz, the frequency of the microwaves that are emitted is changed.

Figure 10A:
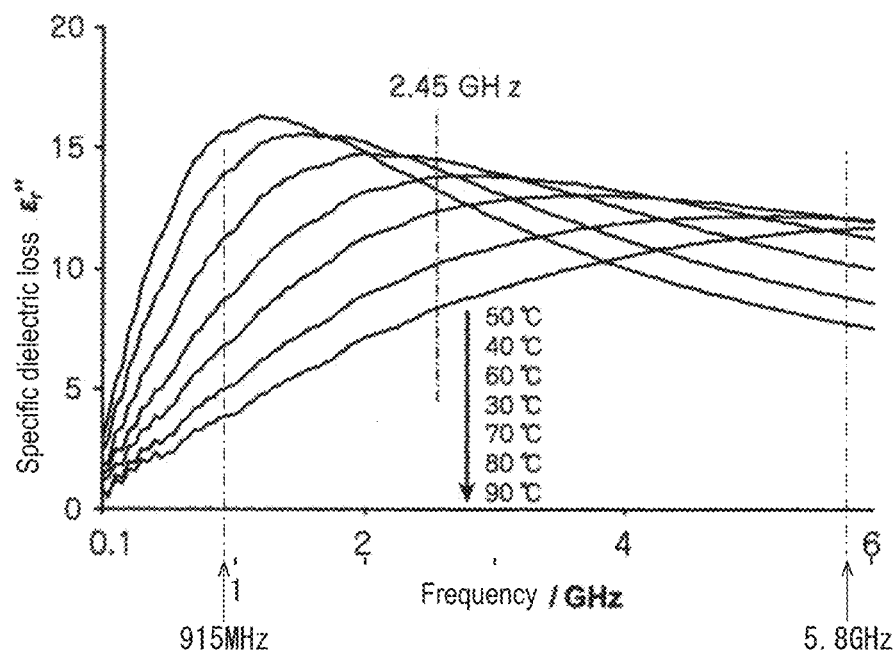
FIG. 10 is a graph illustrating an operation of the microwave treatment apparatus in the embodiment (FIG. 10(a)), and a graph of an enlarged main portion of the graph of FIG. 10(a) (FIG. 10(b)).
Figure 10B:
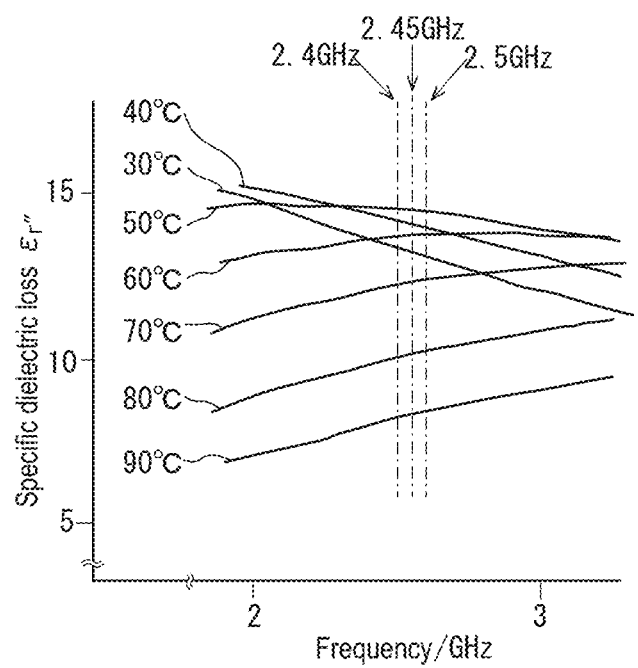

FIG. 10 is a graph showing a relationship between the specific dielectric loss and the frequency at each temperature of ethylene glycol (FIG. 10(*a*)), and a graph of an enlarged main portion, that is, a portion around 2.45 GHz of the graph of FIG. 10(*a*) (FIG. 10(*b*)). Note that this enlarged graph is a schematic graph for the sake of description, and does not absolutely have a high level of precision. The graph in FIG. 10(*a*) is in the same document as the graph relating to ethanol in FIG. 3 above.

In the case of ethylene glycol as shown in FIG. 10, if the liquid temperature changes, the specific dielectric loss for the frequency changes, wherein, in the temperature range of 30 to 50° C., the specific dielectric loss for microwaves having a frequency of 2.4 GHz is larger than the specific dielectric loss for microwaves having a frequency of 2.5 GHz, whereas, in the range of 60 to 90° C., the specific dielectric loss for microwaves having a frequency of 2.5 GHz is larger than the specific dielectric loss for microwaves having a frequency of 2.4 GHz. Thus, if the control portion 107 controls the irradiating portion 101 as described above such that ethylene glycol that is the irradiation target is irradiated with microwaves at 2.4 GHz when the temperature that is the status information detected by the infrared temperature sensor 103 is less than 60° C. and such that ethylene glycol that is the irradiation target is irradiated with microwaves at 2.5 GHz when the temperature is 60° C. or more, it is possible to perform microwave irradiation at a frequency that provides the highest specific dielectric loss in the irradiated region, at the temperature of the irradiated region during the microwave irradiation, and to increase the heating efficiency. Accordingly, it is possible to increase the efficiency of energy that is necessary for the treatment. Note that microwaves having a frequency that provides the highest specific dielectric loss in the irradiated region are microwaves having a frequency that provides the highest specific dielectric loss in the irradiated region, among the microwaves having frequencies that can be emitted by the irradiating portion 101.

The control portion 107 repeatedly performs the same processing each time a predetermined period of time has elapsed, until the microwave irradiation is ended.

In this specific example, the control portion 107 controls the irradiating portion 101 so as to perform microwave irradiation at a frequency according to the status information acquired by the sensor 103, so that it is possible to increase the specific dielectric loss of microwaves at the irradiation target, and to increase the heating efficiency. Accordingly, it is possible to increase the efficiency of energy.

In this example, the case was described in which the frequency control is applied to Specific Example 1, but it will be appreciated that the frequency control may be applied to, for example, Specific Example 2 and the like.

Hereinafter, results of a demonstration test through simulations performed regarding the microwave treatment apparatus 1 in this embodiment will be described.

FIG. 11 shows a perspective view (FIG. 11(*a*)), a front view (FIG. 11(*b*)), and a side view (FIG. 11(*c*)) of a model of Case 1 and a perspective view (FIG. 11(*d*)), a front view (FIG. 11(*e*)), and a side view (FIG. 11(*f*)) of a model of Case 2 used in a demonstration test through a simulation using the microwave treatment apparatus 1, and a perspective view (FIG. 11(*g*)), a front view (FIG. 11(*h*)), and a side view (FIG. 11(*i*)) of a model of Case 3. In FIG. 11, for the sake of ease of description, constituent elements similar to those in FIG. 1 are denoted by the same or corresponding reference numerals. The same applies to the following diagrams and the like showing simulation test results. FIG. 11 shows diagrams for the sake of description, and the sizes and the positional relationships of irradiation targets 50*a* to 50*c*, the emitting portions 12, and the like may be different from those actually set in the simulation test. The same applies to FIG. 15, which will be described later.

In all of Cases 1 to 3, three irradiation targets 50*a* to 50*c* arranged at equal intervals are used. The three irradiation targets 50*a* to 50*c* are each a microwave absorber having a short side length of 25 mm, a long side length of 50 mm, and a height of 10 mm, and are arranged in one line on the same plane with the irradiation target 50*b* being positioned at the center, at intervals of 35 mm along the direction in which the short sides are arranged. At this time, the center of the irradiation target 50*b* is positioned at a predetermined position 51 on a plane on which the irradiation targets 50*a* to 50*c* are arranged (hereinafter, referred to as an "arrangement plane"). An arrangement plane 55 is a virtual plane. The irradiation targets 50*a* to 50*c* are made of a microwave absorber in which a real part εr of the complex permittivity is 10, an imaginary part εi of the complex permittivity is 10, and a tan δ for the complex permittivity is 1. The real part εr of the complex permittivity is a dielectric constant. The imaginary part εi of the complex permittivity is a dielectric loss.

The two emitting portions 12*a* and 12*b* are arranged such that their opening portions face the irradiation targets 50*a* to 50c, and centers 52a and 52b of their opening portions are positioned above a straight line on which the irradiation targets 50a to 50c are arranged. The two emitting portions 12a and 12b are arranged such that their long sides are parallel to a plane passing through the predetermined position 51 and the centers 52a and 52b. The values of the emitting portion 12, 12a and 12b are set to form horn antennas (product name: LB-340-15-A, manufactured by Chengdu AINFO). Specifically, each opening portion has a short side length of 238 mm and a long side length of 309 mm, a waveguide according to the WR340 standard (inner diameter 43.2×86.4 mm) is provided on the side opposite to the opening portion such that long sides thereof are parallel to the long sides of the opening portion, and the total length is 294 mm.

The model shown in FIGS. 11(a) to 11 (c) is a model used in Case 1 in which the three irradiation targets 50a to 50c arranged at equal intervals are irradiated with microwaves from the two emitting portions 12a and 12b of the microwave treatment apparatus 1. In Case 1, as shown in the front view in FIG. 11(b), an angle formed by the arrangement plane and a straight line linking each of the centers 52a and 52b of the opening portions of the emitting portions 12a and 12b and the predetermined position 51 is 60 degrees. The distance between each of the centers 52a and 52b and the position 51 is 550 mm.

The model shown in FIGS. 11(d) to 11(f) is a model used in Case 2 in which the three irradiation targets 50a to 50c arranged at equal intervals are irradiated with microwaves from the two emitting portions 12a and 12b of the microwave treatment apparatus 1. In Case 2, as shown in the front view in FIG. 11(e), an angle formed by the arrangement plane and a straight line linking the center 52a of the opening portion of the emitting portion 12a and the predetermined position 51 is 30 degrees, and an angle formed by the arrangement plane and a straight line linking the center 52b of the opening portion of the emitting portion 12b and the position 51 is 60 degrees. The distance between the center 52a and the position 51 is 900 mm, and the distance between the center 52b and the position 51 is 550 mm.

Figure 11I:
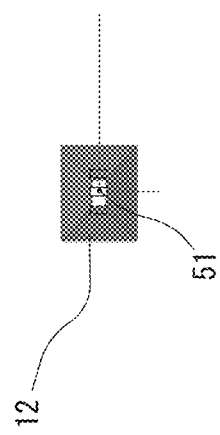
FIG. 11 shows diagrams of models used in a simulation demonstration test of the microwave treatment apparatus in the embodiment (FIGS. 11(a) to 11(i)).
Figure 11H:
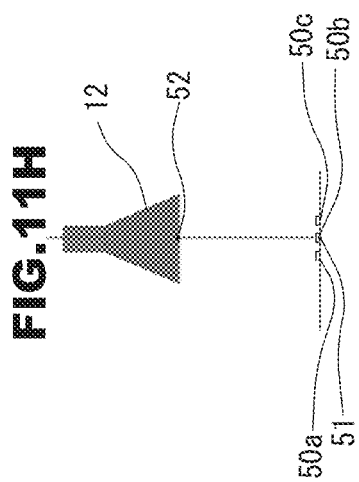
Figure 11G:
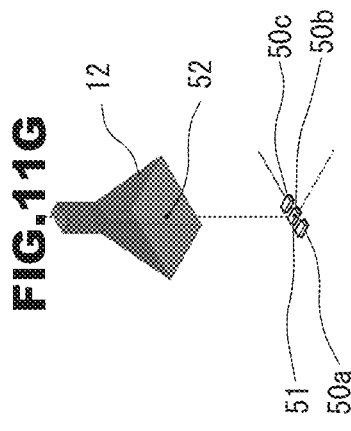

The model shown in FIGS. 11(g) to 11(i) is a model used in Case 3 that is a control test, and is a model in the case where three irradiation targets arranged at equal intervals are irradiated with microwaves from one emitting portion 12. In Case 3, the emitting portion 12 is arranged such that a center 52 of its opening portion is positioned directly above the predetermined position 51, the opening portion faces the irradiation targets 50a to 50c, and long sides thereof are parallel to the direction in which the irradiation targets 50a to 50c are arranged. The distance between the center 52 and the position 51 is 500 mm.

In FIGS. 11(a) to 11(f), the emitting portions 12a and 12b are arranged such that straight lines respectively linking the centers 52a and 52b of the opening portions and the position 51 are normal lines of planes formed by the opening portions of the emitting portions 12a and 12b.

In Cases 1 and 2, microwaves that are emitted from each of the emitting portions 12a and 12b have an output of 100 W, and microwaves emitted from the emitting portion 12 in FIG. 11 have an output of 200 W, that is, their total input electric powers are the same. Microwaves that are emitted from all of the emitting portion 12 and the emitting portions 12a and 12b have a frequency of 2.45 GHz.

The spaces in which the emitting portions 12, 12a, and 12b, and the irradiation targets 50a to 50c are arranged in FIGS. 11(a) to 11(i) are set such that reflection of microwaves by therearound is 0 so as to provide spaces similar to free spaces. These spaces are vacuum spaces. That is to say, the spaces are each set such that a real part εr of the complex permittivity is 1, an imaginary part εi of the complex permittivity is 0, a tan δ for the complex permittivity is 0, a real part μr of the complex permeability is 1, an imaginary part μi of the complex permeability is 0, and a tan δ for the complex permeability is 0.

Field analysis software (HFSS13.0 manufactured by ANSYS) was used in a simulation demonstration test performed for the case where all of the emitting portion 12 and the emitting portions 12a and 12b emit 1-wavelength microwaves. In Cases 1 and 2, a demonstration test was performed on a change in the heat generation distribution of the irradiation targets 50a to 50c in the case where a phase difference between the emitting portions 12a and 12b is changed by controlling the phase of microwaves that are generated by the emitting portion 12b. In this example, the phase of the emitting portion 12a was set to 0 degrees, and the phase of the emitting portion 12b was changed among three patterns consisting of 0 degrees, 90 degrees, and 180 degrees. These phases are phase differences relative to the reference phase. These phases may be considered as an initial phase. Case 3 was used for comparison with Cases 1 and 2, and the phase difference was not performed because the number of emitting portions 12 was one.

Figure 12C:
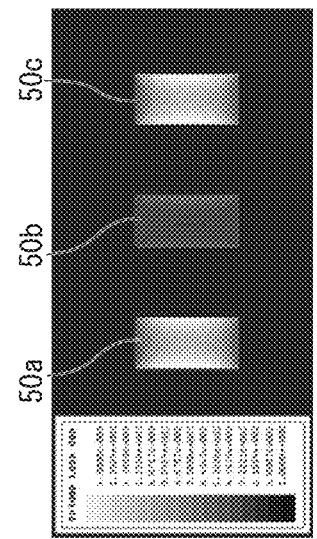
FIG. 12 shows plan views of simulation results of the microwave treatment apparatus in the embodiment (FIGS. 12(a) to 12(g)).
Figure 12B:
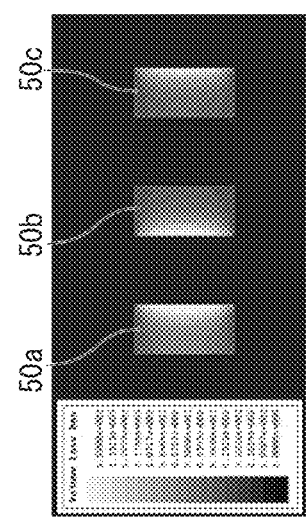
Figure 12A:
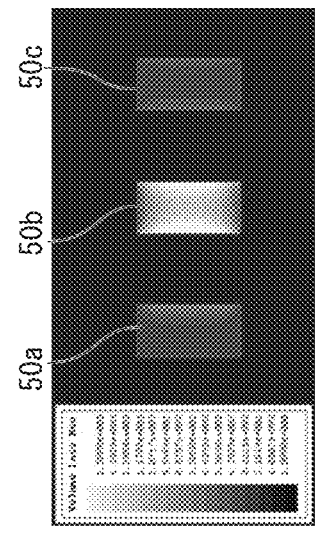

FIG. 12 shows plan views of heat generation distributions near the irradiation targets 50a to 50c obtained through a simulation demonstration test, wherein FIGS. 12(a) to 12(c) show heat generation distributions in the case where, in Case 1, the phase of the emitting portion 12a was taken as 0 degrees, and the phase of the emitting portion 12b was changed among 0 degrees, 90 degrees, and 180 degrees, that is, the case in which the phase difference was changed among 0 degrees, 90 degrees, and 180 degrees, FIGS. 12(d) to 12(f) show heat generation distributions in the case where, in Case 2, the phase of the emitting portion 12a was taken as 0 degrees, and the phase of the emitting portion 12b was changed among 0 degrees, 90 degrees, and 180 degrees, that is, the case in which the phase difference was changed among 0 degrees, 90 degrees, and 180 degrees, and FIG. 12(g) shows a heat generation distribution in the case where the emitting portion 12 was used. In FIG. 12, a brighter portion corresponds to a portion with a greater heat generation.

FIG. 13 shows graphs and a table of heat generation amounts at the irradiation targets 50a to 50c obtained through a simulation demonstration test, wherein FIG. 13(a) is a graph of Case 1 in which heat generation amounts at the irradiation targets 50a to 50c obtained by changing the phase differences are plotted in the same graph. In this example, the heat generation amounts are shown as ratios in the case where the heat generation amount of the irradiation target 50c with the phase difference being 0 degrees was taken as 1. FIG. 13(b) is a graph of Case 2 in which heat generation amounts at the irradiation targets 50a to 50c obtained by changing the phase differences are plotted in the same graph. In this example, the heat generation amounts are shown as ratios in the case where the heat generation amount of the irradiation target 50a with the phase difference being 90 degrees was taken as 1. FIG. 13(c) is a graph of Case 3 showing the heat generation amounts as ratios in the case where the heat generation amount of the irradiation target 50c was taken as 1. FIG. 13(d) is a table showing the ratios of the heat generation amounts shown in the above-mentioned graphs. In FIGS. 13(a) and 13(b), a circle shows a case in which both the phase differences of the emitting portions 12a and 12b relative to the reference phase are 0 degrees, a quadrangle shows a case in which the phase differences of the emitting portions 12a and 12b relative to the reference phase are 0 degrees and 90 degrees, and a triangle shows a case in which the phase differences of the emitting portions 12a and 12b relative to the reference phase are 0 degrees and 180 degrees.

As shown in FIGS. 12(g) and 13(c), in the case where microwaves are emitted from one emitting portion 12, there is not so much unevenness in the distributions of the heat generation amounts resulting from microwaves among the irradiation targets 50a to 50c, and the heated positions spread outward from the irradiation target 50b at the center, whereas, as shown in FIGS. 12(a) to 12(f), in the case where the irradiation targets 50a to 50c are irradiated with microwaves using two emitting portions 12a and 12b, there is unevenness in the distributions of the heat generation amounts resulting from microwaves among the irradiation targets 50a to 50c, which means that local heating with microwaves is performed.

A comparison between the result of Case 1 and the result of Case 2 shown in FIGS. 12(a) to 12(f) with the same phase difference shows that there is a difference between the distributions of the heat generation amount. For example, in FIG. 12(a), the irradiation target 50b is locally heated, whereas, in FIG. 12(d), the irradiation targets 50a and 50b are locally heated but the irradiation target 50c is hardly heated. Accordingly, it is seen that it is possible to change points that are to be locally heated with microwaves, by moving the two emitting portions 12a and 12b.

Furthermore, it is seen from FIGS. 12(a) to 12(c) and 13(a) that, even with the same arrangement of Case 1, the distributions of the heat generation amounts resulting from microwaves among the irradiation targets 50a to 50c changes if the phase differences are different, that is, for example, in FIG. 12(a), the irradiation target 50b is locally heated, whereas, in FIG. 12(b), the irradiation target 50a, the left side of the irradiation target 50b, and the right side of the irradiation target 50c are locally heated, and, in FIG. 12(c), the irradiation targets 50a and 50c are locally heated.

Furthermore, it is seen from FIGS. 12(d) to 12(f) and 13(b) that, even with the same arrangement of Case 2, the distributions of the heat generation amounts resulting from microwaves among the irradiation targets 50a to 50c changes if the phase differences are different, that is, for example, in FIG. 12(d), the irradiation targets 50a and 50b are locally heated, whereas, in FIG. 12(e), the irradiation target 50b and the right side of the irradiation target 50c are locally heated, and, in FIG. 12(f), the irradiation target 50c is locally heated.

Accordingly, it is seen that it is possible to move points that are to be locally heated, by controlling the phases of the two emitting portions 12a and 12b.

It is seen from these simulation results that it is possible to properly control microwave irradiation, by individually moving the two emitting portions 12a and 12b, so that, for example, local heating becomes possible, and a point that is to be heated can be moved. Furthermore, it is possible to properly control microwave irradiation, by controlling the phases of the two emitting portions 12a and 12b, so that, for example, local heating becomes possible, and a point that is to be heated can be moved.

As described above, according to this embodiment, it is possible to properly control microwave irradiation, by individually moving the multiple emitting portions 12 that emit microwaves.

Furthermore, it is possible to properly and more flexibly control microwave irradiation, by controlling the phases of microwaves that are emitted by the emitting portions 12.

Moreover, it is possible to increase the heating efficiency, by changing the frequency of the irradiating portion 101.

A microwave treatment apparatus 2 of this embodiment is obtained by allowing the microwave treatment apparatus described in the foregoing embodiment to individually move multiple emitting portions that emit microwaves, inside a vessel.

Figure 14A:
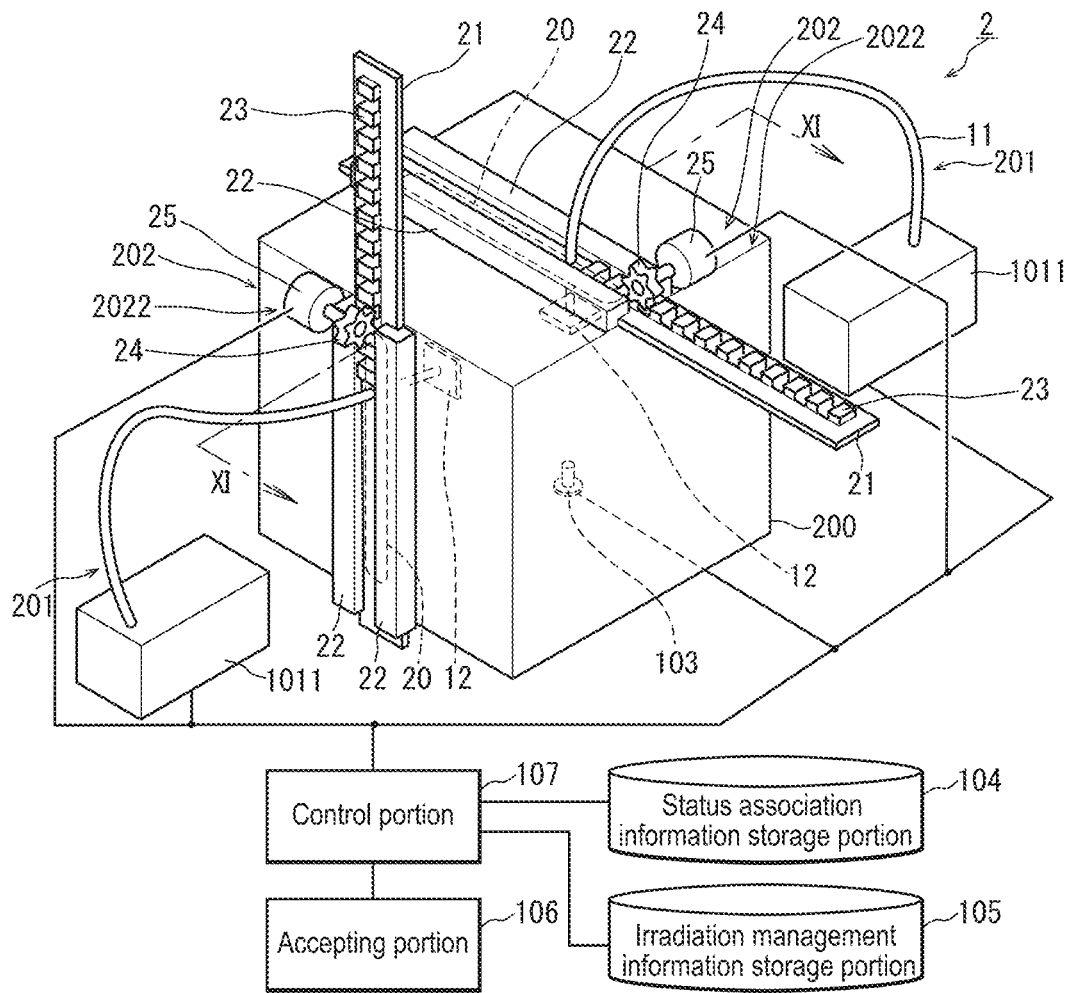
FIG. 14 shows a schematic diagram showing an example of a microwave treatment apparatus in Embodiment 2 of the present invention (FIG. 14(a)), and a cross-sectional view taken along the line XI-XI of a main portion in FIG. 14(a) (FIG. 14(b)).
Figure 14B:
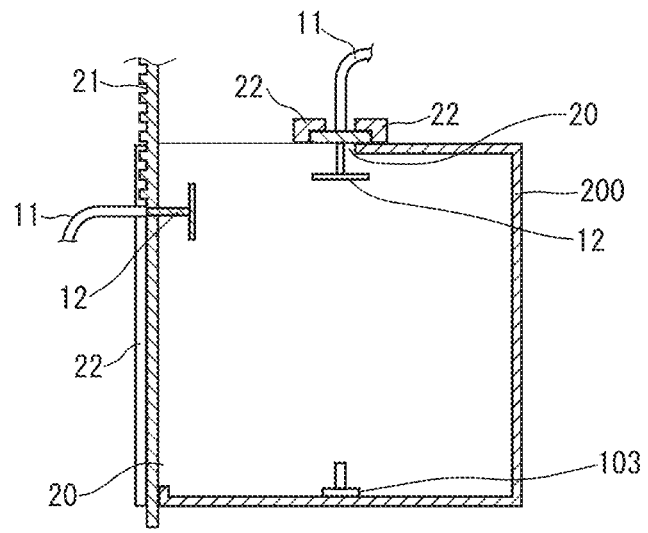

FIG. 14 is a schematic diagram showing an example of the configuration of the microwave treatment apparatus 2 in this embodiment (FIG. 14(a)), and a cross-sectional view taken along the line XI-XI of a main portion in FIG. 14(a) (FIG. 14(b)). In the diagrams, the same reference numerals as those in FIG. 1 denote the same or corresponding constituent elements.

The microwave treatment apparatus 2 includes a vessel 200, irradiating portions 201, moving portions 202, the one or at least two sensors 103, the status association information storage portion 104, the irradiation management information storage portion 105, the accepting portion 106, and the control portion 107. The sensors 103 are, for example, temperature sensors such as thermocouples.

The vessel 200 is a vessel inside of which is irradiated with microwaves. For example, the vessel 200 is a vessel in which one or more sets of treatment such as heating of a content through microwave irradiation are to be performed. The vessel 200 may be considered as a treatment vessel. One or more sets of treatment performed inside the vessel 200 may be any type of treatment. The one or more sets of treatment may be, for example, treatment including heating for causing one or more reactions. The one or more sets of treatment are, for example, treatment performed using a content inside the vessel 200. The treatment is, for example, similar to one or more types of treatment described in Embodiment 1 above.

The vessel 200 may be, for example, a reactor in which one or more reactions such as chemical reactions are to be caused. The vessel 200 is, for example, a reactor in which microwave irradiation is performed in a multi-mode.

Inside the vessel 200, for example, a content is arranged. Those similar to the irradiation targets described in the foregoing embodiment can be used as the content. For example, the content is continuously or non-continuously supplied into the vessel 200. The vessel 200 has, for example, a supply port (not shown) through which a content is to be supplied thereinto, and a take-out port (not shown) through which the content thereinside is to be taken out. The supply port may be considered, for example, as an inlet port. The take-out port may be considered, for example, as an outlet port or a collecting port. The supply port and the take-out port may be realized by one inlet-outlet port (not shown) or the like. The content may be supplied into the vessel 200 or taken out from the vessel 200, for example, using a pump (not shown). The vessel 200 may be, for example, a batch-type reactor. Alternatively, the vessel 200 may be, for example, a continuous reactor such as a so-called flow-type reactor in which a content that is continuously supplied thereto is continuously subjected to one or more reactions and is then continuously taken out. For example, the vessel 200 may be a horizontal flow-type reactor in which a liquid content horizontally flows with an unfilled space being provided thereabove. For example, if the content supply port is set at a position that is as high as or higher than the position of the take-out port, a content that is a fluid supplied from the supply port naturally flows inside the vessel 200 from the supply port toward the take-out port, and is discharged from the take-out port, so that the vessel 200 can be used as such a flow-type reactor.

The vessel 200 may have a heating unit (not shown) such as a heater or and a hot water jacket for heating the inside of the vessel 200, a cooling unit (not shown) such as a cold water jacket for cooling the inside, and the like. In the vessel 200, one or at least two partition plates (not shown), a stirring unit such as a screw and a stirring blade for stirring the content, and the like may be arranged.

There is no limitation on the shape of the vessel 200. FIG. 1 shows a case as an example in which the vessel 200 is in the shape of a rectangular parallelepiped, but the vessel 200 may be in the shape of, for example, a tube having a U-shaped cross-section and elongated in the horizontal direction, a rectangular parallelepiped elongated in the horizontal direction, a capsule, or a cylinder, or may be in the shape of a tube having a semi-circular or trapezoidal cross-section and elongated in the horizontal direction. Alternatively, the vessel 200 may not have a shape elongated in the horizontal direction, but may have a shape elongated in the vertical direction such as a capsule-like or cylindrical shape elongated in the vertical direction, or may have a sphere-like shape. The vessel 200 may have a bottom face and the like that are horizontally arranged, or that are inclined relative to the horizontal direction. For example, the microwave treatment apparatus 2 may have leg portions (not shown) for holing the vessel 200 such that the bottom face thereof is inclined relative to the horizontal direction.

There is no limitation on the material and the like of the vessel 200. The vessel 200 preferably has an inner wall made of a microwave-reflecting substance. The microwave-reflecting substance is, for example, a metal. There is no limitation on the size and the like of the vessel.

The irradiating portions 201 is obtained by allowing the irradiating portions 101 described in the foregoing embodiment to perform microwave irradiation from the multiple emitting portions 12, inside the vessel 200. For example, the multiple emitting portions 12 of the irradiating portion 201 are arranged inside the vessel 200 or a wall face or the like of the vessel 200. For example, if the emitting portions 12 are each an antenna connected to a coaxial cable, the antenna is movably arranged inside the vessel 200. For example, FIG. 14 shows a case as an example in which planar antennas are used as the emitting portions 12.

Moreover, the irradiating portions 201 are installed such that the multiple emitting portions 12 are individually movable relative to the vessel 200. For example, the multiple emitting portions 12 are installed so as to be movable along wall faces of the vessel 200. There is no limitation on how the multiple emitting portions 12 are movable. The other portions of the configuration are similar to those of the irradiating portions 101 in the foregoing embodiment, and, thus, in this example, a detailed description thereof has been omitted.

The moving portions 202 are obtained by allowing the irradiating portion 101 in the foregoing embodiment to individually move the multiple emitting portions 12 included in the irradiating portion 101, inside the vessel 200. For example, the moving portions 202 individually move the multiple emitting portions 12 along the wall faces of the vessel 200. For example, the moving portions 202 slide the transmitting units 1012 that are inserted through slits 20 provided in the wall faces of the vessel 200, in the state of being kept inserted through the slits 20, so that the emitting portions 12 provided inside the vessel 200, of the inserted transmitting units 1012, can be moved inside the vessel 200.

The transmitting units, the coaxial cables 11, and the moving portions 202 may have the multiple robot arms 1022 and the like including the emitting portions 12 described in the foregoing embodiment, provided on the wall faces of the vessel 200, or the like.

Hereinafter, the structure of the moving portions 202 shown in FIG. 14 will be described. In FIG. 14, moving mechanisms 2022 constituting the moving portions 202 are respectively provided on an upper face and one side face of the vessel 200. The moving mechanisms 2022 are respectively provided on the upper face and the one side face (hereinafter, simply referred to as "faces") of the vessel 200, and each includes a slide member 21 that slides over the slit 20 formed through the face, a guide portion 22 that is provided along the slit 20, regulates the movement direction of the slide member 21 to the extending direction of the slit 20, and has grooves into which the sides of the slide member 21 are slidably inserted such that the slide member 21 is not detached from the face of the vessel 200, a rack gear 23 that is provided on the upper face of the slide member 21, a pinion gear 24 that is meshed into the rack gear, and a motor 25 that rotates the pinion gear 24. The pinion gear 24 and the rotational shaft of the motor 25 may be directly connected to each other, or may indirectly connected to each other via gears, belts, or the like. The transmitting unit 1012 is attached to the slide member 21 such that one end thereof extends through the slide member 21, and the one end of the transmitting unit 1012 extending through the slide member 21 is arranged into the vessel 200 through the slit 20 provided in the face. For example, one end of the coaxial cable 11 of the transmitting unit 1012 is arranged through the slide member 21 into the vessel 200, and an antenna functioning as the emitting portion 12 connected to the one end is arranged inside the vessel 200. The length of the slide member 21 is set to be a length that allows the slide member 21 to block at least the entire slit 20 when the transmitting unit 1012 is positioned at either end in the longitudinal direction of the slit 20. For example, the length of the slide member 21 is set to be more than twice the length of the slit 20.

In the moving mechanism 2022 of each moving portion 202, the motor 25 is rotated to rotate the pinion gear 24, so that the slide member 21 moves together with the rack gear 23 along the guide portion 22, and the one end of the transmitting unit 1012 attached to the slide member 21 moves together with the slide member 21 in the state of being inserted into the slit 20, and, thus, the emitting portion 12 (e.g., antenna) provided at the one end of the transmitting unit 1012 can be moved in the one-dimensional direction in which the slide member 21 moves. Since the slit 20 is blocked by the slide member 21 even when the slide member 21 is moved, for example, the air-tightness is maintained and microwaves are prevented from leaking to the outside even when the emitting portion 12 is moved.

There is no limitation on the face on which each moving mechanism 2022 is provided, the direction in which the moving mechanism 2022 is provided, and the like, in FIG. 14. For example, there is no limitation on the direction in which the moving mechanism 2022 allows the slide member 21 to move. However, the slit 20 corresponding to the moving mechanism 2022 has to be provided in the vessel 200 so as to extend in the movement direction of the slide member 21.

FIG. 14 shows an example in which the number of moving mechanisms 2022 is two, but three or more moving mechanisms 2022 may be provided.

Note that the moving portions 202 described above are merely an example, and the moving portions 202 may have structures other than that described above. However, it is preferable that the structures do not allow microwave leakage due to the movement.

For example, if the later-described control portion 107 individually controls the moving mechanisms 2022, the emitting portions 12 installed at the moving mechanisms 2022 can be individually moved.

The operation of the microwave treatment apparatus 2 is as in Embodiment 1 above, except for the range in which the moving portions 202 move the emitting portions 12, control signals for moving the moving portions 202, and the like, in this example, a detailed description thereof has been omitted.

Hereinafter, results of a demonstration test through simulations performed regarding the microwave treatment apparatus 2 in this embodiment will be described.

Figure 15A:
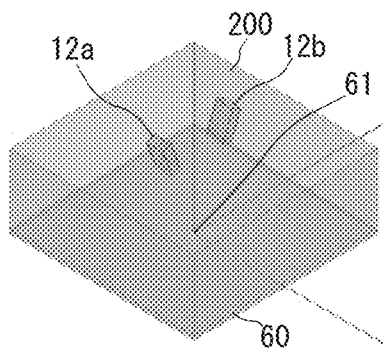
FIG. 15 shows diagrams of models used in a simulation demonstration test of the microwave treatment apparatus in the embodiment (FIGS. 15(a) to 15(h)).
Figure 15B:
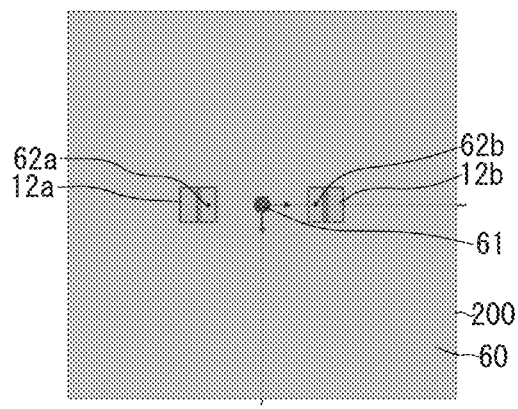
Figure 15C:
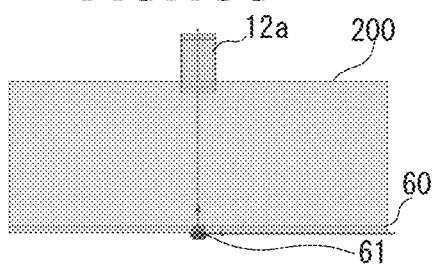
Figure 15D:
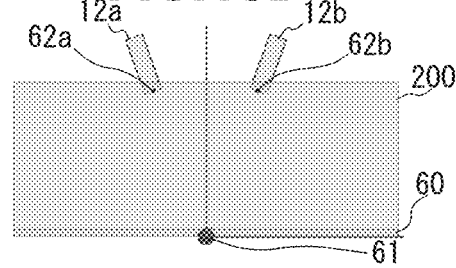
Figure 15E:
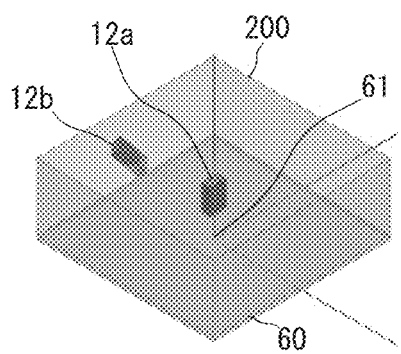
Figure 15F:
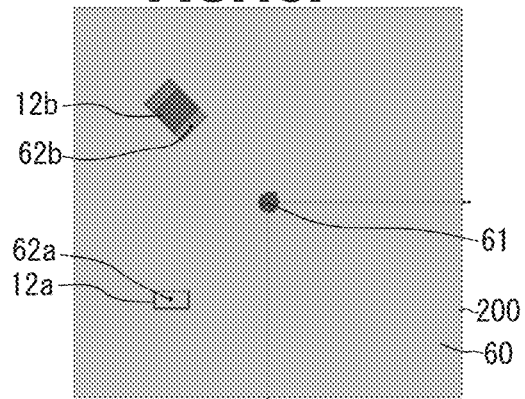
Figure 15G:
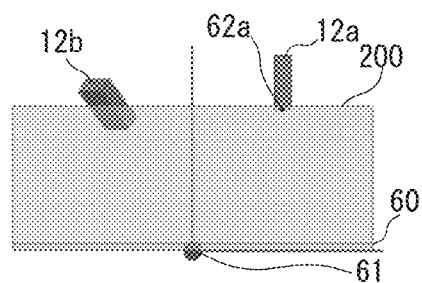
Figure 15H:
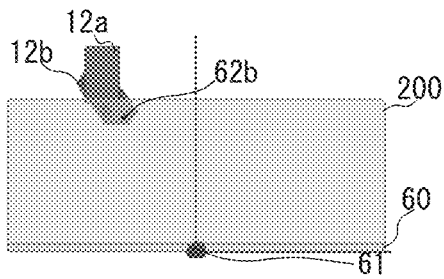

FIG. 15 are diagrams showing models of Cases 4 and 5 used in a demonstration test through a simulation using the microwave treatment apparatus 2, and shows a perspective view (FIG. 15(a)), a plan view (FIG. 15(b)), a side view (FIG. 15(c)), and a front view (FIG. 15(d)) of Case 4, and a perspective view (FIG. 15(e)), a plan view (FIG. 15(f)), a side view (FIG. 15(g)), and a front view (FIG. 15(h)) of Case 5. In both of the models of Cases 4 and 5, microwave irradiation is performed from the two emitting portions 12a and 12b, inside the vessel 200 in the shape of a rectangular parallelepiped having square surfaces with 1000 mm sides, and having a height of 400 mm. An irradiation target 60 having a thickness of 20 mm is arranged on the entire bottom face of the vessel 200. The irradiation target 60 is a microwave absorber in which a real part εr of the complex permittivity is 10, an imaginary part εi of the complex permittivity is 10, and a tan δ for the complex permittivity is 1. The other portions of the space inside the vessel 200 are set to be air. All inner walls of the vessel 200 are metal walls. Specifically, the bottom face on which the irradiation target 60 is arranged is also a metal wall. In this example, a center 61 of the bottom face of the vessel 200 is taken as the origin of coordinate axes, where a straight line extending through the center 61 and perpendicular to the side, on the front face side, of the bottom face is taken as an x axis, a straight line extending through the center 61 and perpendicular to the x axis on the bottom face is taken as a y axis, and an axis extending through the center 61 and perpendicular to the bottom face is taken as a z axis. The x coordinates at both ends in the x-axis direction on the bottom face of the vessel 200 are respectively set to −500 and 500, and the y coordinate at both ends in the y-axis direction are respectively set to −500 and 500.

In FIG. 15, for the sake of ease of description, constituent elements similar to those in FIG. 14 are denoted by the same or corresponding reference numerals. The same applies to the following diagrams and the like showing simulation test results.

The emitting portions 12a and 12b are, in this example, straight waveguides according to the WR340 standard having a long side length of 86.4 mm and a short side length of 43.2 mm. The two emitting portions 12a and 12b are arranged on the upper face of the vessel 200 such that their opening portions face the center 61 of the bottom face of the vessel 200.

In Case 4, as shown in the front view in FIG. 15(d), the emitting portions 12a and 12b are arranged such that centers 62a and 62b of their opening portions are positioned on the x axis on the upper face of the vessel 200, and long sides of the opening portions are parallel to each other. An angle formed by the bottom face of the vessel 200 and a straight line linking each of the centers 62a and 62b of the opening portions of the emitting portions 12a and 12b and the center 61 of the bottom face is 70 degrees. The emitting portions 12a and 12b are arranged such that straight line respectively linking the centers 62a and 62b of the opening portions and the position 61 are normal lines of planes formed by the opening portions of the emitting portions 12a and 12b. The distance between the centers 62a and 62b of the opening portions of the emitting portions 12a and 12b is 273.6 mm, and the height of the emitting portions 12a and 12b at portions thereof projecting into the vessel 200 is 32.2 mm. The same applies to Case 5.

In Case 5, as shown in FIG. 15, the emitting portion 12a is arranged at the position where the center 62a of its opening portion has an x coordinate of −250 and a y coordinate of −250, on the upper face of the vessel 200, such that the face of the opening portion is parallel to the bottom face of the vessel 200 so as to face the bottom face of the vessel 200. The emitting portion 12a is arranged such that the long sides of the opening portion are parallel to the x axis. The emitting portion 12b is arranged once at the position where the center 62b of its opening portion has an x coordinate of −200 and a y coordinate of 200, on the upper face of the vessel 200, such that the face of the opening portion is parallel to and faces the bottom face of the vessel 200 and such that the long sides of the opening portion are parallel to the x axis, after which the emitting portion 12b is rotated by 45 degrees leftward when viewed from above about a rotational shaft that is a normal line of the opening portion extending through the center 62b of the opening portion of the emitting portion 12b, and the rotated emitting portion 12b is rotated by 45 degrees such that the opening portion is oriented toward the center of the bottom face of the vessel 200 about a rotational shaft that is a straight line parallel to the long sides of the opening portion of the emitting portion 12b extending through the center of the emitting portion 12b.

Note that the other conditions such as the microwave frequency are the same as those in the simulation demonstration test of Embodiment 1 above. As in Embodiment 1, the phases of microwaves are controlled as well.

FIG. 16 shows diagrams of results obtained through a simulation demonstration test in Case 4, wherein FIGS. 16(a) to 16(e) plan views of heat generation distributions in the irradiation target 60 in the case where, in Case 4, the phase of the emitting portion 12a was taken as 0 degrees, and the phase of the emitting portion 12b was changed among 0 degrees, 45 degrees, 90 degrees, 135 degrees, and 180 degrees, that is, the case in which the phase difference was changed among 0 degrees, 45 degrees, 90 degrees, 135 degrees, and 180 degrees, FIG. 16(f) is a graph in which the xy coordinates of points with the highest electric field strengths at the respective phase differences are plotted in the xy coordinate plane, and FIG. 16(g) is a table showing the xy coordinates of points with the highest electric field strengths at the respective phase differences and the highest electric field strengths.

FIG. 17 shows diagrams of results obtained through a simulation demonstration test in Case 5, wherein FIGS. 17(a) to 17(e) are plan views of heat generation distributions in the irradiation target 60 in the case where, in Case 5, the phase of the emitting portion 12a was taken as 0 degrees, and the phase of the emitting portion 12b was changed among −180 degrees, −90 degrees, 0 degrees, 90 degrees, and 180 degrees, that is, the case in which the phase difference was changed among −180 degrees, −90 degrees, 0 degrees, 90 degrees, and 180 degrees, and FIG. 17(f) is a graph in which the xy coordinates of points with the highest electric field strengths at the respective phase differences are plotted in the xy coordinate plane, and FIG. 17(g) is a table showing the xy coordinates of points with the highest electric field strengths at the respective phase differences and the highest electric field strengths. In FIGS. 16 and 17, a brighter portion corresponds to a portion with a greater heat generation.

In the tables in FIGS. 16(f) and 17(f), the two attributes of "phase difference" show a phase of the emitting portion 12a and a phase of the emitting portion 12b sequentially from the left. These phases are phase differences relative to the reference phase. These phases may be considered as an initial phase.

A comparison between the result of Case 4 shown in FIGS. 16(a) to 16(e) and the result of Case 5 shown in FIGS. 17(a) to 17(e) with the same phase difference shows that there is a difference between the electrical field distributions. Points with locally high electric field strengths are present, but these points are different. For example, the electrical field distribution in FIG. 16(a) and the electrical field distribution in FIG. 17(c) are different electrical field distributions, in which points with locally high electric field strengths are present therein, but these points are different. Accordingly, it is seen that it is possible to change electrical field distributions and to change points that are to be locally heated with microwaves, by moving the two emitting portions 12a and 12b.

Furthermore, it is seen from FIGS. 16(a) to 16(e) that, even in the same Case 4, it is possible to change electrical field distributions and to change points with locally high electric field strengths, by changing the phase differences. For example, as shown in FIGS. 16(f) and 16(g), it is also possible to move points with the highest electric field strengths, by changing the phase differences.

As is seen from the result shown in FIG. 17, the same applies to Case 5.

It is seen from these simulation results that, inside the vessel 200, it is possible to properly control microwave irradiation, by individually moving the two emitting portions 12a and 12b, so that, for example, local heating becomes possible, and a point that is to be heated can be moved.

Furthermore, it is possible to properly control microwave irradiation, by controlling the phases of the two emitting portions 12a and 12b, so that, for example, local heating becomes possible, and a point that is to be heated can be moved.

It is difficult from the results shown in FIGS. 16 and 17 to find connection between points on which electric field strengths are locally concentrated, and the positions, the phase differences and the like of the emitting portions 12a and 12b, and it is also difficult to predict points on which electric field strengths are locally concentrated when the two emitting portions 12a and 12b emit microwaves inside the vessel 200, due to the influence of reflection and the like inside the vessel 200. Thus, in such a case, it is preferable to acquire the above-described irradiation management information, using the simulation results.

Hereinafter, an example of processing that acquires irradiation management information using the above-described simulation will be described. This processing may be performed, for example, by the control portion 107 or the like, or may be performed by another information processing apparatus (not shown) or the like.

First, simulations as shown in FIGS. 15 to 17 are performed for multiple combinations of movements and phase differences of the multiple emitting portions 12. It is preferable to perform simulations for combinations that are as many as possible. Heights of positions at which the irradiation target 60 is arranged (e.g., positions from the upper face of the vessel 200) may be added as an element of the combinations. That is to say, simulations as described above may be performed for the case in which the height of the irradiation target 60 is changed. Accordingly, it is possible to acquire coordinates of points with high electric field strengths in a three-dimensional space. The movements of the multiple emitting portions 12 are, for example, changing at least one or more of the positions, the microwave emission directions, and the like of at least one or more of the multiple emitting portions 12. The movements are, for example, movements along the wall faces of the vessel 200. When moving the emitting portions 12, for example, movements among intersections in a virtual matrix are preferable, but they be freely moved.

If multiple simulations are performed in this manner, multiple simulation results as shown in FIGS. 16 and 17 are obtained.

In the simulations, information relating to movements of the multiple emitting portions 12, information on the phases of the emitting portions 12, the coordinates of points with the highest electric field strengths in the electrical field distributions obtained through the simulations as shown in FIG. 16(f), etc., and values of the electric field strengths are acquired. The information relating to movements of the multiple emitting portions 12 is, for example, the position of each emitting portion 12 that has been changed through movement, information indicating the emission direction, or the like. The information relating to movements of the multiple emitting portions 12 is, for example, combinations of information indicating the positions (e.g., coordinates) of the multiple emitting portions and information indicating the microwave emission direction (e.g., an azimuth angle and an elevation angle). The coordinates of points with the highest electric field strengths are the xy coordinates on the irradiation target 60, but, in the case where the height of the irradiation target 60 is also changed, a value indicating this height may be further acquired as the z coordinate. Then, irradiation management information is acquired that has sets of information relating to movements of the emitting portions 12, information on the phases of the emitting portions 12, and the coordinates of points with the highest electric field strengths acquired in the simulations, respectively as the emission position information, the phase specifying information, and the target position information, and this information is accumulated in a storage portion such as the irradiation management information storage portion 105. Accordingly, it is possible to acquire irradiation management information as shown in FIG. 6 in Note that, if irradiation management information in which pieces of target position information overlap each other is acquired, only a piece of irradiation target information with the highest electric field strength may be left, and the others may be deleted.

Furthermore, in this example, only coordinates of points with the highest electric field strengths are acquired from the simulation results, but, for example, coordinates of one or at least two points with an electric field strength that is equal to or greater than a threshold may be acquired, irradiation management information having these coordinates as the target position information may be acquired and accumulated, and irradiation management information in which pieces of target position information overlap each other may be deleted.

Furthermore, after the above-described multiple simulations are performed, simulation results with a high electric field strength at each of multiple sets of coordinates in a space specified in advance such as the vessel 200 that can be irradiated with microwaves are detected from the multiple simulation results, irradiation management information may be acquired that has sets of information relating to movements of the multiple emitting portions 12 in the simulations, information on the phases of the multiple emitting portions 12, and the coordinates in the space specified in advance, respectively as the emission position information, the phase specifying information, and the target position information, and this information may be accumulated in a storage portion such as the irradiation management information storage portion 105. The simulation results with a high electric field strength may be simulation results with the highest electric field strengths, may be simulation results with the $k^{-th}$ highest electric field strengths (k is an integer of 2 or more), or may be results obtained at random from the simulation results with an electric field strength that is equal to or greater than a threshold.

In the case where the phase specifying information is not necessary in the irradiation management information, simulations may be performed without changing the phases, and the phase information may not be acquired.

Above, the case was described in which irradiation management information is acquired using simulation results in the case where the multiple emitting portions 12 are moved along the along the wall faces of the vessel 200, but in the present invention, the movements of the emitting portions 12 are not limited to movements along the wall faces. In this example, simulations were performed on the movements inside the vessel 200, but irradiation management information may be acquired through simulations performed on movements of the emitting portions 12 in a free space or the like where the vessel 200 is not present.

As described above, according to this embodiment, it is possible to properly control microwave irradiation inside the vessel 200, by individually moving the multiple emitting portions 12 inside the vessel 200.

Furthermore, it is possible to properly and more flexibly control microwave irradiation, by controlling the phases of microwaves that are emitted by the emitting portions 12.

Moreover, it is possible to increase the heating efficiency, by changing the frequency of the irradiating portion 101.

In the present invention, concentration of electrical fields generated by microwaves may be considered to be substantially the same as concentration of magnetic fields generated by microwaves. For example, in the foregoing embodiments, the case and the like in which the control portion 107 moves the multiple emitting portions 12 or controls the phases of microwaves such that electrical fields are concentrated on one or more desired points was described, but this operation may be considered to be substantially the same as an operation in which the control portion 107 controls microwaves such that magnetic fields are concentrated on one or more desired points. Typically, point on which electrical fields are concentrated are, substantially the same as point on which magnetic fields are concentrated, and, thus, even in the case where the electrical fields are considered as being replaced by the magnetic fields in this manner, the configuration is substantially the same as that in the foregoing embodiments, and the same effects are achieved.

In the foregoing embodiments, instead of the semiconductor oscillators 1011 in which frequencies of microwaves that are generated thereby are changeable, microwave oscillators 1011 such as multiple semiconductor oscillator that generate microwaves having different frequencies may be used, and microwaves that are generated thereby may be switched and emitted from the emitting portions 12, so that the frequencies of microwaves that are emitted by the emitting portions 12 are changed. The multiple microwave oscillators that generate microwaves having different frequencies may have, for example, a structure in which multiple microwave oscillators that generate microwaves having different frequencies are arranged in one piece (e.g., are arrayed in one piece, are integrated, etc.). In this case, part of a circuit or the like constituting the multiple microwave oscillators may be shared. A set of multiple microwave oscillators that generate microwaves having different frequencies or a structure in which such multiple microwave oscillators are arranged in one piece may be used as one microwave oscillator 1011 described above. If multiple microwave oscillators that generate microwaves having different frequencies are used in this manner, the range in which the frequencies are changeable can be increased compared with the case in which a microwave oscillator whose frequency is changeable is used.

In the foregoing embodiments, the case was described in which, in a microwave treatment apparatus in which the multiple irradiating portions 101 are moved by the moving portion 102, the phases of microwaves that are emitted by the irradiating portions 101 are controlled, but, in the present invention, such a configuration for controlling the phases of microwaves that are emitted by the irradiating portions 101 may be applied to microwave treatment apparatuses other than those described above, such as microwave treatment apparatuses in which the irradiating portions are not moved, and the like.

That is to say, a microwave treatment apparatus according to the present invention to which the configuration for controlling the phases of microwaves that are emitted by multiple irradiating portions as described in the foregoing embodiments is applied may be, for example, a microwave treatment apparatus including: three or more irradiating portions that perform microwave irradiation from three or more positions; and a control portion that controls phases of the three or more irradiating portions, wherein the control portion controls phases of the three or more irradiating portions such that electrical fields generated by microwaves emitted from the three or more positions are concentrated on one or more desired points. With this configuration, it is possible to concentrate electrical fields on a desired point inside a vessel, and, for example, to locally heat the desired point inside the vessel. Note that, instead of controlling phases of the three or more microwave oscillators such that electrical fields generated by microwaves emitted from the three or more positions are concentrated on one or more desired points, the control portion may control phases of the three or more microwave oscillators such that one or more desired points are positions where microwaves emitted from the three or more positions are intensified by each other through mutual interference. The same applies to a configuration using absorbing members described later.

Furthermore, the microwave treatment apparatus of Modified Example 1 may be such that the control portion controls phases of the three or more irradiating portions such that there is no phase difference generated by a difference between the distances from positions where transmitting portions emit microwaves to a desired point, and microwaves that are incident on the desired point have the same phase. The same applies to a configuration using absorbing members described later.

Furthermore, the microwave treatment apparatus of Modified Example 1 may be such that the multiple irradiating portions performs microwave irradiation at the same wavelength λ, and the control portion controls phases of the three or more irradiating portions such that there is no phase difference calculated through processing in which a difference between a given distance and a distance from each of the positions where the irradiating portions emit microwaves to the desired point is divided by a wavelength λ to obtain a remainder, which is then multiplied by 2π/λ to obtain the phase difference, so that microwaves that are incident on the desired point have the same phase. The same applies to Modified Example 2 described later. The given distance may be a distance between a position where one of the multiple irradiating portions emits microwaves and the desired point.

Furthermore, the microwave treatment apparatus of Modified Example 1 may be such that the multiple irradiating portions performs microwave irradiation at the same wavelength λ, and the control portion controls phases of the three or more irradiating portions such that there is no phase difference calculated through processing in which a distance from each of the positions where the irradiating portions emit microwaves to the desired point is divided by a wavelength λ to obtain a remainder, which is then multiplied by 2π/λ to obtain the phase difference, so that microwaves that are incident on the desired point have the same phase. The same applies to Modified Example 2 described later.

The irradiating portions of Modified Example 1 may be, for example, those similar to the above-described irradiating portion 101, such as those including: the microwave oscillators 1011 that generate microwaves; and the transmitting units 1012 that transmit the microwaves generated by the microwave oscillators 1011. The control portion is, for example, a control portion at least including a configuration for controlling a phase, included in the above-described control portion 107. The control portion controls phases of the irradiating portions, for example, by controlling phases of the microwave oscillators. For example, the control portion controls phases of the microwave oscillators such that microwaves that are emitted from the irradiating portions have a desired phase. The same applies to Modified Example 2 described later.

The microwave treatment apparatus is preferably a microwave treatment apparatus including, for example, an unshown vessel, wherein the irradiating portions perform microwave irradiation inside the vessel, and the control portion controls the phases of microwaves that are generated by three or more irradiating portions (e.g., the phases of microwaves that are generated by the microwave oscillators 1011 of the irradiating portions) such that electrical fields generated by microwaves are concentrated on one or more desired points inside the vessel or such that microwaves are intensified by each other through mutual interference at the desired points. The vessel may be considered, for example, as a treatment vessel in which one or more sets of treatment are performed, or may be a reactor or the like in which one or more reactions such as chemical reactions are to be caused. The vessel is, for example, a vessel in which heating is performed. The microwave treatment apparatus is preferably a microwave treatment apparatus in which microwave irradiation is performed in a multi-mode. The vessel is, for example, a reactor in which microwave irradiation is performed in a multi-mode. The vessel may be a flow-type reactor, or may be a batch-type reactor. The same applies to Modified Example 2 described later.

In the microwave treatment apparatus described in Modified Example 1 above, absorbing members (not shown) that absorb microwaves may move in time series inside a vessel (not shown), and the control portion 107 controls the phases of the irradiating portions 101 such that predetermined one or more desired points in the absorbing members, the points moving in accordance with the time-series movements of the absorbing members are desired points on which electrical fields generated by microwaves are concentrated, so that microwaves that are incident on one or more points have the same phase. In this case, the irradiating portions 101 may be moved, or may not be moved. For example, the control portion 107 may control the phases of the microwave oscillators 1011 of the irradiating portions 101 The desired points in the absorbing members are, for example, points that move in accordance with the movements of the absorbing members. The absorbing members are members having a microwave absorptivity. The absorbing members are, for example, members having a high microwave absorptivity. The absorbing members may be considered, for example, as members having a high dielectric loss.

It is preferable that the movements of the absorbing members in this case is, for example, movements along predetermined movement routes. For example, information indicating a movement route (e.g., vector data such as coordinate group or a Bezier Curve, etc.) of one or more points that are desired points that move in accordance with the movements of the absorbing members and information indicating a movement speed, information having multiple sets of a position on the movement routes and an elapsed time during the movements, or the like is acquired, and this information is used to calculate information indicating time-series changes in the phases of microwaves that are generated by the irradiating portions 101 so as to change the phases such that desired points follow the one or more points that move as described above, and the calculated information is accumulated in an unshown storage medium or the like. Then, information indicating time-series changes in the phases of microwaves that are generated by the irradiating portions 101 is read, and the control portion 107 can perform control such that the predetermined one or more points in the absorbing members moving in accordance with the time-series movements of the absorbing members are the above-described desired points, by controlling, in time series, the phases of microwaves that are generated by the irradiating portions 101 such that the phases of microwaves that are generated by the irradiating portions 101 are the phases indicated by this information. Note that a configuration is also possible in which, instead of calculating, in advance, information indicating time-series changes in the phases of the microwaves, current positions of the one or more points in the absorbing members during movements are acquired from information on the above-described movement routes or the like, and the control portion 107 or the like calculates the phases of microwaves that are to be generated by the irradiating portions 101 such that the movement routes are the above-described desired points (e.g., points on which electrical fields are concentrated, etc.), and the control portion 107 controls the multiple irradiating portions 101 such that the phases of microwaves that are generated by the irradiating portions 101 are the calculated phases. With this configuration, for example, it is possible to always locally heat part of the absorbing members that move.

The absorbing members that move are, for example, mixing impellers provided inside the vessel, trays that move inside the vessel, or the like. The movements of the absorbing members may be movements in one-dimensional directions, may be movements in two-dimensional directions, or may be movements in three-dimensional directions. The movements of the absorbing members may be, for example, rotational movements or the like about a rotational shaft or the like.

The microwave treatment apparatus described in this modified example is, for example, a microwave treatment apparatus including: a vessel; multiple irradiating portions that perform microwave irradiation from multiple positions into the vessel; and a control portion that controls phases of the multiple irradiating portions, wherein the microwave treatment apparatus further includes absorbing members, which are members having a microwave absorptivity inside the vessel, the absorbing members move in time series inside the vessel, and the control portion controls phases of the multiple microwave oscillators such that electrical fields generated by microwaves that are emitted from the multiple positions are concentrated on the predetermined one or more points in the absorbing members that move in accordance with the time-series movements of the absorbing members. With this configuration, for example, it is possible to heat one or more points that are desired points in the absorbing members that move in time series, following the movements.

In the foregoing embodiments, the case was described in which the frequencies of microwaves that are emitted by the irradiating portions 101 are changed according to the status information acquired by the one or at least two sensors 103, in a microwave treatment apparatus in which the multiple irradiating portions 101 are moved by the moving portion 102, a microwave treatment apparatus in which the multiple irradiating portions 101 are moved and the phases of microwaves that are emitted by the irradiating portions 101 are controlled, or the like, but, in the present invention, such a configuration for changing the microwave frequency may be applied to microwave treatment apparatuses other than those described above, such as microwave treatment apparatuses in which the irradiating portions are not moved, microwave treatment apparatuses in which phases of the irradiating portions are not controlled, microwave treatment apparatuses in which the number of irradiating portions included therein is one, and the like.

That is to say, a microwave treatment apparatus to which a configuration for changing frequencies of microwaves that are emitted by irradiating portions according to status information acquired by sensors as described in the foregoing embodiments is applied may be, for example, a microwave treatment apparatus in which microwave irradiation is performed, including: one or more irradiating portions that can perform microwave irradiation at two or more different frequencies; one or more sensors that acquire status information, which is information indicating a status related to a region that is irradiated with microwaves; and a control portion that controls the one or more irradiating portions according to the one or more pieces of status information acquired by the one or more sensors, thereby changing frequencies of microwaves that are emitted by the irradiating portions such that microwave irradiation is performed at a frequency that provides a high specific dielectric loss of the microwave irradiation target. With this configuration, it is possible to perform microwave irradiation at a frequency that provides a high specific dielectric loss of the content according to the status information acquired by the sensors, and, for example, to increase the heating efficiency of microwaves. The irradiating portions and the sensors may be, for example, those similar to the irradiating portion 101 and the sensor 103 described above. The control portion is, for example, a control portion at least including a configuration for changing a frequency by controlling the irradiating portions according to the status information acquired by the sensors, included in the above-described control portion 107.

The microwave treatment apparatus is preferably a microwave treatment apparatus including, for example, an unshown vessel, wherein the irradiating portions perform microwave irradiation on a content that is a treatment target inside the vessel. In this case, it is preferable that the one or more sensors acquire status information indicating one or more statuses inside the vessel. The vessel may be, for example, a vessel similar to that of the vessel used in the above-described microwave treatment apparatus that performs phase control. It is preferable that the microwave treatment apparatus is a microwave treatment apparatus in which microwave irradiation is performed in a multi-mode.

Note that, in the foregoing embodiments, control performed by the control portion 107 or the like may be realized by centralized processing using a single control portion, or may be realized by distributed processing using multiple control portions.

Furthermore, in the foregoing embodiments, each constituent element may be configured by dedicated hardware, or, alternatively, constituent elements that can be realized by software may be realized by executing a program. For example, each constituent element may be realized by a program execution unit such as an MPU reading and executing a software program stored in a storage medium such as a hard disk or a semiconductor memory. At the execution, the program execution unit may execute the program while accessing a storage unit (e.g., a storage medium such as a hard disk or a memory).

The software that realizes the control performed by the control portion 107 or the like in the microwave treatment apparatuses according to the foregoing embodiments may be the following sort of program. Specifically, this program is a program for causing a computer capable of accessing: a microwave treatment apparatus including an irradiating portion that performs microwave irradiation from multiple emitting portions, and a moving portion that individually moves the multiple emitting portions; an irradiation management information storage portion in which multiple pieces of irradiation management information are stored, the irradiation management information having multiple pieces of emission position information respectively indicating positions of the multiple emitting portions, and target position information indicating a position that is a microwave irradiation target; and an accepting portion, to execute: a step of the accepting portion accepting position specifying information, which is information for specifying a position that is a microwave irradiation target; a step of acquiring multiple pieces of emission position information associated with target position information corresponding to the position specifying information accepted in the step of accepting position specifying information, from the irradiation management information; and a step of controlling the moving portion such that the emitting portions respectively corresponding to the pieces of emission position information move to positions indicated by the multiple pieces of emission position information acquired in the step of acquiring multiple pieces of emission position information.

Furthermore, this program may be a program for causing a computer capable of accessing: a microwave treatment apparatus including an irradiating portion that performs microwave irradiation from multiple emitting portions, and a moving portion that individually moves the multiple emitting portions; and an irradiation management information storage portion in which one or more sets of multiple pieces of emission position information respectively indicating positions of the multiple emitting portions are stored in association with the order of performing movement, to execute: a step of acquiring multiple pieces of emission position information from the irradiation management information stored in the irradiation management information storage portion, according to the order of performing movement; and a step of controlling the moving portion such that the emitting portions respectively corresponding to the pieces of emission position information move to positions indicated by the acquired multiple pieces of emission position information, each time multiple pieces of emission position information are acquired in the step of acquiring multiple pieces of emission position information.

This program may be such that, in the above-described program, the irradiation management information further has multiple pieces of phase specifying information, which is information indicating phases of microwaves that are emitted from the multiple emitting portions, and the program causes the computer to further execute: a step of acquiring multiple pieces of phase specifying information respectively corresponding to the multiple pieces of emission position information acquired in the step of acquiring multiple pieces of emission position information, from the irradiation management information; and a step of controlling the irradiating portion such that, after the step of controlling the moving portion, microwaves having phases respectively indicated by the multiple pieces of phase specifying information acquired in the step of acquiring multiple pieces of phase specifying information are emitted from the multiple emitting portions corresponding thereto.

It should be noted that, in the programs, in a transmitting step of transmitting information, a receiving step of receiving information, or the like, processing that is performed by hardware, for example, processing performed by a modem or an interface card in the transmitting step (processing that can be performed only by hardware) is not included.

Furthermore, the computer that executes this program may be a single computer, or may be multiple computers. That is to say, centralized processing may be performed, or distributed processing may be performed.

Figure 18:
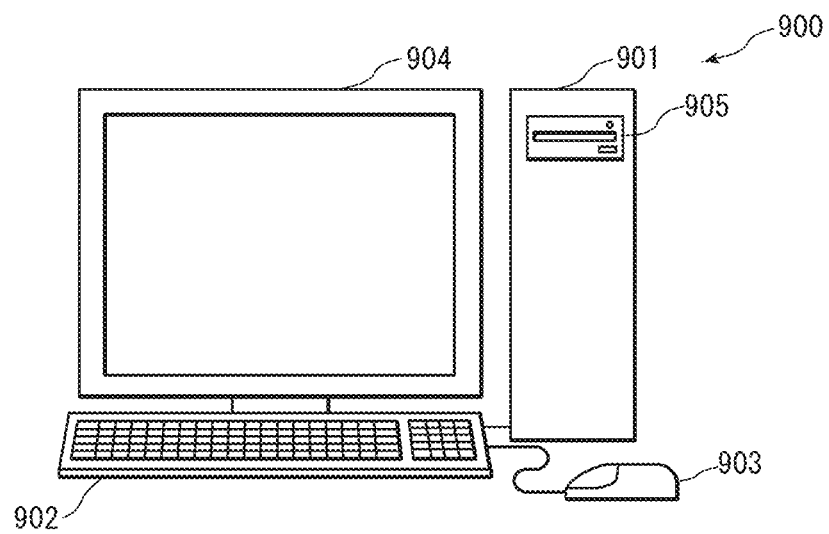
FIG. 18 is a view showing an example of the appearance of a computer system in the embodiments of the present invention.

FIG. 18 is a schematic view showing an example of an external view of a computer that executes the programs described above to realize the accepting portion, the control portion, and the like of the microwave treatment apparatus according to the foregoing embodiments. The foregoing embodiments may be realized using computer hardware and computer programs executed thereon. In FIG. 18, a computer system 900 includes a computer 901 including a CD-ROM (compact disk read only memory) drive 905, a keyboard 902, a mouse 903, and a monitor 904.

Figure 19:
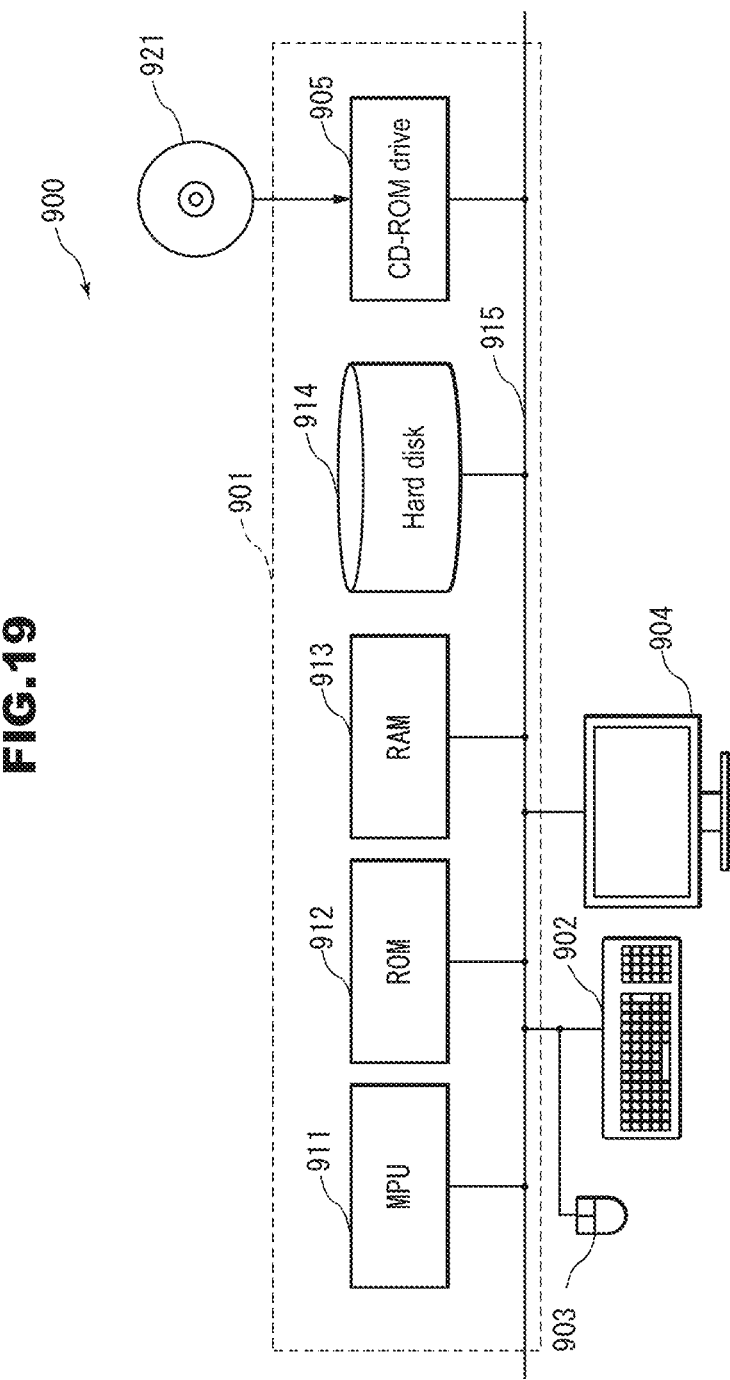
FIG. 19 is a diagram showing an example of the configuration of the computer system in the embodiments.

FIG. 19 is a diagram showing an internal configuration of the computer system 900. In FIG. 19, the computer 901 includes, in addition to the CD-ROM drive 905, an MPU (micro processing unit) 911, a ROM 912 in which a program such as a boot up program is to be stored, a RAM (random access memory) 913 that is connected to the MPU 911 and in which a command of an application program is temporarily stored and a temporary storage area is provided, a hard disk 914 in which an application program, a system program, and data are stored, and a bus 915 that connects the MPU 911, the ROM 912, and the like. Note that the computer 901 may include an unshown network card for providing a connection to a LAN and the like.

The status association information storage portion, the irradiation management information storage portion, and the like according to the foregoing embodiments may be stored in a storage medium such as a hard disk included in the computer system 900.

The program for causing the computer system 900 to execute the functions of the control portion and the like of the microwave treatment apparatus according to the foregoing embodiments may be stored in a CD-ROM 921 that is inserted into the CD-ROM drive 905 and be transferred to the hard disk 914. Alternatively, the program may be transmitted via an unshown network to the computer 901 and stored in the hard disk 914. At the time of execution, the program is loaded into the RAM 913. The program may be loaded from the CD-ROM 921, or directly from a network.

The program does not necessarily have to include, for example, an operating system (OS) or a third party program to cause the computer 901 to execute the functions of the control portion and the like of the microwave treatment apparatus according to the foregoing embodiments. The program may only include a command portion to call an appropriate function (module) in a controlled mode and obtain desired results. The manner in which the computer system 900 operates is well known, and thus a detailed description thereof has been omitted.

The present invention is not limited to the embodiment set forth herein. Various modifications are possible within the scope of the present invention.

As described above, the microwave treatment apparatus and the like according to the present invention are suitable as an apparatus and the like for performing microwave irradiation, particularly as an apparatus and the like for performing microwave irradiation from multiple positions.

The invention claimed is:

1. A microwave treatment apparatus, comprising:
an irradiating portion that has one or more semiconductor oscillators for generating microwaves and emits the generated microwaves from multiple emitting portions;
a moving portion that individually moves the multiple emitting portions; and
a control portion that controls movements of the emitting portions by the moving portion;
wherein the irradiating portion is such that phases of microwaves that are emitted from the multiple emitting portions are changeable, and
the control portion controls phases of microwaves such that microwaves that are emitted from the multiple emitting portions are intensified by each other through mutual interference.

2. The microwave treatment apparatus according to claim 1, wherein the control portion controls the moving portion, thereby moving the emitting portions such that microwaves that are emitted from the multiple emitting portions overlap each other at least at a desired point.

3. The microwave treatment apparatus according to claim 2, wherein the control portion controls the moving portion, thereby moving one or more emitting portions such that microwaves that are emitted from the multiple emitting portions are intensified by each other through mutual interference at the desired point.

4. The microwave treatment apparatus according to claim 2, wherein the control portion controls the moving portion, thereby moving one or more emitting portions such that electrical fields of microwaves that are emitted from the multiple emitting portions are concentrated on the desired point.

5. The microwave treatment apparatus according to claim 4, wherein the control portion controls the moving portion, thereby moving one or more emitting portions such that microwaves that are incident on the desired point have a same phase.

6. The microwave treatment apparatus according to claim 1, wherein the control portion controls the irradiating portion such that at least some sets of microwaves that are emitted by the irradiating portion from the multiple emitting portions have different phases.

7. The microwave treatment apparatus according to claim 1,
wherein the irradiating portion can further perform microwave irradiation at two or more different frequencies, and
the control portion controls frequencies of microwaves used in irradiation at a desired point.

8. The microwave treatment apparatus according to claim 1,
wherein the irradiating portion has:
multiple transmitting units that have the emitting portions, and transmit microwaves generated by the semiconductor oscillators and emit the transmitted microwaves from the emitting portions.

9. The microwave treatment apparatus according to claim 1,
wherein the moving portion has multiple robot arms, and
the multiple emitting portions are respectively installed at the multiple robot arms, and individually move in accordance with operations of the robot arms.

10. The microwave treatment apparatus according to claim 1, wherein the multiple emitting portions of the irradiating portion are highly directional antennas.

11. The microwave treatment apparatus according to claim 1, further comprising a vessel,
wherein the multiple emitting portions of the irradiating portion are movably arranged in the vessel, and
the irradiating portion performs microwave irradiation from the multiple emitting portions into the vessel.

* * * * *